(12) United States Patent
Nakamura et al.

(10) Patent No.: US 7,805,052 B2
(45) Date of Patent: Sep. 28, 2010

(54) APPARATUS AND METHOD FOR VIDEO PROCESSING, AND STORAGE MEDIUM AND PROGRAM THEREFOR

(75) Inventors: Osamu Nakamura, Saitama (JP); Mototsugu Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 1316 days.

(21) Appl. No.: 10/841,063

(22) Filed: May 7, 2004

(65) Prior Publication Data

US 2005/0002644 A1 Jan. 6, 2005

(30) Foreign Application Priority Data

May 9, 2003 (JP) .............................. 2003-131047

(51) Int. Cl.
| | |
|---|---|
| H04N 5/93 | (2006.01) |
| H04N 5/00 | (2006.01) |
| H04N 5/14 | (2006.01) |
| H04N 5/91 | (2006.01) |
| H04N 5/222 | (2006.01) |
| H04N 5/445 | (2006.01) |
| H04N 7/00 | (2006.01) |
| H04N 7/025 | (2006.01) |
| H04N 7/173 | (2006.01) |
| G06F 17/24 | (2006.01) |
| G06K 9/46 | (2006.01) |
| G06G 1/14 | (2006.01) |

(52) U.S. Cl. .............................. 386/52; 386/46; 386/68; 386/69; 386/95; 386/125; 348/552; 348/700; 348/722; 382/190; 704/14; 715/234; 715/260; 725/32; 725/36; 725/39; 725/40; 725/42; 725/44; 725/51; 725/90; 725/91; 725/93; 725/97; 725/101; 725/114; 725/116; 725/133

(58) Field of Classification Search .................. 386/52, 386/46, 68, 69, 95, 125, E5.043; 348/552, 348/E5.008, E5.007, E5.096, E5.104, E5.107; 358/908; 382/190; 725/32, 36, 40, 90, 91, 725/93, 97, 101, 114, 116, 133, 153, 39, 725/42, 51, 44; 375/E7.025; 705/14; 715/234, 715/260
See application file for complete search history.

(56) References Cited

U.S. PATENT DOCUMENTS 5,732,217 A * 3/1998 Emura .......................... 725/90
5,850,561 A * 12/1998 Church et al. ................ 715/234

(Continued)

*Primary Examiner*—Thai Tran
*Assistant Examiner*—Syed Y Hasan
(74) *Attorney, Agent, or Firm*—Fromer Lawrence & Haug LLP; William S. Frommer; Thomas F. Presson

(57) ABSTRACT

A video recording apparatus for continuously presenting a main program to a user without a break while presenting a commercial. A main program buffer records a main program of a video signal in accordance with a temporal position of at least the main program or commercials in the video signal, and a commercial buffer records the commercials. A controller determines whether a current time is in a period to display a commercial, on the basis of at least the temporal position of the main program or the commercials in the video signal. A mixer mixes the main program and the commercials such that the main program is temporally continuously displayed in a full screen area and such that a commercial is displayed in a small area in the bottom right corner of the screen during a period in which the commercial should be displayed.

21 Claims, 46 Drawing Sheets

U.S. PATENT DOCUMENTS

| | | | | |
|---|---|---|---|---|
| 6,100,941 | A * | 8/2000 | Dimitrova et al. | 348/700 |
| 6,275,616 | B1 * | 8/2001 | Jahanghir et al. | 382/233 |
| 6,483,986 | B1 * | 11/2002 | Krapf | 386/68 |
| 6,608,930 | B1 * | 8/2003 | Agnihotri et al. | 382/176 |
| 6,829,780 | B2 * | 12/2004 | Kraft et al. | 725/42 |
| 6,909,837 | B1 * | 6/2005 | Unger | 386/68 |
| 7,013,479 | B2 * | 3/2006 | Mori | 725/93 |
| 2002/0150380 | A1 * | 10/2002 | Shigetomi et al. | 386/46 |
| 2003/0046688 | A1 * | 3/2003 | Yoshido | 725/32 |
| 2003/0110497 | A1 * | 6/2003 | Yassin et al. | 725/42 |
| 2004/0027484 | A1 * | 2/2004 | Lee | 348/552 |

* cited by examiner

RELATED ART

RELATED ART

RELATED ART

RELATED ART

FIG. 16

| PARAMETER | SYMBOL | UNIT | EXAMPLE OF INDISPENSABLE CONDITION (19a) | EXAMPLE OF INDISPENSABLE CONDITION (20a) | EXAMPLE OF EVALUATION RESULT (20a) |
|---|---|---|---|---|---|
| START TIME | Ts | HR:MIN:SEC | 1:23'45 | 1:23'45 | 1:23'45 |
| LENGTH (OF NON-SILENT PERIOD) | Tw | SEC | 14.63 | 14.63 | 14.63 |
| PRE BREAK LENGTH | $Q_1$ | ms | — | 300.0 | 300.0 |
| POST BREAK LENGTH | $Q_2$ | ms | — | 300.0 | 300.0 |
| MINIMUM AMPLITUDE IN PRE BREAK PERIOD | $Q_3$ | — | — | 0.00015 | 0.00015 |
| MINIMUM AMPLITUDE IN POST BREAK PERIOD | $Q_4$ | — | — | 0.00020 | 0.00020 |
| LEFT-RIGHT CORRELATION | $Q_5$ | — | — | 0.934 | 0.934 |
| MEAN AMPLITUDE | $Q_6$ | — | — | 0.010 | 0.010 |
| NUMBER OF CUTS | $Q_7$ | · | — | 9 | 9 |
| BROADCAST MODE | $Q_8$ | — | — | 1 | 1 |
| NUMBER OF ADJACENT CANDIDATES | $Q_9$ | · | — | 2 | 2 |
| PRE DIFFERENTIAL SPECTRAL ENERGY | $Q_{10}$ | — | — | 0.41 | 0.41 |
| POST DIFFERENTIAL SPECTRAL ENERGY | $Q_{11}$ | — | — | 0.63 | 0.63 |
| SCORE | R | — | — | — | 1.80 |
| SCORE EVALUATION RESULT | Z | — | — | — | 1 |

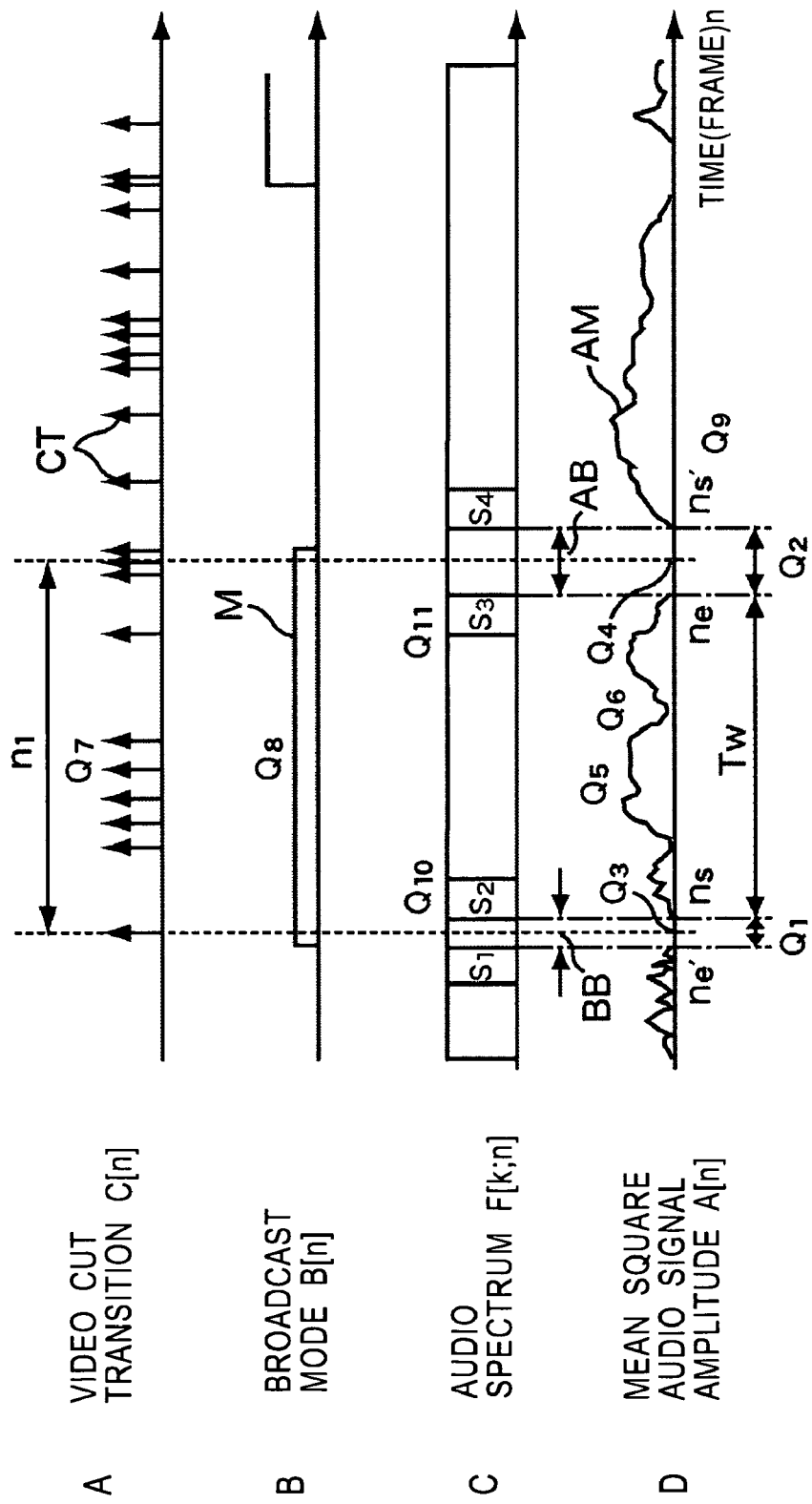

APPARATUS AND METHOD FOR VIDEO PROCESSING, AND STORAGE MEDIUM AND PROGRAM THEREFOR

BACKGROUND OF THE INVENTION

1. Field of the Invention

The present invention relates to a method and apparatus, a storage medium, and a program, for processing a video signal. More particularly, the present invention relates to a method and apparatus, a storage medium, and a program, for processing a video signal including a commercial.

2. Description of the Related Art

It is very popular to record a television program on a video cassette and play back the program recorded on the video cassette at an arbitrary time. A video cassette recorder has various functions convenient for a user to play back recorded television programs. One of them is a function of skipping a commercial (hereinafter, also referred to a CM). In most free broadcast programs, a commercial is inserted between a main program and another following main program or inserted in the middle of a main program (hereinafter, such a commercial will be generically referred to as a commercial inserted in a main program). However, many users want to skip commercials and view only main programs. In order to meet such a need, many video cassette recorders have a capability of skipping commercials.

FIG. 1 is a diagram showing an example of a configuration of a television broadcast program including a main program and commercials. In FIG. 1, each rectangle denotes a moving image corresponding to a predetermined period of time. In the following figures, similar rectangles are used to denote similar moving images.

In FIG. 1, periods P1, P2, and P3 denote periods in which the main program is displayed, and periods C1 and C2 denote periods in which commercials are displayed. When a user simply watches a television broadcast program configured in such a manner without recording it on a video cassette or the like, the user views the program in the same order as that in which the original television broadcast program is configured, that is, in the order of the man program in the period P1, the commercial in the period C1, the main program in the period P2, the commercial in the period C2, and the main program in the period P3.

FIG. 2 is a diagram showing an example of a manner in which the television program shown in FIG. 1 is played back after being recorded. In FIG. 2, periods P1, P2, and P3 denote periods in which recorded main program is displayed, and periods C1 and C2 denote periods in which recorded commercials are displayed. When the recorded program is played back in a normal mode, the recorded program is played back at a normal playback speed in the order of the main program in the period P1, the commercial in the period C1, the main program in the period P2, the commercial in the period C2, and the main program in the period P3. When the program is played back using the function of skipping commercials, the main program corresponding to the period P1 is played back at the normal speed, and then the following commercial corresponding to the period C1 is played back at a higher speed than the normal playback speed. Thereafter, the main program corresponding to the period P2 is played back at the normal speed, and the commercial corresponding to the period C2 is then played back at the high speed. The main program corresponding to the period P3 is then played back at the normal speed. Thus, the commercials are played back in a shorter time than in the normal mode. Therefore, the user does not have to spend a long time to view commercials and can usefully spend the time to enjoy the main program.

FIG. 3 is a diagram showing an example of a manner of playing back the television broadcast program shown in FIG. 1 recorded on a random access storage medium such as a DVD (Digital Versatile Disc) or an HDD (Hard Disk Drive). In a normal playback mode, the recorded program is played back at a normal playback speed in the following order: the main program in the period P1, the commercial in the period C1, the main program in the period P2, the commercial in the period C2, and the main program in the period P3. When the program is played back using the function of skipping commercials, in addition to the manner described above with reference to FIG. 2, the program can also be played back as follows. After the main program corresponding to the period P1 is played back at the normal speed, the following commercial corresponding to the period C1 is skipped without being played back, and the main program corresponding to the period P2 is played back at the normal speed. The following commercial corresponding to the period C2 is skipped without being played back, and the main program corresponding to the period P3 is played back at the normal speed. When a video cassette is used, it cannot be randomly accessed because of the nature of a tape medium, and thus commercials are simply played back at a higher speed in the commercial-skip mode than the normal speed. In contrast, when a random access storage medium such as a DVD or an HDD is used, it is possible to play back only desired main programs without playing back any commercial.

Because commercials are not played back at all, a user does not have to spend any time for commercials and the user can spend all his/her time to enjoy the main program.

By using the random access capability in recording or editing, it is possible to construct or reconstruct a recorded television program so as to include only main programs. More specifically, for example, as shown in FIG. 4, a recorded program may be configured such that only the main program corresponding to the period P1, the main program corresponding to the period P2, and the main program corresponding to the period P3 are recorded continuously without recording commercials corresponding to the periods C1 and C2. The configuration of the recorded programs including no commercial allows a reduction in necessary storage space of a storage medium such as a DVD or an HDD. A storage medium on which a program is recorded in such a manner can also be played back using another player. Also in this case, a user can enjoy the main program including no commercials.

In a known technique, a sequence of broadcast data is stored in a storage unit together with data indicating the order in which the broadcast data is supplied. When the broadcast data is played back, a commercial detector detects commercials in the broadcast data on the basis of identification information included in the broadcast data, and all detected commercial data are first read and corresponding images and voice/sound are played back by a playback unit. After all commercials are played back, the sequence of broadcast data including no commercials is read from the storage unit and played back by the playback unit (Japanese Unexamined Patent Application Publication No. 2002-325226).

However, if the capability of playing back only main programs without playing back commercials at all becomes very popular, the result can be a collapse of charge-free broadcast services. FIG. 5 is a diagram showing an outline of a business model of charge-free broadcasting. A sponsor 1 requests a broadcast station 2 to broadcast an advertisement program (commercial) to promote sales of a product or service 4. The broadcast station 2 charges the sponsor 1 for the broadcasting of the commercial. The broadcast station 2 produces a television program that can attract a user 3 and inserts a commercial in the television program.

When the user views the television program broadcasted from the broadcast station 2, the user 3 also views the commercial inserted in the main television program. The commercial attracts attention of the user 3 to the product or service 4 provided by the sponsor 1. If the user 3 gets interested in the product or service 4 and buys it from the sponsor 3, a charge for the product or service 4 is paid to the sponsor 1. A part of the charge paid to the sponsor 3 is used by the sponsor 1 to pay the charge for the commercial to the broadcast station 2. That is, although the user 3 does not directly pay a charge for television programs to the broadcast station 2, the user 3 indirectly pays the charge via the sponsor 1 by buying the product or service 4.

If the capability described above with reference to FIGS. 3 and 4, that is, recording apparatus having the capability of viewing only main television programs without viewing commercials becomes popular, the user 3 no longer views commercials that are broadcasted by the broadcast station 2 in response to a request from the sponsor 1. As a result, commercials have no contribution to promotion of sales of the product or service 4. The sponsor 1 cannot pay a high charge for commercials useless for promotion of sales, and thus the sponsor 1 reduces or terminates advertisement. Because the broadcast station 2 needs an income from the sponsor 1 to produce a television program, the reduction in income from the sponsor 1 results in a reduction in expense that can be used to produce the television program.

The result is that attractive television programs disappear and the user 3 no longer views television. If the user 3 does not view television programs, broadcasting of commercials becomes completely useless for promotion of sales of the product or service 4. As a result, the sponsor 1 further reduces commercials. Thus, a vicious spiral occurs. As described above, the charge-free broadcasting is possible only when users 3 view commercials, and no television programs can be produced if users do not view commercials. From this point of view, it is undesirable to remove commercials when recording or playing back television programs.

On the other hand, however, there is a great need for a recording apparatus capable of removing commercials.

In view of the above, it is an object of the present invention to provide a technique that allows a user to continuously view a main television program without a break and that allows a commercial to be presented to the user. It is another object of the present invention to provide a technique that allows a user to return to a main program after a short commercial break.

SUMMARY OF THE INVENTION

In an aspect, the present invention provides a video processing apparatus comprising first storage control means for, when a video signal including a first image and a second image temporally inserted in the first image is given, controlling storing of the first image of the video signal, on the basis of the temporal position of at least one of the first image and the second image in the video signal, second storage control means for controlling of storing the second image on the basis of the temporal position of at least one of the first image and the second image in the video signal, determination means for determining whether a current period is a period during which to display the second image, on the basis of the temporal position of at least one of the first image and the second image in the video signal, and mixing means for mixing the stored first and second images such that the first image is displayed temporally continuously in a first area of a screen and such that if the current period is determined as a period during which the second image should be displayed, the second image is displayed in a second area of the screen.

In this video processing apparatus, preferably, the first image is a main program image in the video signal, and the second image is a commercial image.

The video processing apparatus may further comprise image detection means for detecting the second image from the video signal, and the first storage control means may control storing of the first image of the video signal in accordance with detection of the second image by the image detection means, the second storage control means may control storing of the second image of the video signal in accordance with detection of the second image by the image detection means, and the determination means may determine whether the current period is a period during which to display the second image, in accordance with detection of the second image by the image detection means.

The video processing apparatus may further comprise reception control means for controlling receiving of position information indicating a position of at least one of the first image and the second image in the video signal, and the first storage control means may control storing of the first image of the video signal in accordance with the position information, the second storage control means may control storing of the second image of the video signal in accordance with the position information, and the determination means may determine whether the current period is a period during which to display the second image, on the basis of the position information.

The video processing apparatus may further comprise reduction means for reducing the second image, and the second storage means may control storing of the reduced second image, and the mixing means may mix the stored first image and the reduced second image.

The video processing apparatus may further comprise first reduction means for reducing the first image, and second reduction means for reducing the second image, wherein the first storage means may control storing of the reduced first image, the second storage means may control storing of the reduced second image, and the mixing means may mix the stored reduced first image and reduced second image.

The determination means may determines, on the basis of the position of at least one of the first image and the second image in the video signal, whether the current period is a period during which to display the second image such that the second image is displayed temporally repeatedly in the second area.

The mixing means may mix the stored first image and second image such that the second image is displayed in a plurality of second areas on the screen.

The mixing means may mix the stored first image and second image such that the first image is displayed in the first area whose horizontal center is coincident with the horizontal center of the screen and/or whose vertical center is coincident with the vertical center of the screen.

The video processing apparatus may further comprise storage means for storing the video signal, and the first storage control means may control storing of the first image of the video signal read from the storage means, and the second storage control means may control storing of the second image of the video signal read from the storage means.

The video processing apparatus may further comprise storage means for storing the video signal including the first image and the second image mixed together by the mixing means.

In another aspect, the present invention provides a video processing method comprising a first storage control step of, when a video signal including a first image and a second image temporally inserted in the first image is given, controlling storing of the first image of the video signal, on the basis of the temporal position of at least one of the first image and the second image in the video signal, a second storage control step of controlling of storing the second image on the basis of the temporal position of at least one of the first image and the second image in the video signal, a determination step of determining whether a current period is a period during which to display the second image, on the basis of the temporal position of at least one of the first image and the second image in the video signal, and a mixing step of mixing the stored first and second images such that the first image is displayed temporally continuously in a first area of a screen and such that if the current period is determined as a period during which the second image should be displayed, the second image is displayed in a second area of the screen.

In another aspect, the present invention provides a storage medium including a computer program stored therein for causing a computer to execute video processing comprising a first storage control step of, when a video signal including a first image and a second image temporally inserted in the first image is given, controlling storing of the first image of the video signal, on the basis of the temporal position of at least one of the first image and the second image in the video signal, a second storage control step of controlling of storing the second image on the basis of the temporal position of at least one of the first image and the second image in the video signal, a determination step of determining whether a current period is a period during which to display the second image, on the basis of the temporal position of at least one of the first image and the second image in the video signal, and a mixing step of mixing the stored first and second images such that the first image is displayed temporally continuously in a first area of a screen and such that if the current period is determined as a period during which the second image should be displayed, the second image is displayed in a second area of the screen.

In another aspect, the present invention also provides a computer program for causing a computer to execute video processing comprising a first storage control step of, when a video signal including a first image and a second image temporally inserted in the first image is given, controlling storing of the first image of the video signal, on the basis of the temporal position of at least one of the first image and the second image in the video signal, a second storage control step of controlling of storing the second image on the basis of the temporal position of at least one of the first image and the second image in the video signal, a determination step of determining whether a current period is a period during which to display the second image, on the basis of the temporal position of at least one of the first image and the second image in the video signal, and a mixing step of mixing the stored first and second images such that the first image is displayed temporally continuously in a first area of a screen and such that if the current period is determined as a period during which the second image should be displayed, the second image is displayed in a second area of the screen.

In another aspect, the present invention also provides a video processing apparatus comprising first storage control means for, when a video signal including a first image and one or more continuous second images temporally inserted in the first image is given, controlling storing of the first image of the video signal, on the basis of the temporal position of at least one of the first image and the one or more second images in the video signal, second storage control means for controlling storing of the one or more second images on the basis of the temporal position of at least one of the first image and the one or more second images in the video signal, and mixing means for mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

Preferably, the first image is a main program image in the video signal, and the second image is a commercial image.

The video processing apparatus may further comprise image detection means for detecting the second image from the video signal, and the first storage control means may control storing of the first image of the video signal in accordance with detection of the second image by the image detection means, the second storage control means may control storing of the second image of the video signal in accordance with detection of the second image by the image detection means, and the mixing means may mix the first image and the second image by sequentially selecting the stored first image or second image in accordance with detection of the second image by the image detection means.

The video processing apparatus may further comprise reception control means for controlling receiving of position information indicating a position of the second image in the video signal, and the first storage control means may control storing of the first image of the video signal in accordance with the position information, the second storage control means may control storing of the second image of the video signal in accordance with the position information, and the mixing means may mix the first image and the second image by sequentially selecting the stored first image or second image in accordance with the position information.

In another aspect, the present invention provides a video processing method comprising a first storage control step of, when a video signal including a first image and one or more continuous second images temporally inserted in the first image is given, controlling storing of the first image of the video signal, on the basis of the temporal position of at least one of the first image and the one or more second images in the video signal, a second storage control step of controlling storing of the one or more second images on the basis of the temporal position of at least one of the first image and the one or more second images in the video signal, and a mixing step of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

In another aspect, the present invention provides a storage medium including a computer program stored therein for causing a computer to execute video processing comprising a first storage control step of, when a video signal including a first image and one or more continuous second images temporally inserted in the first image is given, controlling storing of the first image of the video signal, on the basis of the temporal position of at least one of the first image and the one or more second images in the video signal, a second storage control step of controlling storing of the one or more second images on the basis of the temporal position of at least one of the first image and the one or more second images in the video signal, and a mixing step of mixing the first image and the one or more second images by sequentially selecting the stored first image or one or more second images on the basis of the temporal position of the one or more second images in the video signal such that the number of-directly adjacent second images in the mixed images is smaller than or at most equal to the number of directly adjacent second images in the original video signal.

In another aspect, the present invention also provides a computer program for causing a computer to execute video processing comprising a first storage control step of, when a video signal including a first image and one or more continuous second images temporally inserted in the first image is given, controlling storing of the first image of the video signal, on the basis of the temporal position of at least one of the first image and the one or more second images in the video signal, a second storage control step of controlling storing of the one or more second images on the basis of the temporal position of at least one of the first image and the one or more second images in the video signal, and a mixing step of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

In the video processing apparatus, the video processing method, the storage medium, and the program according to the first aspect of the invention, when a video signal including a first image and a second image temporally inserted in the first image is given, storing of the first image of the video signal is controlled on the basis of the temporal position of at least one of the first image and the second image in the video signal, and storing of the second image of the video signal is controlled on the basis of the temporal position of at least one of the first image and the second image in the video signal. After completion of recording the video signal in the above-described manner, a video signal with a reconstructed configuration is produced by mixing the recorded first image and second image. In the reconstruction process, a determination as to whether a current period is a period in which the second image should be displayed is made on the basis of the temporal position of at least one of the first image and the second image in the original video signal, and the first and second images are mixed such that the first image is displayed temporally continuously in a first area of the screen and the second image is displayed in a second area of the screen during a period determined as a period in which the second image should be displayed.

The video processing apparatus may be constructed in an independent fashion or may be a part responsible for video processing in a recording/playback apparatus.

In the video processing apparatus, the video processing method, the storage medium, and the program according to the second aspect of the invention, when a video signal including a first image and one or more second images temporally inserted in the first image is given, the video signal is recorded such that storing of the first image of the video signal is controlled on the basis of the temporal position of the one or more second images in the video signal, and storing of the one or more second images of the video signal is controlled on the basis of the temporal position of the one or more second images in the video signal. After completion of recording the video signal in the above-described manner, a video signal with a reconstructed configuration is produced by mixing the recorded first image and second image such that the recorded first image or second image is sequentially selected depending on the temporal position of the one or more second images in the video signal, and the selected image is put into a sequence of images such that the number of directly adjacent second images in the reconstructed video signal is smaller than or at most equal to the number of adjacent second images in the original video signal.

The present invention in the first aspect makes it possible for a user to continuously view a main program without a break. Furthermore, in addition to the capability of continuously presenting a main program without break, the invention also provides the capability of presenting a commercial to a user. The present invention in the second aspect provides the capability of reducing a commercial break period. The reduction in the commercial break period allows a user to return to the main program without being disturbed for a long time by commercials.

BRIEF DESCRIPTION OF THE DRAWINGS

FIG. 16 is a diagram showing a specific example of a commercial candidate table;

FIG. 17 is a diagram showing a manner of calculating feature values;

DESCRIPTION OF THE PREFERRED EMBODIMENTS

The present invention is described in further detail below with reference to specific embodiments. In the following description of specific embodiments, constitutive parts of the invention described in claims correspond to specific parts in the respective embodiments as follows. The purpose of the following description of correspondence in parts between claims and embodiments is only to indicate that a specific embodiment corresponding to each claim is presented herein in the description. Note that the purpose of the following description is not to limit the possible parts in embodiments to those described below. Contrary, the respective parts of the invention can be embodied in various fashions. Conversely, a description of a specific example of a part embodying a constitutive part of the invention according to a particular claim does not mean that the specific example of the part cannot embody a part of the invention other than that described.

Also note that the following description does not mean that specific embodiments described below are all claimed in the form of corresponding claims. The present invention can have further another claim that corresponds to some specific embodiment described herein but that is not currently included in the claims. That is, the following description does not prohibit the future possibility of dividing the present invention or making an amendment to add a claim.

Figure 24:
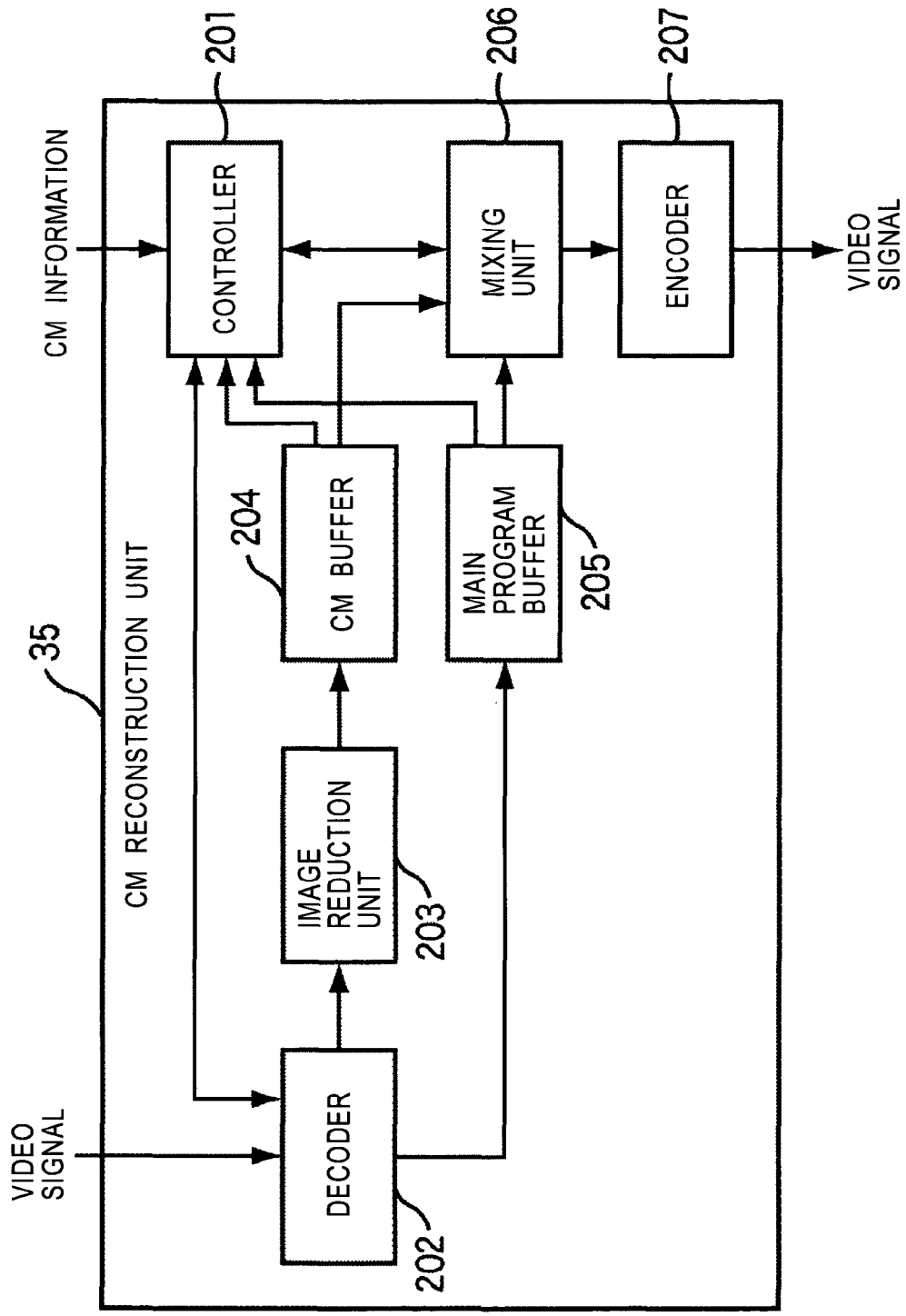
FIG. 24 is a block diagram showing an example of a structure of a commercial reconstruction unit.

A video processing apparatus described in claim 1 comprises first storage control means (corresponding to, for example, a main program buffer 205 shown in FIG. 24) for, when a video signal including a first image and a second image temporally inserted in the first image is given, controlling storing of the first image of the video signal, on the basis of the temporal position of at least one of the first image and the second image in the video signal, second storage control means (corresponding to, for example, a commercial buffer 204 shown in FIG. 24) for controlling of storing the second image on the basis of the temporal position of at least one of the first image and the second image in the video signal, determination means (corresponding to, for example, a controller 201 shown in FIG. 24) for determining whether a current period is a period during which to display the second image, on the basis of the temporal position of at least one of the first image and the second image in the video signal, and mixing means (corresponding to, for example, a mixer 206 shown in FIG. 24) for mixing the stored first and second images such that the first image is displayed temporally continuously in a first area of a screen and such that if the current period is determined as a period during which the second image should be displayed, the second image is displayed in a second area of the screen.

Figure 6:
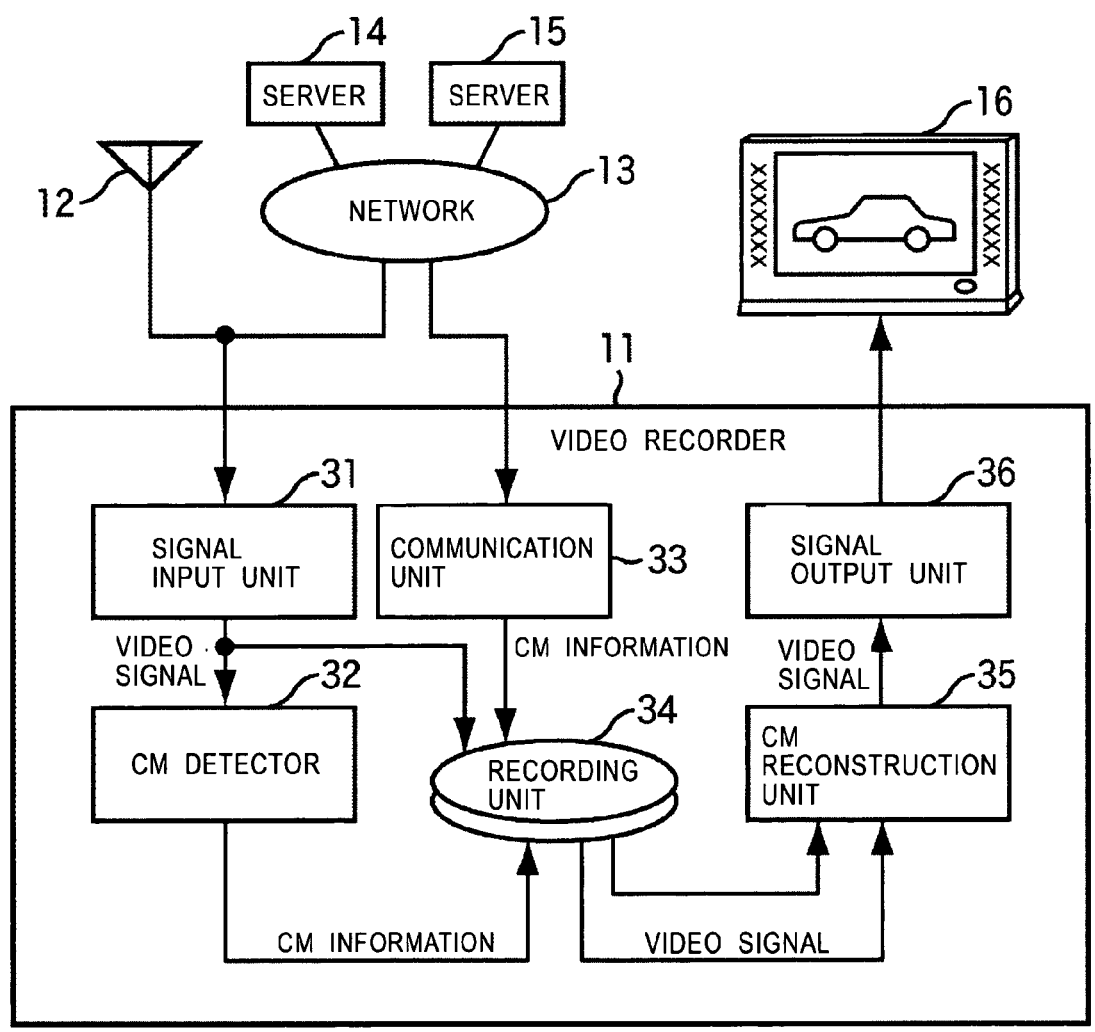
FIG. 6 is a block diagram showing a recording apparatus according to an embodiment of the present invention.

A video processing apparatus described in claim 3 further comprises image detection means (corresponding to, for example, a commercial detector 32 shown in FIG. 6) for detecting the second image from the video signal, wherein the first storage control means controls storing of the first image of the video signal in accordance with detection of the second image by the image detection means, the second storage control means controls storing of the second image of the video signal in accordance with detection of the second image by the image detection means, and the determination means determines whether the current period is a period during which to display the second image, in accordance with detection of the second image by the image detection means.

A video processing apparatus described in claim 4 further comprises reception control means (corresponding to, for example, a communication unit 33 shown in FIG. 6) for controlling receiving of position information indicating a position of at least one of the first image and the second image in the video signal, wherein the first storage control means controls storing of the first image of the video signal in accordance with the position information, the second storage control means controls storing of the second image of the video signal in accordance with the position information, and the determination means determines whether the current period is a period during which to display the second image, on the basis of the position information.

A video processing apparatus described in claim 5 further comprises reduction means (corresponding to, for example, an image reduction unit 203 shown in FIG. 24) for reducing the second image, wherein the second storage means controls storing of the reduced second image, and the mixing means mixes the stored first image and the reduced second image.

Figure 37:
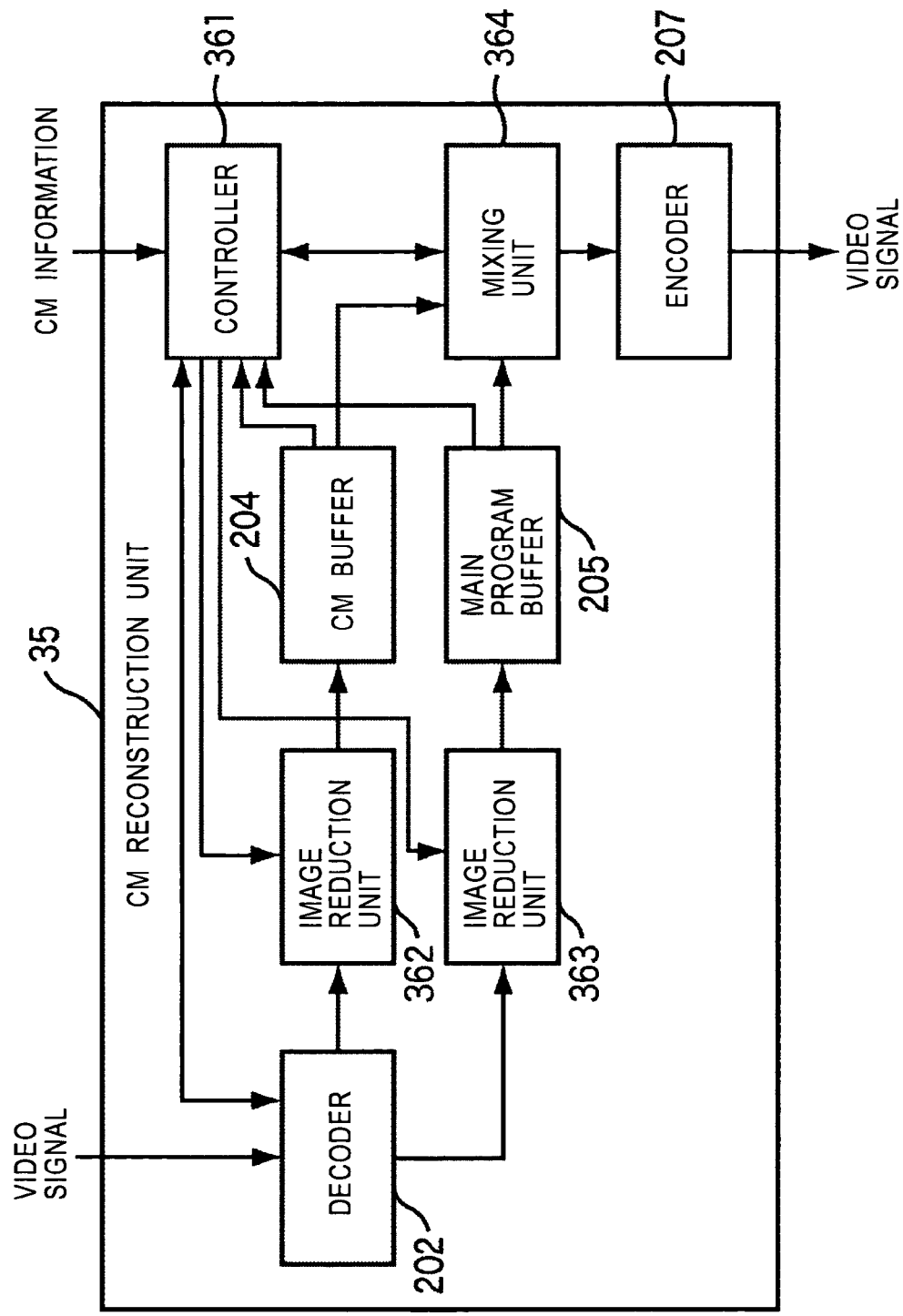
FIG. 37 is a block diagram showing still another example of the structure of the commercial reconstruction unit.

A video processing apparatus described in claim 6 comprises first reduction means (corresponding to, for example, an image reduction unit 363 shown in FIG. 37) for reducing the first image, and second reduction means (corresponding to, for example, an image reduction unit 362 shown in FIG. 37) for reducing the second image, wherein the first storage means controls storing of the reduced first image, the second storage means controls storing of the reduced second image, and he mixing means mixes the stored reduced first image and reduced second image.

A video processing apparatus described in claim 10 further comprises storage means (corresponding to, for example, a recording unit 34 shown in FIG. 6) for storing the video signal, wherein the first storage control means controls storing of the first image of the video signal read from the storage means, and the second storage control means controls storing of the second image of the video signal read from the storage means.

A video processing apparatus described in claim 11 further comprises storage means (corresponding to, for example, a recording unit 34 shown in FIG. 30) for storing the video signal including the first image and the second image mixed together by the mixing means.

A video processing method described in claim 12 comprises a first storage control step (corresponding to, for example, step S205 shown in FIG. 25) of, when a video signal including a first image and a second image temporally inserted in the first image is given, controlling storing of the first image of the video signal, on the basis of the temporal position of at least one of the first image and the second image in the video signal, a second storage control step (corresponding to, for example, step S204 shown in FIG. 25) of controlling of storing the second image on the basis of the temporal position of at least one of the first image and the second image in the video signal, a determination step (corresponding to, for example, step S221 shown in FIG. 26) of determining whether a current period is a period during which to display the second image, on the basis of the temporal position of at least one of the first image and the second image in the video signal, and a mixing step (corresponding to, for example, steps S224 and S227 shown in FIG. 26) of mixing the stored first and second images such that the first image is displayed temporally continuously in a first area of a screen and such that if the current period is determined as a period during which the second image should be displayed, the second image is displayed in a second area of the screen.

In a storage medium including a computer program stored therein for causing a computer to execute video processing described in claim 13, the video processing comprises a first storage control step (corresponding to, for example, step S205 shown in FIG. 25) of, when a video signal including a first image and a second image temporally inserted in the first image is given, controlling storing of the first image of the video signal, on the basis of the temporal position of at least one of the first image and the second image in the video signal, a second storage control step (corresponding to, for example, step S204 shown in FIG. 25) of controlling of storing the second image on the basis of the temporal position of at least one of the first image and the second image in the video signal, a determination step (corresponding to, for example, step S221 shown in FIG. 26) of determining whether a current period is a period during which to display the second image, on the basis of the temporal position of at least one of the first image and the second image in the video signal, and a mixing step (corresponding to, for example, steps S224 and S227 shown in FIG. 26) of mixing the stored first and second images such that the first image is displayed temporally continuously in a first area of a screen and such that if the current period is determined as a period during which the second image should be displayed, the second image is displayed in a second area of the screen.

In a computer program for causing a computer to execute video processing described in claim 14, the video processing comprises a first storage control step (corresponding to, for example, step S205 shown in FIG. 25) of, when a video signal including a first image and a second image temporally inserted in the first image is given, controlling storing of the first image of the video signal, on the basis of the temporal position of at least one of the first image and the second image in the video signal, a second storage control step (corresponding to, for example, step S204 shown in FIG. 25) of controlling of storing the second image on the basis of the temporal position of at least one of the first image and the second image in the video signal, a determination step (corresponding to, for example, step S221 shown in FIG. 26) of determining whether a current period is a period during which to display the second image, on the basis of the temporal position of at least one of the first image and the second image in the video signal, and a mixing step (corresponding to, for example, steps S224 and S227 shown in FIG. 26) of mixing the stored first and second images such that the first image is displayed temporally continuously in a first area of a screen and such that if the current period is determined as a period during which the second image should be displayed, the second image is displayed in a second area of the screen.

Figure 47:
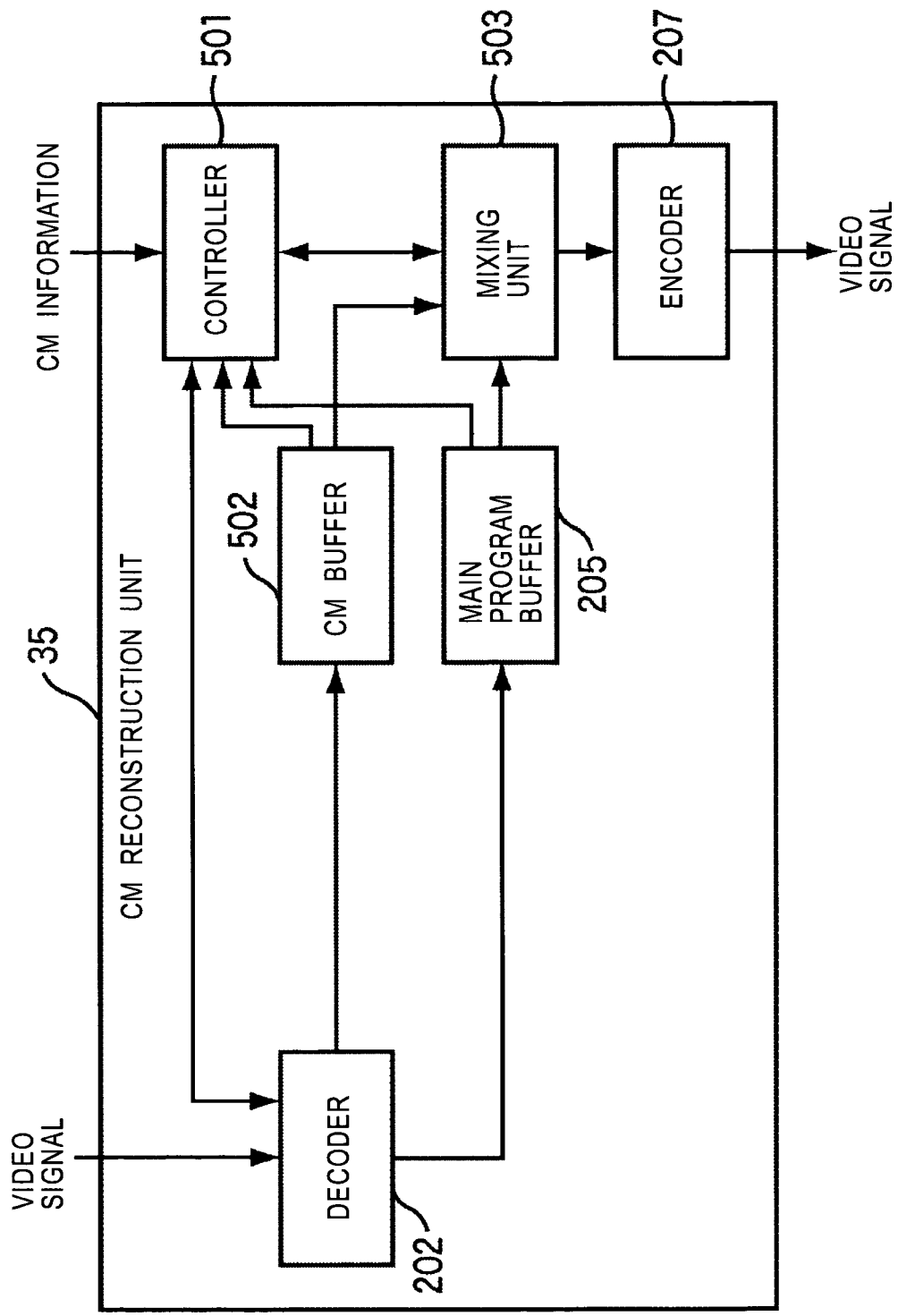
FIG. 47 is a block diagram showing still another example of the structure of the commercial reconstruction unit.

A video processing apparatus described in claim 15 comprises first storage control means (corresponding to, for example, main program buffer 205 shown in FIG. 47) for, when a video signal including a first image and one or more continuous second images temporally inserted in the first image is given, controlling storing of the first image of the video signal, on the basis of the temporal position of at least one of the first image and the one or more second images in the video signal, second storage control means (corresponding to, for example, commercial buffer 502 shown in FIG. 47) for controlling storing of the one or more second images on the basis of the temporal position of at least one of the first image and the one or more second images in the video signal; and mixing means (corresponding to, for example, mixer 503 shown in FIG. 47) for mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

A video processing apparatus described in claim 17 further comprises image detection means (corresponding to, for example, a commercial detector 32 shown in FIG. 6) for detecting the second image from the video signal, wherein the first storage control means controls storing of the first image of the video signal in accordance with detection of the second image by the image detection means, the second storage control means controls storing of the second image of the video signal in accordance with detection of the second image by the image detection means, and the mixing means mixes the first image and the second image by sequentially selecting the stored first image or second image in accordance with detection of the second image by the image detection means.

A video processing apparatus described in claim 18 further comprises reception control means (corresponding to, for example, a communication unit 33 shown in FIG. 6) for controlling receiving of position information indicating a position of the second image in the video signal, wherein the first storage control means controls storing of the first image of the video signal in accordance with the position information, the second storage control means controls storing of the second image of the video signal in accordance with the position information, and the mixing means mixes the first image and the second image by sequentially selecting the stored first image or second image in accordance with the position information.

A video processing method described in claim 19 comprises a first storage control step (corresponding to, for example, step S504 shown in FIG. 49) of, when a video signal including a first image and one or more continuous second images temporally inserted in the first image is given, controlling storing of the first image of the video signal, on the basis of the temporal position of at least one of the first image and the one or more second images in the video signal, a second storage control step (corresponding to, for example, step S503 shown in FIG. 49) of controlling storing of the one or more second images on the basis of the temporal position of at least one of the first image and the one or more second images in the video signal, and a mixing step (corresponding to, for example, steps S521 to S524 shown in FIG. 50) of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

In a storage medium including a computer program stored therein for causing a computer to execute video processing described in claim 20, the video processing comprises a first storage control step (corresponding to, for example, step S504 shown in FIG. 49) of, when a video signal including a first image and one or more continuous second images temporally inserted in the first image is given, controlling storing of the first image of the video signal, on the basis of the temporal position of at least one of the first image and the one or more second images in the video signal, a second storage control step (corresponding to, for example, step S503 shown in FIG. 49) of controlling storing of the one or more second images on the basis of the temporal position of at least one of the first image and the one or more second images in the video signal, and a mixing step (corresponding to, for example, steps S521 to S524 shown in FIG. 50) of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

In a computer program for causing a computer to execute video processing described in claim 21, the video processing comprises a first storage control step (corresponding to, for example, step S504 shown in FIG. 49) of, when a video signal including a first image and one or more continuous second images temporally inserted in the first image is given, controlling storing of the first image of the video signal, on the basis of the temporal position of at least one of the first image and the one or more second images in the video signal, a second storage control step (corresponding to, for example, step S503 shown in FIG. 49) of controlling storing of the one or more second images on the basis of the temporal position of at least one of the first image and the one or more second images in the video signal, and a mixing step (corresponding to, for example, steps S521 to S524 shown in FIG. 50) of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal.

FIG. 6 is a block diagram showing a recording apparatus according to an embodiment of the present invention. In this recording apparatus according to the present embodiment, when a video signal including a main broadcast program (hereinafter referred to simply as a program unless it is needed to distinguish from a computer program) and commercials inserted at particular intervals of time in the main program is given, the video signal can be reconstructed as follows. First, commercials are detected from the video signal. In accordance with the detection result, main program images and commercial images are mixed such that main program images are temporally continuously displayed in a particular area of a screen and commercials are displayed in another area of the screen.

A recording apparatus 11 records a video signal and reads a recorded video signal. The video signal read by the recording apparatus 11 is supplied to a display 16. The display 16 displays an image in accordance with the video signal supplied from the recording apparatus 11.

A television broadcast signal transmitted from a broadcast station (not shown) is received by an antenna 12 and applied to the recording apparatus 11. A video signal supplied from a server 14 via a network 13 is also applied to the recording apparatus 11. Video signals to be recorded on the recording apparatus 11 are supplied not only from ground-based or satellite-based broadcast stations but may be supplied in various fashions. For example, video signals may also be supplied from cable television stations or the like via the network 13 such as the Internet. The present invention is not limited to particular types of broadcasting or communications, as long as a video signal is supplied to the recording apparatus 11.

The network 13 is a communication network such as a LAN (Local Area Network) or the Internet via which various kinds of data such as a video signal or commercial information supplied from the server 14 or 15 are supplied to the recording apparatus 11 by means of wired or wireless communication. The server 14 supplies a video signal to the recording apparatus 11 via the network 13. The server 15 supplies commercial information to the recording apparatus 11 via the network 13.

The commercial information refers to information indicating a position in time of at least one of a main program and a commercial in a video signal. For example, the commercial information indicates a time at which a commercial begins and a time at which the commercial ends, with respect to the beginning of a video signal. More specifically, for example, the commercial information indicates a frame number of a first frame of a commercial and a frame number of a last frame of the commercial, wherein the frame numbers are defined with respect to the beginning of a video signal.

Alternatively, with respect to the beginning of a video signal, commercial information may indicate a time at which a main program starts after the end of a commercial and a time at which a commercial starts after the end of the main program.

The recording apparatus 11 includes a signal input unit 31, a commercial detector 32, a communication unit 33, a recording unit 34, a commercial reconstruction unit 35, and a signal output unit 36.

A video signal input to the recording apparatus 11 is applied to the signal input unit 31. The signal input unit 31 includes a tuner for receiving a ground-based or satellite-based broadcast signal or a cable television signal. The signal input unit 31 acquires the video signal input to the recording apparatus 11 and supplies the acquired video signal to the commercial detector 32 and the recording unit 34. The signal input unit 31 may be a network interface such as a NIC (Network Interface Card) for receiving a video signal supplied from the server 14 via the network 13 or a receiving unit such as a modem.

The commercial detector 32 detects commercials inserted at intervals of time in a main program of a video signal. More specifically, the commercial detector 32 detects commercials from a video signal by means of a process that will be described later and produces commercial information associated with the video signal on the basis of the detection result. The produced commercial information is supplied to the recording unit 34.

The commercial detector 32 may produce commercial information on the basis of EPG (Electronic Program Guide) information associated with digital broadcast programs.

The communication unit 33 transmits a commercial information supply request to the server 15 via the network 13 and receives commercial information transmitted from the server 15 in response to the request. That is, the communication unit 33 receives commercial information associated with a video signal of a particular program, supplied from the server 15 via the network 13, and the communication unit 33 supplies the received commercial information to the recording unit 34.

The recording unit 34 stores the video signal supplied from the signal input unit 31 and the commercial information supplied from the commercial detector 32 or the communication unit 33 on a fixed storage medium or a removal storage medium, such as a hard disk, an optical disk, an electrooptical disk, or a semiconductor memory, which is installed inside the recording unit 34 or mounted on the recording unit 34. Note that commercial information is stored in relation with a corresponding video signal (program).

The commercial reconstruction unit 35 reads commercial information and the video signal from the recording unit 34 and reconstructs a video signal by mixing the commercial image and the main program image included in the video signal read from the recording unit 34.

Figure 7:
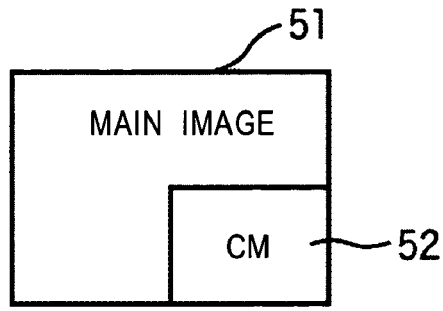
FIG. 7 is a diagram showing an example of a manner in which a commercial image is inserted in a main program image.
Figure 8:
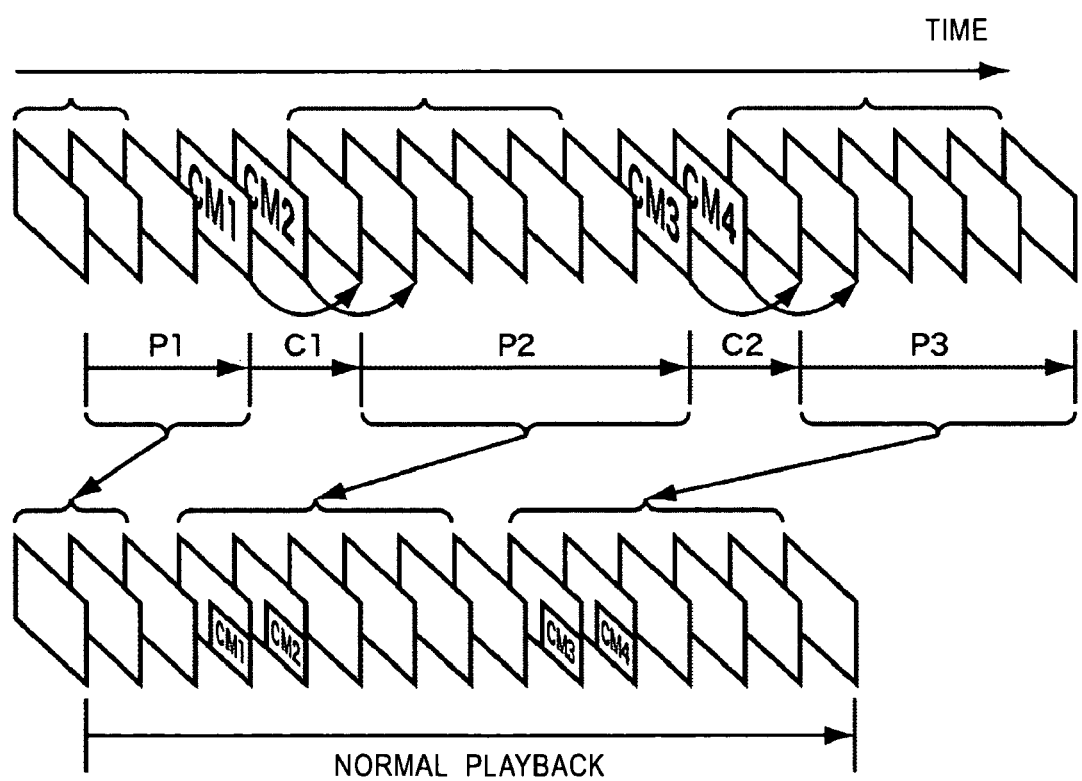
FIG. 8 is a diagram showing in more detail the manner in which commercial images are inserted in main program images.

FIGS. 7 and 8 show an example of a manner in which an image is displayed in accordance with a video signal reconstructed by the commercial reconstruction unit 35.

FIG. 7 shows an example of a manner in which a main program and a commercial image are displayed simultaneously on the screen in accordance with a reconstructed video signal. In television broadcasting, as described earlier, a main program and a commercial are transmitted time-sequentially. The commercial reconstruction unit 35 reconstructs the main program and the commercial received in time-sequentially, in terms of temporal order or spatial position. More specifically, for example, the commercial reconstruction unit 35 reconstructs a video signal such that a main program image 51 of a main program is displayed in a full screen area of the screen and a commercial image 52 is overlaid thereon in a small area in the bottom right corner.

FIG. 8 shows an example of a manner in which a main program and a commercial image are reconstructed in terms of not only spatial position but also temporal position. The recording unit 34 directly records the video signal acquired via the signal input unit 31. That is, the video signal is recorded in the recording unit 34 in the same order as that in which the video signal is broadcasted. In the specific example shown in FIG. 8, the video signal is recorded in the recording unit 34 in the following order: a main program in period P1, a commercial in period C1, a main program in period P2, a commercial in period C2, and a main program in period P3.

The commercial reconstruction unit 35 reads the video signal from the recording unit 34, reduces the commercial image corresponding to the period C1, and mixes the reduced commercial image corresponding to the period C1 with the main program corresponding to the period P2 following the period C1 such that the reduced commercial image corresponding to the period C1 is spatially inserted in the image of the main program corresponding to the period P2. Similarly, the commercial reconstruction unit 35 reduces the commercial image corresponding to the period C2 and mixes the reduced commercial image corresponding to the period C2 with the main program corresponding to the period P3 following the period C2 such that the reduced commercial image corresponding to the period C2 is spatially inserted in the image of the main program corresponding to the period P3.

When a user views the played-back video signal reconstructed such that a reduced commercial image is spatially inserted in an image of a main program that was originally located at a temporal position after the reduced commercial image, the main program is played back temporally continuously as shown on the bottom of FIG. 8.

Referring again to FIG. 6, the commercial reconstruction unit 35 supplies the video signal reconstructed (mixed) in the above-described manner to the signal output unit 36. The signal output unit 36 decodes the video signal supplied from the commercial reconstruction unit 35 as required, and outputs the decoded video signal to the display 16. The display 16 displays an image of the reconstructed main program and commercial in accordance with the video signal supplied form the recording apparatus 11.

As described above, the present embodiment of the invention makes it possible for a user to enjoy main programs played back continuously without being interrupted by a commercial break. Note that because commercials are also displayed and thus the technique according to the present invention does not result in the above-described problem that would occur if commercials were removed.

In the recording apparatus 11 with the structure shown in FIG. 6, because a video signal and commercial information are recorded in the recording unit 34, it is sufficient for the commercial detector 32 to perform commercial detection process only once for one video signal.

Because the video signal acquired via the signal input unit 31 is directly recorded in the recording unit 34, the recording apparatus 11 is also capable of directly playing back the video signal without mixing the main program and the commercials.

Figure 9:
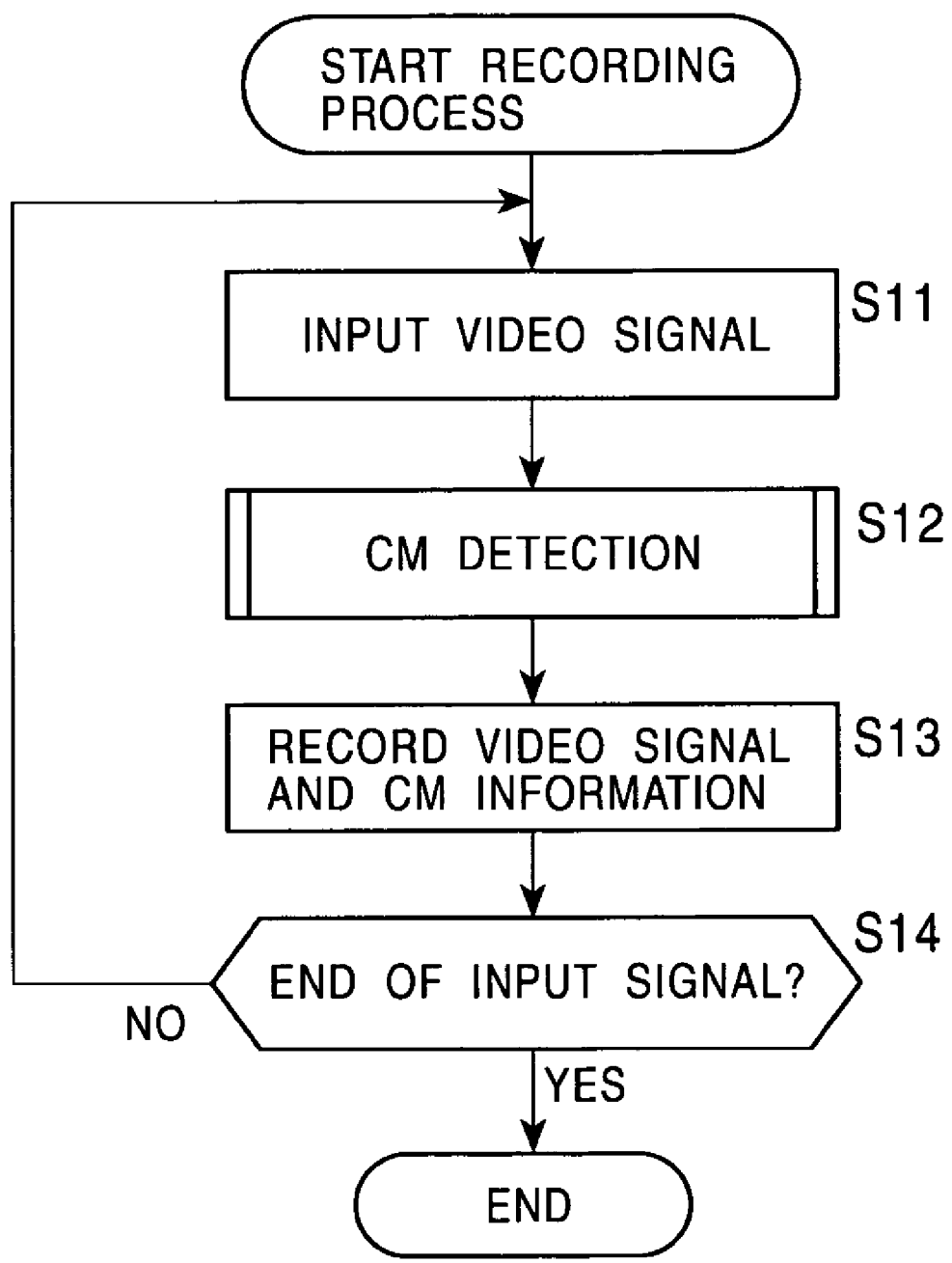
FIG. 9 is a flow chart shoring a recording process.

FIG. 9 is a flow chart showing a recording process performed by the recording apparatus 11. In step S11, the signal input unit 31 acquires a video signal supplied from a wireless or cable broadcast station or supplied from the server 14 via the network 13. In step S12, the commercial detector 32 detects commercials from the video signal acquired in step S11. The details of the commercial detection process will be described later.

In step S12 described above, the communication unit 33 may receive, from the server 15 via the network 13, commercial information indicating positions of commercial images in a video signal.

In step S13, the recording unit 34 records the video signal acquired in step S11 and the commercial information obtained in step S12. In step S14, the recording apparatus 11 determines whether the end of the input signal is reached. If it is determined that the end of the input signal is not yet reached, the process returns to step S11 and the process described above is repeated.

If it is determined in step S14 that the end of the input signal is reached, the process is ended.

As described above, the recording unit 34 records a video signal together with commercial information indicating a temporal position of at least one of a main program and a commercial included in the video signal.

Figure 10:
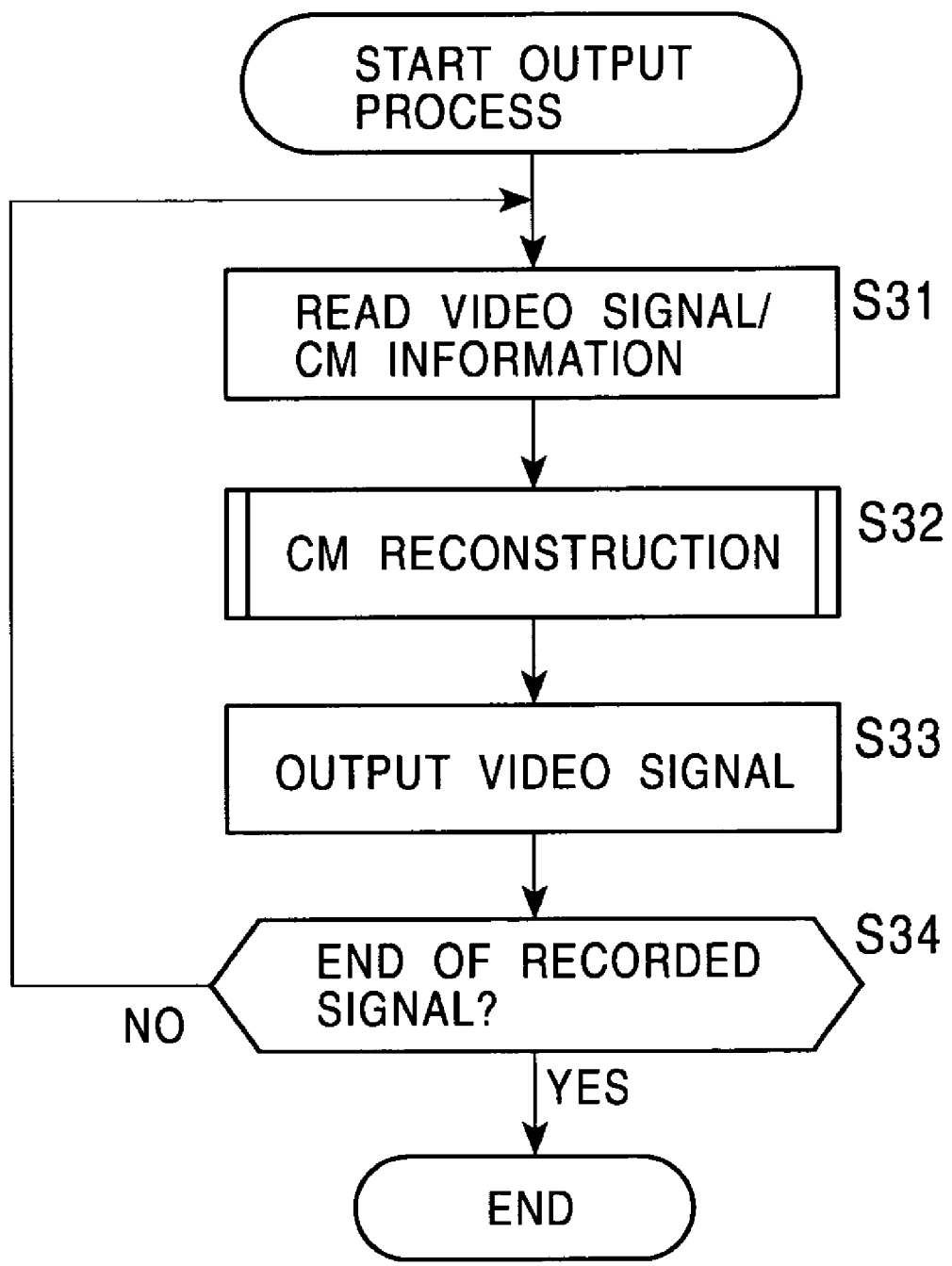
FIG. 10 is a flow chart showing an output process.

FIG. 10 is a flow chart showing an output process performed by the recording apparatus 11. In step S31, the recording unit 34 reads a video signal and associated commercial information by reproducing the video signal and associated commercial information recorded on a storage medium installed in or mounted on the recording unit 34. The read video signal and commercial information are supplied to the commercial reconstruction unit 35.

In step S32, the commercial reconstruction unit 35 reconstructs the video signal in terms of commercials on the basis of the commercial information supplied from the recording unit 34. The details of the reconstruction of commercials will be described later. The commercial reconstruction unit 35 supplies the video signal reconstructed in terms of commercials to the signal output unit 36.

In step S33, as required, the signal output unit 36 decodes the video signal and supplies the resultant video signal to the display 16. In step S34, the recording apparatus 11 determines whether the end of the recorded signal is reached. If it is determined that the end of the recorded signal is not yet reached, the process returns to step S31, and the above-described process is repeated. In the case in which it is determined in step S34 that the end of the recorded signal is reached, the process is ended.

Before the details of the commercial detector 32 are described below, principles of detecting a commercial from a video signal or and audio signal of a television broadcast signal are described.

In general, television broadcast commercials are produced in accordance with the broadcast standards of respective broadcast stations, and the length of each commercial is limited to a small number of values. For example, in Japan, each commercial is produced such that the length thereof is 15 sec, 30 sec, or 60 sec, with a special rare exception.

Because a commercial is produced independently of a main program or other commercials and is inserted in a television broadcast stream, a reduction in audio signal level occurs before and after the commercial, and an abrupt transition in video signal occurs. Note that the reduction in audio signal level does not necessarily mean that an absolutely silent period (with very low-level noise) occurs. Depending on actual situations in which a main program is switched to a commercial, the audio signal level does not necessarily drop to zero.

As described above, almost all commercials have a common distinctive characteristic that the length is limited to one of (a small number of) particular values, the audio signal becomes low at the beginning and the end, and an abrupt transition in image occurs. In the present invention, the distinctive characteristic commonly possessed by almost all commercials is referred to simply as a "distinctive characteristic", and a corresponding condition used to detect the distinctive characteristic is referred to as a "necessary condition". Therefore, by detecting signal parts satisfying the necessary conditions from a television broadcast signal, it is possible to detect commercial candidates (that is, signal parts that are very likely to be commercials) substantially without missing signals that are actually commercials. However, a main program also includes many parts that satisfy the necessary conditions, and thus the detection based on only the necessary conditions has a possibility that a part of a main program is detected as a commercial candidate.

In addition to the necessary conditions, many commercials tend to have the following characteristics, although all commercials do not have such characteristics.

1) The audio signal level becomes lower before and after a commercial (immediately before a commercial and immediately before a main program after the commercial) than a main program.

2) In most cases, the length of such a substantially silent period between a commercial and a main program or between a commercial and another commercial is several hundred seconds.

3) In many cases, non-silent periods in a television broadcast program are shorter than the standard commercial lengths (15 sec, 30 sec, 60 sec, etc.) by about 100 msec, but not shorter by 1 sec.

4) In most cases, the correlation coefficient between left and right channels of a stereophonic signal is significantly less than 1.

5) The audio signal level during a commercial period is rather greater than in a main program period.

6) In most cases, commercial programs are broadcasted in a stereophonic mode.

7) In many cases, a plurality of commercials are broadcasted successively in a commercial period.

8) In commercial periods, image cuts are frequently switched.

9) Conversely, in some commercials, cuts are switched a very small number of times (as is the case with a commercial using a still image).

10) In many cases, a great change in characteristic of an audio signal occurs at a boundary between a main program and a commercial or between a commercial and another commercial.

11) Many commercials include both a speech and music.

12) A program broadcasted in a period immediately before or after the hour is very likely to be a commercial.

13) A program broadcasted in a period immediately before or after the half hour is also very likely to be a commercial.

14) Depending on the genre of a program, a commercial is broadcasted in a particular time period (for example, in the case of a soccer broadcast, a commercial occurs in a halftime period).

Hereinafter, conditions described above will be referred to as "additional conditions". The additional conditions can appear in a television broadcast signal as a result of the restriction imposed on production of commercials. That is, commercials are produced under the restriction that the standards must be satisfied, high effectiveness of advertisement must be achieved in a limited short time, and requirements associated with a program configuration must be met. Although all commercial do not necessarily satisfy the additional conditions, the additional conditions are very important measures of the likelihood of a commercial.

In television broadcasts, there is no possibility that a plurality of images or voices/sounds are transmitted on the same channel at the same time. That is, in detection of a signal part (commercial candidate) that is likely to be a commercial included in a television broadcast signal, when a plurality of parts that satisfy the above-described conditions are detected as candidates for commercials, if they overlap in some period each other, at least one of overlapping periods cannot be a correct commercial period. In the present invention, the above-described condition in terms of impossibility of overlapping is referred to as the "logical condition".

Thus, in a highly reliable fashion, the commercial detector 32 can detect a commercial part from a television broadcast signal on the basis of the necessary conditions, the logical conditions, and the additional conditions.

More specifically, the commercial detector 32 detects candidates for commercials (signal parts that are likely to be commercials) that satisfy the necessary conditions from a television signal, and narrows down the candidates by performing statistical evaluation of the likelihood of commercials on the basis of the additional conditions. Furthermore, the commercial detector 32 detects a correct commercial period from overlapping candidates on the basis of the logical conditions. Thus, the commercial detector 32 can detect a commercial in a highly reliable fashion.

Figure 11:
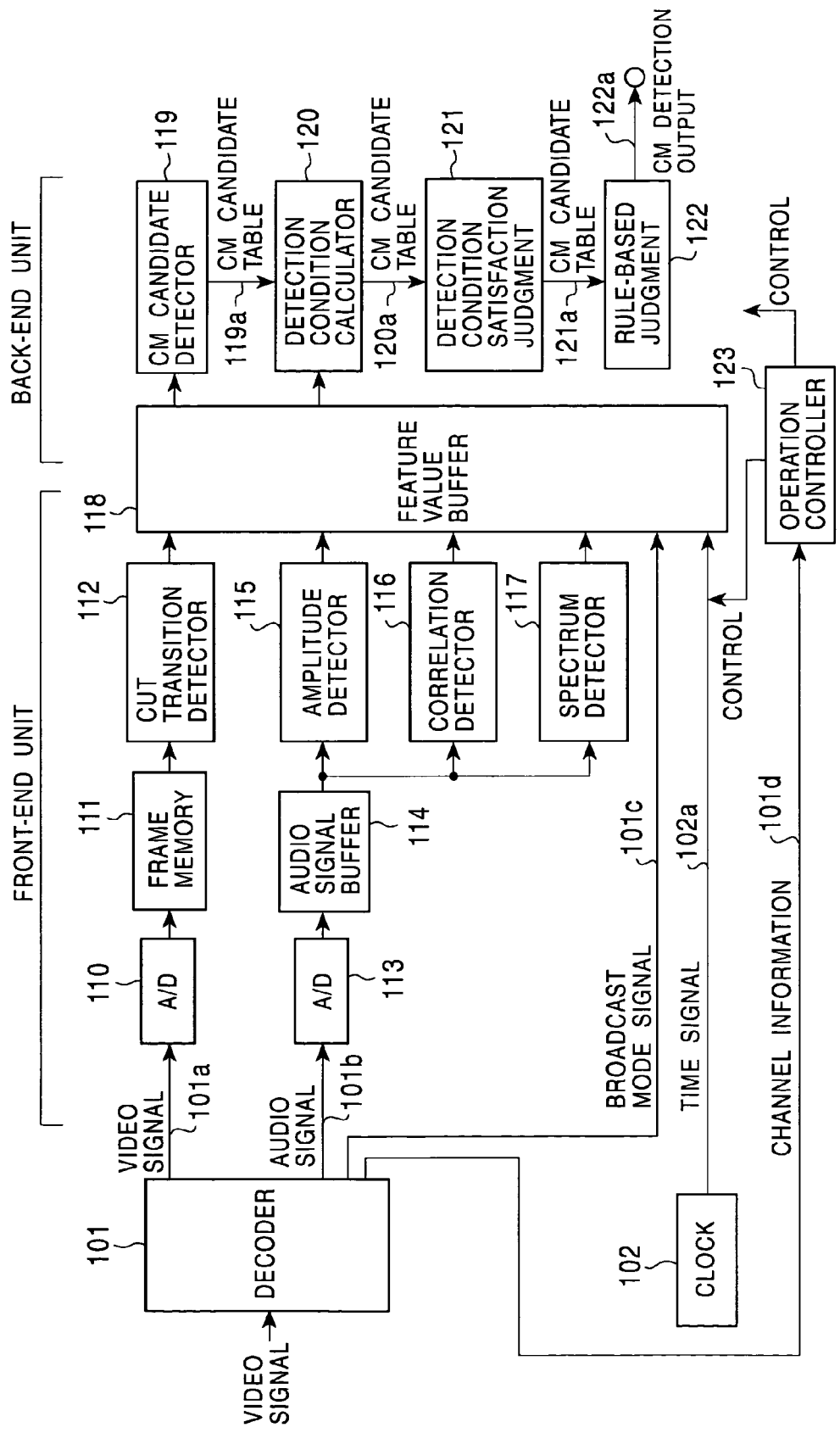
FIG. 11 is a block diagram showing the details of a commercial detector.

FIG. 11 shows the details of the commercial detector 32. The commercial detector 32 include a decoder 101, a clock 102, a front-end unit, and a back-end unit. The commercial detector 32 also includes an operation controller 123 that determines whether a currently selected broadcast channel is a channel having no possibility that a commercial is broadcasted on that channel, on the basis of channel information 101d supplied from the decoder 101. The details of the channel information 101d will be described later. Depending on the result of the determination, the operation controller 123 controls various parts shown in FIG. 11 not to perform the commercial detection operation.

A video signal acquired via the signal input unit is input to the decoder 101. The decoder 101 detects the broadcast mode (monophonic mode, stereo mode, or sound-multiplex mode) of the video signal, and decodes modulated video and audio signals in the video signal. In this decoding process, the modulated audio signal is decoded depending on the detected broadcast mode. A video signal 101a, an audio signal 101b, and a broadcast mode signal 101c obtained as a result of the decoding performed by the decoder 101 are respectively supplied to an analog-to-digital converter 110, an analog-to-digital converter 113, and a feature value buffer 118.

The clock 102 generates a time signal 102a indicating a time and supplies the generated time signal 102a to the feature value buffer 118. To the feature value buffer 118, the channel information 101d indicating the currently selected broadcast channel is also supplied from the decoder 101. The channel information 101d is used by the commercial detector 32 to determine whether the currently selected channel has no possibility that commercials are broadcasted on that channel. If the commercial detector 32 determines on the basis of the channel information 101d that the broadcast channel of the video signal being currently decoded by the decoder 101 has no possibility that commercials are broadcasted on that channel, the commercial detector 32 disables the commercial detection operation. Although in this specific embodiment, the commercial detector 32 determines whether to perform commercial detection in accordance with the channel information 101d, the signal input unit 31 may control the commercial detection operation performed by the commercial detector 32 in accordance with the channel information 101d.

The front-end unit shown in FIG. 11 is described in further detail below.

In FIG. 11, the video signal 101a supplied from the decoder 101 is converted into a digital signal by the analog-to-digital converter 110 and stored in a frame memory 111. The frame memory 111 has a storage capacity of storing at least two frames of video signal. The video signal is read from the frame memory 111 frame by frame and supplied to a cut transition detector 112.

The cut transition detector 112 detects a frame at which an image abruptly changes (hereinafter, such a frame will be referred to as an image transition frame) and a frame having uniform luminance (hereinafter, referred to as a uniform luminance frame), from the video signal supplied on a frame-by-frame basis from the frame memory 111.

To detect such a frame, the cut transition detector 112 calculates the sum of squares of difference of luminance of each pixel between two frames temporally adjacent to each other stored in the frame memory 111. If the calculated sum of squares is greater than a predetermined value, the cut transition detector 112 determines that a frame that is at a temporally trailing position of the two adjacent frames is an image transition frame at which an image abruptly changes. The cut transition detector 112 also calculates the variance of the luminance of each frame stored in the frame memory 111, and determines that a frame is a uniform luminance frame if the calculated variance of the frame is less than a predetermined value. When the frame-to-frame interval (about 30 msec in the NTSC standard) is not equal to a frame period associated with audio signal processing described later, subsampling is performed to obtain frames at intervals equal to the frame period.

The process performed by the cut transition detector 112 to detect image transition frames and uniform luminance frames is described in further detail below.

Herein, let X be the horizontal size of a digitized sample of a video signal, Y the vertical size, x and y the pixel number in the horizontal and vertical directions, $I_n(x, y)$ an nth frame of image, and $I_{n-1}(x, y)$ an (n-1)th frame of image at a temporal position one frame before the nth frame. The sum, D[n], of squires of luminance difference of each pixel between the nth frame and the (n-1)th frame is given by equation (1), and the variance, V[n], of the luminance of the nth frame is given by equation (2).

$$D[n] = \sum_{x=0}^{X-1}\sum_{y=0}^{Y-1} (I_n(x, y) - I_{n=1}(x, y))^2 \quad (1)$$

$$V[n] = \frac{1}{XY}\sum_{x=0}^{X-1}\sum_{y=0}^{Y-1} I_n^2(x, y) - \left(\frac{1}{XY}\sum_{x=0}^{X-1}\sum_{y=0}^{Y-1} I_n(x, y)\right)^2 \quad (2)$$

The cut transition detection signal C[n] from the cut transition detector 112 is given by equation (3).

$$C[n] = \begin{cases} 1 & (D[n] \geq D_{thsd} \text{ or } V[n] \leq V_{thsd}) \\ 0 & (D[n] < D_{thsd} \text{ and } V[n] > V_{thsd}) \end{cases} \quad (3)$$

where $D_{thsd}$ denotes a predetermined threshold value with which the above-described sum of squares is compared to detect image transition frames, and $V_{thsd}$ denotes a predetermined threshold value with which the above-described variance of luminance is compared to detect uniform luminance frames.

The cut transition detection signal C[n] from the cut transition detector 112 is supplied as a feature value of the video signal to the feature value buffer 118.

When the luminance difference between two adjacent frames of the video signal is determined, a memory capable of storing two frames of image signals is needed, and a calculation for two frames of video signal is required. To ease the above requirement in terms of memory capacity and computational complexity, instead of processing the entire frame at the same time, each frame may be divided into a plurality of blocks with a proper size and the luminance difference may be calculated on the block-by-block basis. Instead of determining luminance difference at each pixel between frames, the luminance histogram may be calculated for each frame and the difference in luminance histogram between frames may be calculated. Alternatively, the mean luminance of each frame may be calculated, and the difference in mean luminance between frames may be calculated. Conversely, if a high enough memory capacity is available and a high computational complexity is allowed, the luminance difference or the histogram difference may be calculated for each color component of a color video signal, to achieve a further higher reliability in detection.

The audio signal 101b output from the decoder 101 is converted into a digital signal by the analog-to-digital converter 113, and stored in an audio signal buffer 114. The audio signal buffer 114 is a memory capable of storing two channel stereo audio signals (left-channel and right-channel signals) for a predetermined period of time $T_1$ (for example, a period corresponding to one frame, that is, 30 msec). The audio signal is read from the audio signal buffer 114 and supplied to an amplitude detector 115, a correlation detector 116, and a spectrum detector 117.

The amplitude detector 115 detects the mean square amplitude for a short predetermined period $T_2$ (for example, 15 msec), wherein the predetermined short period $T_2$ is referred to as a frame period. More specifically, when two-channel stereo audio signals (left-channel and right-channel audio signals) are stored in the audio signal buffer 114, the amplitude detector 115 calculates the short-time mean square amplitude at predetermined intervals $T_2$ (15 msec, that is, every frame period) from the two-channel stereo audio signals $S_L[m]$ and $S_R[m]$ read from the audio signal buffer 114, where m (m=0, 1, . . . , M-1) denotes a sample number corresponding to a discrete time of each data, and a maximum number M corresponds to one frame length $T_1$.

More specifically, the amplitude detector 115 calculates the mean square amplitude A[n] of the two-channel (left and right channel) audio signal of an nth frame according to equation (4). That is, the mean square amplitude is calculated every 15 msec (every ½ frame period), and the mean value of the values calculated every 15 msec for a period of 30 msec (one frame period) is calculated. The result is employed as the mean square amplitude of one frame.

$$A[n] = \frac{1}{4M} \sum_{m=0}^{M-1} (S_L[m+nT_2] + S_R[m+nT_2])^2 \quad (4)$$

The mean square amplitude A[n] detected and output by the amplitude detector 115 is supplied as one of feature values associated with the audio signal to the feature value buffer 118.

The correlation detector 116 detects the unnormalized correlation coefficient of the audio signal for each frame from the audio signal stored in the audio signal buffer 114, and also detects short-time energy for use in normalization performed later. More specifically, when two channel (left and right channel) audio signals are stored in the audio signal buffer 114, the correlation detector 116 calculates the normalized correlation coefficient between left-channel and right-channel audio signals for each frame from the left-channel and the right-channel audio signals $S_L[m]$ and $S_R[n]$ read from the audio signal buffer 114, and also calculates short-time energy for use in normalization performed later.

More specifically, the correlation detector 116 calculates the correlation coefficient $A_{LR}[n]$ between left-channel and right-channel audio signals of an nth frame according to equation (5), the audio signal energy $A_{LL}[n]$ of the left-channel audio signal according to equation (6), and the audio signal energy $A_{RR}[n]$ of the right-channel audio signal according to equation (7).

$$A_{LR}[n] = \sum_{m=0}^{M-1} S_L[m+nT_2] S_R[m+nT_2] \quad (5)$$

$$A_{LL}[n] = \sum_{m=0}^{M-1} S_L^2[m+nT_2] \quad (6)$$

$$A_{RR}[n] = \sum_{m=0}^{M-1} S_R^2[m+nT_2] \quad (7)$$

The correlation coefficient $A_{LR}[n]$ and the audio signal energy $A_{LL}[n]$ and $A_{RR}[n]$ detected and output by the correlation detector 116 are supplied as feature values associated with the audio signal to the feature value buffer 118.

The spectrum detector 117 calculates the short-time spectrum using the audio signal stored in the audio signal buffer 114. That is, when two-channel (left-channel and right-channel) audio signals are stored in the audio signal buffer 114, the spectrum detector 117 calculates the short-time spectrum from the left-channel and the right-channel audio signals $S_L[m]$ and $S_R[n]$ read from the audio signal buffer 114.

More specifically, the spectrum detector 117 determines the discrete spectrum F[k;n] of the two-channel (left-channel and right-channel) audio signals of an nth frame, where k (k=0, 1, . . . , K31 1) denotes a number corresponding to a discrete frequency. The discrete spectrum F[k;n] is given by equation (8).

$$F[k;n] = \left| \sum_{m=0}^{M-1} (S_L[m] + S_R[m]) e^{-2\pi jmk/M} \right|^2 \quad (8)$$

The calculation of equation (8) can be performed, for example, by means of fast Fourier transform (FFT) or linear predictive coding (LPC).

The short-time discrete spectrum F[k;n] calculated and output by the spectrum detector 117 is supplied as a feature value associated with the audio signal to the feature value buffer 118.

The broadcast mode signal 101c supplied from the decoder 101 is converted into a discrete value at a time corresponding to each audio signal frame.

More specifically, the broadcast mode signal 101c of the nth frame is given as a value B[n] according to equation (9).

$$B[n] = \begin{cases} 0 & \text{(monophonic mode)} \\ 1 & \text{(stereophonic mode)} \\ 2 & \text{(sound multiplex mode)} \end{cases} \quad (9)$$

The discrete value B[n] obtained from the broadcast mode signal 101c is supplied as a feature value associated with the television broadcast signal to the feature value buffer 118.

The time signal 102a supplied from the clock 102 is also converted into a discrete value T[n] at a time corresponding to each audio signal frame, and supplied as a feature value to the feature value buffer 118.

The feature value buffer 118 retains, over a predetermined period of time $T_3$, feature values G[n] including the cut transition detection signal C[n] supplied from the cut transition detector 112, the mean square amplitude A[n] supplied from the amplitude detector 115, the correlation coefficient $A_{LR}[n]$ supplied from the correlation detector 116, the audio signal energy $A_{LL}[n]$ and $A_{RR}[n]$, the short-time discrete spectrum F[k;n], the discrete value B[n] of the broadcast mode signal 101c, and the discrete value T[n] of the time signal 102a, represented in equation (10). The period $T_3$ is set to a value such that at least one full commercial can be stored. For example, $T_3$ is set to 80 sec.

$$G[n] = \{C[n], A[n], A_{LR}[n], A_{LL}[n], A_{RR}[n], F[k;n], B[n], T[n]\} \quad (10)$$

The above-described parts in the range from the analog-to-digital converter 110 to the feature value buffer 118 form the front-end unit in the commercial detector 32 shown in FIG. 11. The process performed by the front-end unit is descried below with reference to flow charts shown in FIGS. 12 and 13. Of the process performed by the front-end unit, the process on the video signal 101a is performed in accordance with the flow (steps 130 to 132) shown in FIG. 12, and the process on the audio signal 101b, the broadcast mode signal 101c, and the time signal 102a is performed in accordance with the flow (steps S133 to S140) shown in FIG. 13.

The details of the commercial detection process in step S12 in FIG. 9 are shown in the form of flow charts in FIGS. 12, 13, 14, and 20.

Figure 12:
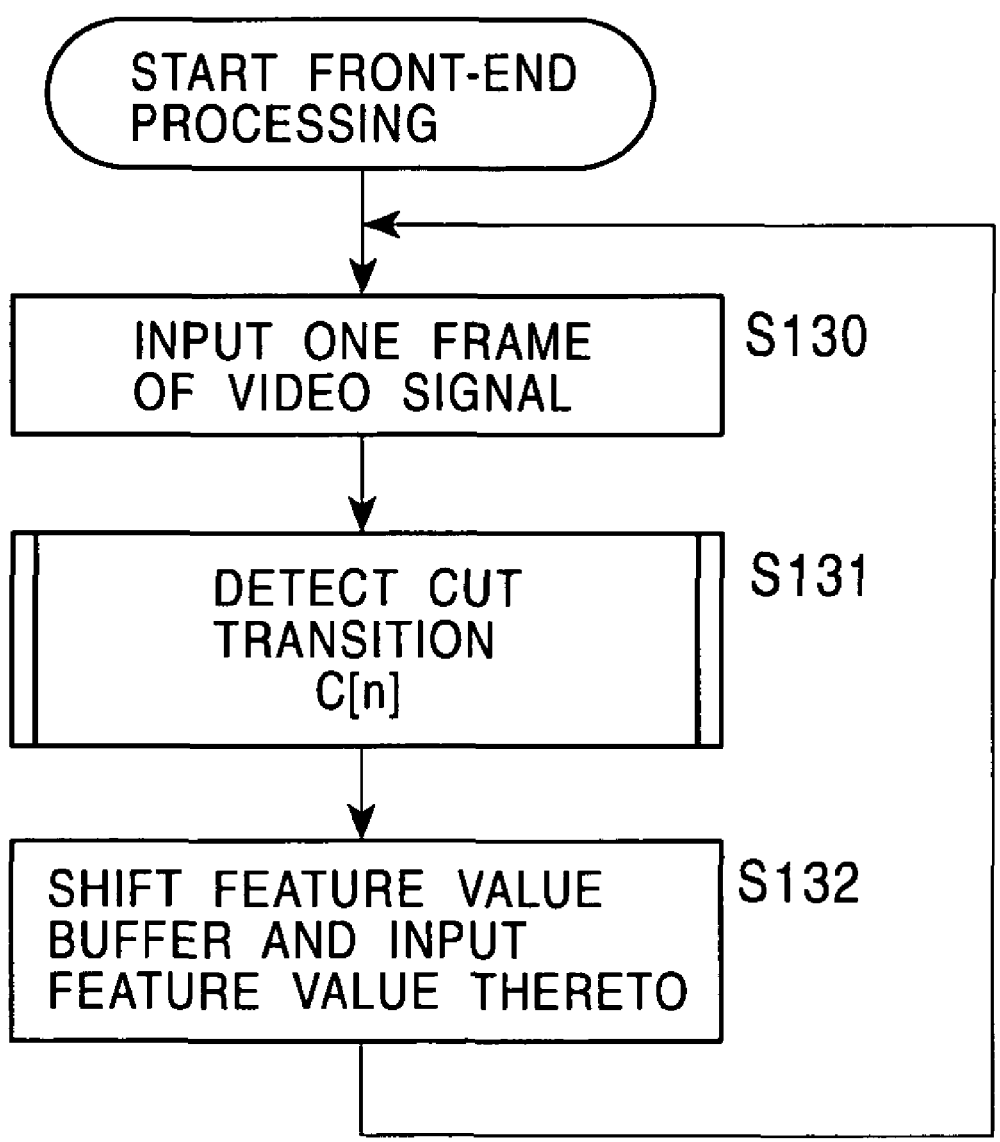
FIG. 12 is a flow chart showing a process performed by a front-end unit.

First, the process performed on the video signal 101a is described with reference to FIG. 12. In the front-end unit, in step S103, at least one frame of video signal 101a is converted into a digital signal by the analog-to-digital converter 110 and stored in the frame memory 111. The frame memory 111 deals with one frame of video signal 101a as one sample. If one frame of video signal 101a is input to the frame memory 111, the video signal 101a already existing in the frame memory 111 is shifted by one frame, and oldest one frame of video signal 101a is pushed out.

Thereafter, in step S131, in the front-end unit, the video signal 101a is read from the frame memory 111 and supplied to the cut transition detector 112, which determines the cut transition detection signal C[n] as described earlier.

In the next step S132, in the front-end unit, the cut transition detection signal C[n] is stored in the feature value buffer 118.

Figure 13:
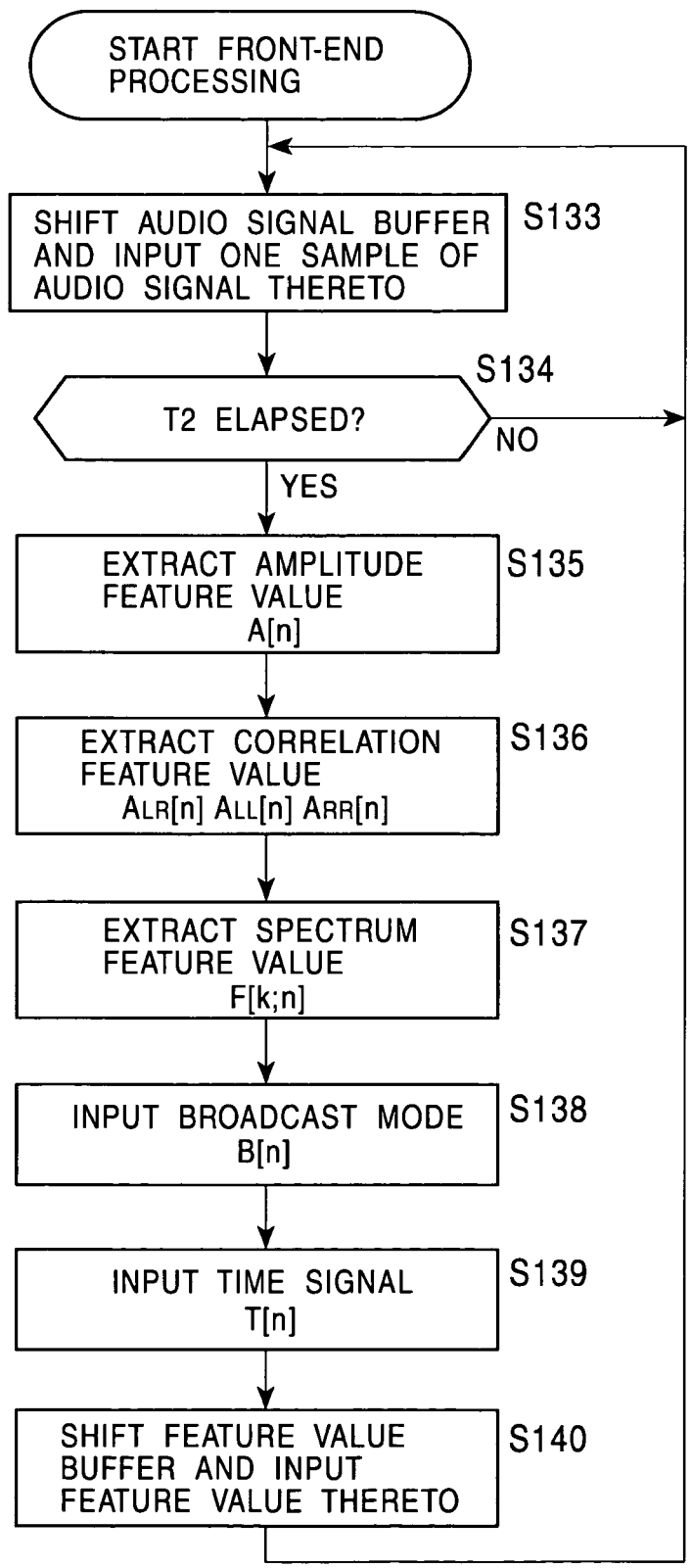
FIG. 13 is a flow chart showing a process performed by a front-end unit.

Now, with reference to FIG. 13, the process performed on the audio signal 101b is described below. In the front-end unit, in steps 133 and 134, the analog-to-digital converter 113 converts the audio signal 101b into digital form and stores the resultant digital audio signal in the audio signal buffer 114 such that the audio signal 101b with a length of at least one frame period $T_2$ is stored in the audio signal buffer 114. The audio signal buffer 114 is adapted to handle an audio signal 101b with a length of one frame period $T_2$ as one sample. If one sample of audio signal 101b corresponding to one frame period $T_2$ is input to the audio signal buffer 114, an audio signal 101b already existing in the audio signal buffer 114 is shifted by one frame period $T_2$, and oldest existing one sample of audio signal 101b with a length of one frame period $T_2$ is pushed out.

If at least one sample of audio signal 101b with the length of one frame period $T_2$ is stored in the audio signal buffer 114, then, in step S135, the front-end unit reads the audio signal 101b from the audio signal buffer 114 and supplies it to the amplitude detector 115 to determine the mean square amplitude A[n] as described above.

In step S136, the front-end unit also supplies the audio signal 101b stored in the audio signal buffer 114 to the correlation detector 116 to determine the correlation coefficient $A_{LR}[n]$ and the audio signal energies $A_{LL}[n]$ and $A_{RR}[n]$ as described above.

In step S136, the front-end unit also supplies the audio signal 101b stored in the audio signal buffer 114 to the spectrum detector 117 to determine the short-time discrete spectrum F[k;n] as described above.

In step S138, the front-end unit determines the discrete value B[n] from the broadcast mode signal 101c supplied from the decoder 101 as described above, and also determines the discrete value T[n] from the time signal 102a supplied from the clock 102 as described above.

The front-end unit stores, in the feature value buffer 118, the feature values G[n] including the cut transition detection signal C[n] supplied from the cut transition detector 112, the mean square amplitude A[n] supplied from the amplitude detector 115, the correlation coefficient $A_{LR}[n]$ supplied from the correlation detector 116, the audio signal energy $A_{LL}[n]$ and $A_{RR}[n]$, the short-time discrete spectrum F[k;n], the discrete value B[n] of the broadcast mode signal 101c, and the discrete value T[n] of the time signal 102a, obtained in the above-described steps.

Referring again to FIG. 11, the back-end unit is described below. In the following description, number n denotes the frame number of the feature values stored frame by frame in the feature value buffer 118. G[0] denotes a set of feature values for a newest frame, and the value of n increases as the time goes back to the past. When feature values associated with a new frame are input, all data stored in the feature value buffer 118 are shifted by 1 (frame numbers are shifted by 1).

In FIG. 11, the feature values stored in the feature value buffer 118 are sent frame by frame to the commercial candidate detector 119.

The commercial candidate detector 119 detects candidates for commercial periods frame by frame by examining the necessary conditions that are satisfied by almost all commercials. As described earlier, the necessary conditions include follows: (1) The audio signal level is low in commercial periods, that is, the audio signal level of each frame in commercial periods is less than a predetermined value (hereinafter, this condition will be referred to as an audio signal level condition); (2) An image transition occurs at a boundary of a commercial period. That is, the video signal abruptly changes at a boundary or a frame with uniform luminance appears (hereinafter, referred to as a video image condition); (3) the length of a commercial period is limited to one of particular values. That is, when two frames satisfying the above-described audio signal level condition and the video image condition are detected, if the length of the period between those two frames is equal to one of the particular values, the period is employed as a commercial candidate. (Hereinafter, this condition will be referred to as a time condition.) The necessary conditions can be expressed by equations (11), (12), and (13) using the feature values as follows.

$$A[0] < A_{thsd} \quad (11)$$

$$C[0] = 1 \quad (12)$$

$A[n_1] < A_{thsd}$ and $C[n_1] = 1$ or $A[n_2] < A_{thsd}$ and $C[n_2] = 1$ or $$A[n_3] < A_{thsd} \text{ and } C[n_3] = 1 \quad (13)$$

where $A_{thsd}$ denotes a threshold value of the square amplitude, and $n_1$, $n_2$, and $n_3$ denote standard lengths of commercial periods (in this specific embodiment, 15 sec, 30 sec, and 60 sec) expressed in units of number of frames. In practice, the length of a commercial period varies within a very small range around one of particular value, and thus $n_1$, $n_2$, and $n_3$ are allowed to have a small deviation.

Figure 14:
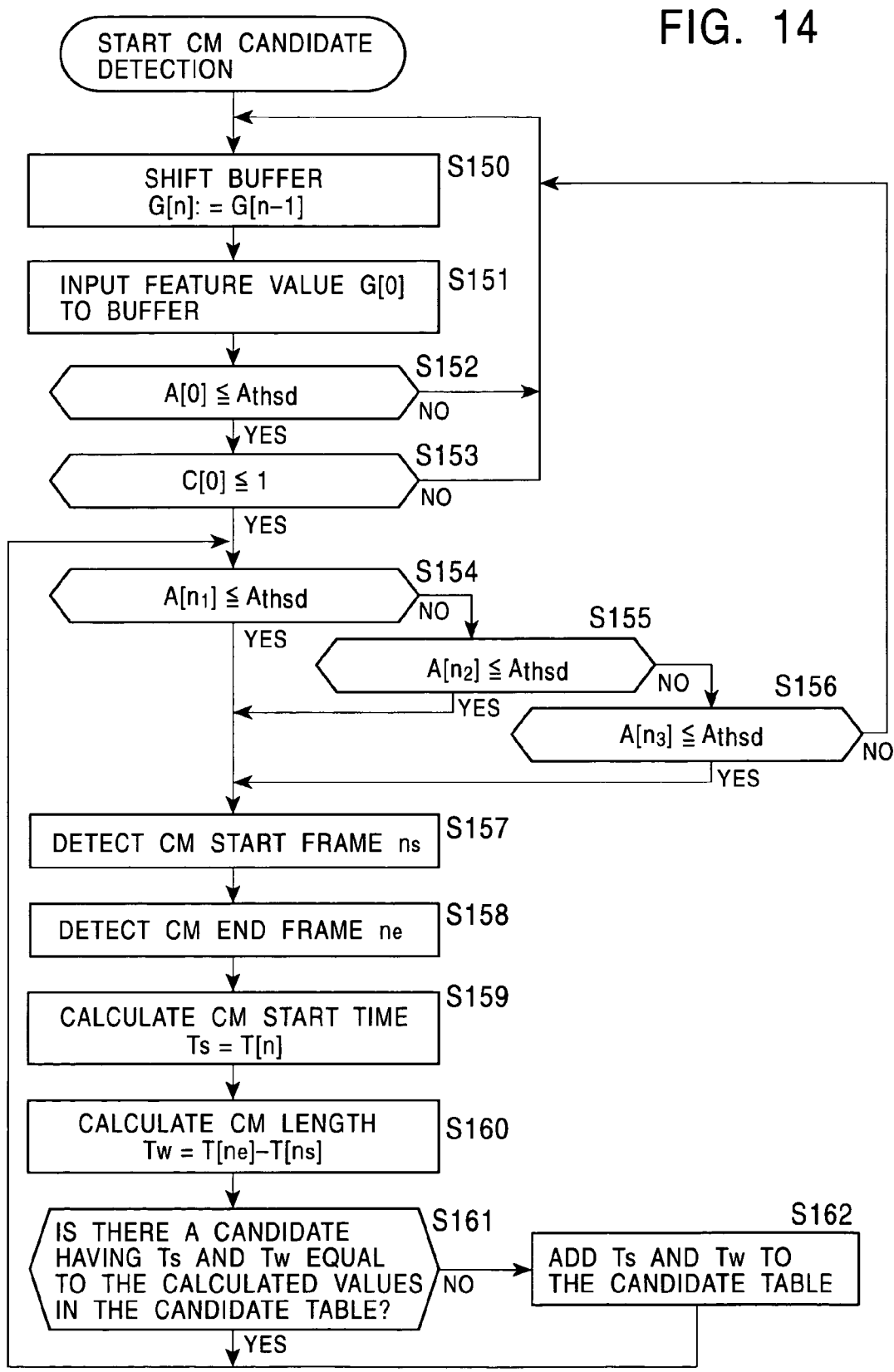
FIG. 14 is a flow chart showing a process of detecting commercial candidates.

Referring to FIG. 14, the operation of the commercial candidate detector 119 is described below.

In FIG. 14, in step S150, data stored in the feature buffer 118 is shifted, and feature values are input to the feature buffer 118 in next step S151. The shifting in step S150 and the inputting of data in step S151 are performed in a similar manner to the manner in which shifting and inputting are performed for the audio signal buffer in step S132 in FIG. 12 and in step S140 in FIG. 13, respectively. That is, inputting, shifting, and outputting of the feature value buffer 118 are performed in units of frames. That is, in the feature value buffer 118, a set of feature values of one frame is handled as one sample. When one sample of feature values is input to the feature value buffer 118, feature values already existing in the feature value buffer 118 are shifted by one frame, and an oldest sample of feature values is pushed out.

If feature values of one frame (one sample) are supplied from the feature value buffer 118 to the commercial candidate detector 119 via steps 150 and S151 described above, the commercial candidate detector 119 determines, in steps S152 and S153, whether the feature values of this frame satisfy the audio signal level condition, the video image condition, and the time condition of the necessary conditions. More specifically, the commercial candidate detector 119 determines in step S152 whether the mean square amplitude A[0] of a first frame is equal to or less than the predetermined threshold value $A_{thsd}$ of the square amplitude and in step S153 whether the cut transition detection signal C[0] is equal to 1, thereby determining whether the current frame satisfy the audio signal level condition, the video condition, and the time condition of the necessary conditions. If the commercial candidate detector 119 determines in steps S152 and S153 that the mean square amplitude A[0] is not greater than the predetermined threshold value $A_{thsd}$ of the square amplitude and that the other necessary conditions are satisfied, then the commercial candidate detector 119 employs the present frame as a commercial candidate and advances the process to step S157 (steps 154 to S156 will be described later). However, in the case in which the commercial candidate detector 119 determines that the mean square amplitude A[0] is greater than the predetermined threshold value $A_{thsd}$ of the square amplitude or that some of the other necessary conditions is not satisfied, then the commercial candidate detector 119 determines that the current frame cannot be a commercial candidate, and returns the process to step S150.

If it is determined in steps S152 and S153 that the mean square amplitude A[0] is not greater than the predetermined threshold value $A_{thsd}$ of the square amplitude and that the other necessary conditions are satisfied, and thus the process proceeds to step S157, then the commercial candidate detector 119 searches for a commercial start frame $n_s$ and furthermore in step S158 searches for a commercial end frame $n_e$. Thereafter, the commercial candidate detector 119 calculates the commercial start time $T_s$ in step S159 and the commercial length $T_w$ in step S160.

In step S171 after completion of steps S157 to S160 described above, the commercial candidate detector 119 examines a commercial candidate table that will be described later. If a candidate having the same commercial start time $T_s$ and the same commercial length $T_w$ as those calculated above is found in the commercial candidate table, then the process directly returns to step S154. However, if such a candidate is not found in the commercial candidate table, the candidate is added as a new commercial candidate to the commercial candidate table. After adding the candidate, the process returns to step S154.

In steps S154 to S156, the above-described process is performed for each of the allowed particular lengths. Thereafter, the process returns to step S150, and the above-described process is repeated for a next input.

The commercial start frame $n_s$ is given by the frame number of a frame that first exceeds, in mean square amplitude A[n], the threshold value $A_{thsd}$, of those frames appearing after an occurrence of a frame satisfying the time condition corresponding to one of $n_1$, $n_2$, and $N_3$. The commercial end frame $n_e$ is given by the frame number of a last frame that does not exceed, in terms of mean square amplitude A[n], the threshold value $A_{thsd}$, of a sequence of frames from a 0th frame to an oldest frame. The commercial start time $T_s$ is determined using the commercial start frame number $n_s$ as $T_s = T[n_s]$. Similarly, the commercial length $T_w$ is determined as $T_w = T[n_e] - T[n_s]$.

Figure 15:
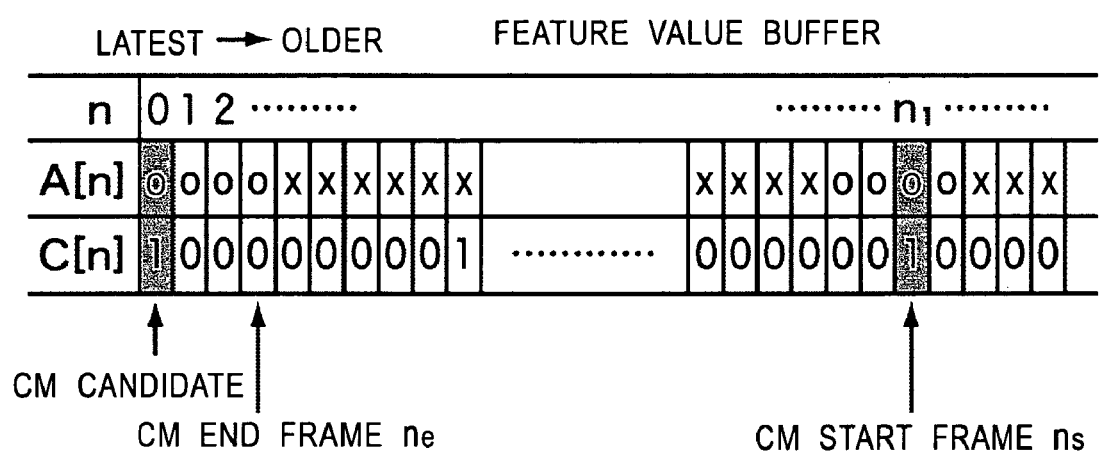
FIG. 15 is a diagram showing a specific example of a calculation associated with necessary conditions.

A specific example of a calculation associated with the necessary conditions is described below with reference to FIG. 15. In FIG. 15, frames having a value of "0" for A[n] are those frames whose mean square amplitude is not greater than the threshold value $A_{thsd}$. Frames having a value of "X" for A[n] are those frames whose mean square amplitude is greater than the threshold value $A_{thsd}$. In this specific example shown in FIG. 15, (A[0], C[0]) and (A[$n_1$], C[$n_1$]) satisfy the conditions, $n_s$ is given by the frame number of a frame that first becomes A[n]=X of those frames left to $n_1$, and $n_e$ is given by the frame number of a last frame of those successive frames with A[n]=0 right to 0.

The commercial candidate detector 119 performs the above-described process for commercial candidate detection each time feature values of one frame (one sample) are input. If a commercial candidate is detected, the detected candidate is added to the commercial candidate table.

FIG. 16 shows a specific example of a commercial candidate table. In this specific example shown in FIG. 16, items of the commercial candidate table include the start time $T_s$, the length $T_w$, the feature values $Q_1$ to $Q_{11}$ calculated by an additional condition calculator 120 that will be described later, a score R calculated by an additional condition judgment unit 121 that will be described later, and a judgment result Z. At the stage at which the commercial candidate detector 119 performs the above process, only the start time $T_s$ and the length $T_w$ are described in the commercial candidate table 119a. As described above, in the commercial candidate table, the commercial start time $T_s$ and the length $T_w$ calculated by the commercial candidate detector 119, the feature values $Q_1$ to $Q_{11}$ calculated by the additional condition calculator 120, and the score R and the score judgment result Z calculated by the additional condition judgment unit 121 are described to manage those feature values. The commercial candidate table is retained until judgment is completed as to whether entries are commercials or not. If an entry is determined as a commercial, the entry is output as a commercial detection signal 122a from a rule-based judgment unit 122 that will be described later. On the other hand, an entry determined not to be a commercial is discarded.

The commercial table 119a in which the start time $T_s$ and the length $T_w$ are described by the commercial candidate detector 119 is sent to the additional condition calculator 120.

The additional condition calculator 120 extracts feature values $Q_1$ to $Q_{11}$ associated with the commercial candidates described in the commercial candidate table, from the feature buffer 118 and the additional condition calculator 120 describes the extracted feature values $Q_1$ to $Q_{11}$ in the commercial candidate table 119a. The result is output as a commercial candidate table 120a to the additional condition judgment unit 121.

FIG. 17 shows an example of a calculation of the feature values $Q_1$ to $Q_{11}$ performed by the additional condition calculator 120.

In FIG. 17, the horizontal axis represents the frame number (corresponding to the discrete time). FIG. 17A shows the cut transition detection signal C[n] FIG. 17B the discrete value B[n] of the broadcast mode signal 101c, FIG. 17C the short-time discrete spectrum F[k;n] of the audio signal, and FIG. 17D the mean square amplitude A[n] of the audio signal. A period denoted by $n_1$ (a period between two vertical broken lines) is a commercial candidate. In FIG. 17A, the cut transition detection signal C[n] becomes 1 at positions denoted by CT (that is, a cut transition is detected at those positions). In FIG. 17B, in a period denoted by M, the broadcast is in a particular broadcast mode. In FIG. 17C, S1, S2, S3, and S4 denote periods in which spectral components appear. In FIG. 17D, AM represents a square amplitude varying with time, and $Q_1$ to $Q_{11}$ denote positions at which feature values $Q_1$ to $Q_{11}$ are calculated by the additional condition calculator 120.

Each of the feature values $Q_1$ to $Q_{11}$ calculated by the additional condition calculator 120 is described below.

The feature value $Q_1$ is a pre break length. The pre break length refers to the length of a period (pre break period) with a low audio signal level, that is, a period during which A[n] is continuously lower than the predetermined threshold value $A_{thsd}$, which appears immediately before a commercial candidate period. In the specific example shown in FIG. 17, the length BB of a period enclosed between vertical dashed lines is a pre break length $Q_1$.

The feature value $Q_2$ is a post break length. The post break length refers to the length of a period (post break period) with a low audio signal level, that is, a period during which A[n] is continuously lower than the predetermined threshold value $A_{thsd}$, which appears immediately after a commercial candidate period. In the specific example shown in FIG. 17, the length AB of a period enclosed between vertical dashed lines is a post break length $Q_2$.

The feature value $Q_3$ is a pre-break minimum amplitude, that is, a minimum value of A[n] in the pre break period.

The feature value $Q_4$ is a post-break minimum amplitude, that is, a minimum value of A[n] in the post break period.

The feature value is a left-right correlation coefficient. More specifically, the left-right correlation coefficient $Q_5$ is the correlation coefficient between a left-channel audio signal $S_L[m]$ and a right-channel audio signal $S_R[m]$ in the commercial candidate period. The left-right correlation coefficient $Q_5$ can be calculated in accordance with equation (14) using $A_{LR}[n]$, $A_{LL}[n]$, and $A_{RR}[n]$ given by equations (5) to (7).

$$Q_5 = \frac{\sum_{n=n_s}^{n_e-1} A_{LR}[n]}{\sum_{n=n_s}^{n_e-1} A_{LL}[n] \sum_{n=n_s}^{n_e-1} A_{RR}[n]} \quad (14)$$

In calculation of equation (14), although overlapping of frames causes original waveform to be partially added a predetermined time, such addition does not result in a significant effect. If a memory capacity high enough to store the entire original waveform and high processing power are available, the above calculation may be replaced with that of the cross-correlation.

The feature value $Q_6$ is a mean amplitude. More specifically, the mean amplitude $Q_6$ is the root mean square value of the amplitude of the audio signal over the commercial candidate period. The means amplitude $Q_6$ can be calculated according to equation (15).

$$Q_6 = \sqrt{\frac{1}{n_e - n_s} \sum_{n=n_s}^{n_e-1} A[n]} \quad (15)$$

In calculation of equation (15), although overlapping of frames causes original waveform to be partially added a predetermined time as in the calculation of the left-right correction coefficient, such addition does not result in a significant effect. If a memory capacity high enough to store the entire original waveform and high processing power are available, the above calculation may be replaced with the calculation of the RMS.

The feature value $Q_7$ is the number of cuts. More specifically, the feature value $Q_7$ is the number of cut transitions that occur (at positions CT in the specific example shown in FIG. 17) in the commercial candidate period. The feature value $Q_7$ is obtained by counting occurrences of C[n]=1 during a period of [$n_s$, $n_e$).

The feature value $Q_8$ is a broadcast mode. Herein, the broadcast mode refers to a most dominant broadcast mode in the commercial candidate period. The broadcast mode is determined by detecting a broadcast mode that appears most frequently of B[n] in the period of [$n_s$, $n_e$).

The feature value $Q_9$ is the number of adjacent commercial candidates. The number of adjacent commercial candidates indicates whether non-silent periods located immediately before and after a commercial candidate period are also commercial candidates. If periods located at before and after a commercial candidate are both commercial candidates, the number of adjacent commercial candidates is 2. If one of periods is a commercial candidate, the number of adjacent commercial candidates is 1. The number of adjacent commercial candidates is 0, if neither period is a commercial candidate. The number of adjacent commercial candidates is determined by examining a commercial candidate table. The determination as to whether a period located immediately after a current commercial candidate is also a commercial candidate is performed by checking whether the sum of the start time $T_s$, the length $T_w$, and the post break length $Q_2$ of the current commercial candidate (that is, $T_s+T_w+Q_2$) is equal to the start time ($T'_s$) of some commercial candidate in the commercial candidate table. Similarly, the determination as to whether a period located immediately before the current commercial candidate is also a commercial candidate is performed by checking whether the difference between the start time $T_s$ and the pre break length $Q_1$ of the current commercial candidate (that is, $T_s-Q_1$) is equal to the sum of the start time ($T'_s$) and the length $T'_w$ ($T'_s+T'_w$) of some commercial candidate in the commercial candidate table.

The feature values $Q_{10}$ and $Q_{11}$ are differential spectral energies. The differential spectral energies $Q_{10}$ and $Q_{11}$ are used to quantitatively represent a change in characteristic of an audio signal at a boundary between a commercial and a main program or between a commercial and another commercial. More specifically, the differential spectral energy is defined as the sum of squares of differences in mean spectrum between both sides of the boundary, and can be calculated according to equations (16) to (21).

$$S_1[k] = \frac{1}{N}\sum_{n=0}^{N-1} F[k; n'_e - n] \tag{16}$$

$$S_2[k] = \frac{1}{N}\sum_{n=0}^{N-1} F[k; n_s + n] \tag{17}$$

$$S_3[k] = \frac{1}{N}\sum_{n=0}^{N-1} F[k; n_e - n] \tag{18}$$

$$S_4[k] = \frac{1}{N}\sum_{n=0}^{N-1} F[k; n'_s + n] \tag{19}$$

$$Q_{10} = \frac{1}{S_{norm}^2}\sum_k (S_2[k] - S_1[k])^2 \tag{20}$$

$$Q_{11} = \frac{1}{S_{norm}^2}\sum_k (S_4[k] - S_3[k])^2 \tag{21}$$

In equations (16) to (21), N denotes the number of frames over which to calculate the mean spectrum, $n'_e$ denotes an end frame number of a non-silent period immediately before a commercial candidate period (FIG. 17), and $n'_1$ denotes a start frame number of a non-silent period immediately after the commercial candidate period. $S_1[k]$ denotes the mean spectrum of the non-silent period immediately before the commercial candidate period. $S_2[k]$ denotes the mean spectrum immediately after the start of the commercial candidate period. $S_3[k]$ denotes the mean spectrum immediately before the end of the commercial candidate period. $S_4[k]$ denotes the mean spectrum of the non-silent period immediately after the commercial candidate period. $S_{norm}$ denotes a properly selected normalization constant.

The additional condition calculator 120 adds the feature values $Q_1$ to $Q_{11}$ calculated in the above-described manner to the commercial candidate table 119a and outputs a resultant commercial candidate table 120a. The commercial candidate table 120a is sent to the additional condition judgment unit 121.

Upon receiving the commercial candidate table 120a, the additional condition judgment unit 121 non-linearly converts the feature values of the commercial candidate by using threshold functions or the like and calculates the weighted sum of the resultant values thereby calculating the score R for the commercial candidate. If the score R is greater than a predetermined value, it is determined that the commercial candidate is very likely to be a real commercial. The additional condition judgment unit 121 adds the score R and the judgment result Z to the commercial candidate table 120a and outputs a resultant table as a candidate table 121a.

Figure 18:
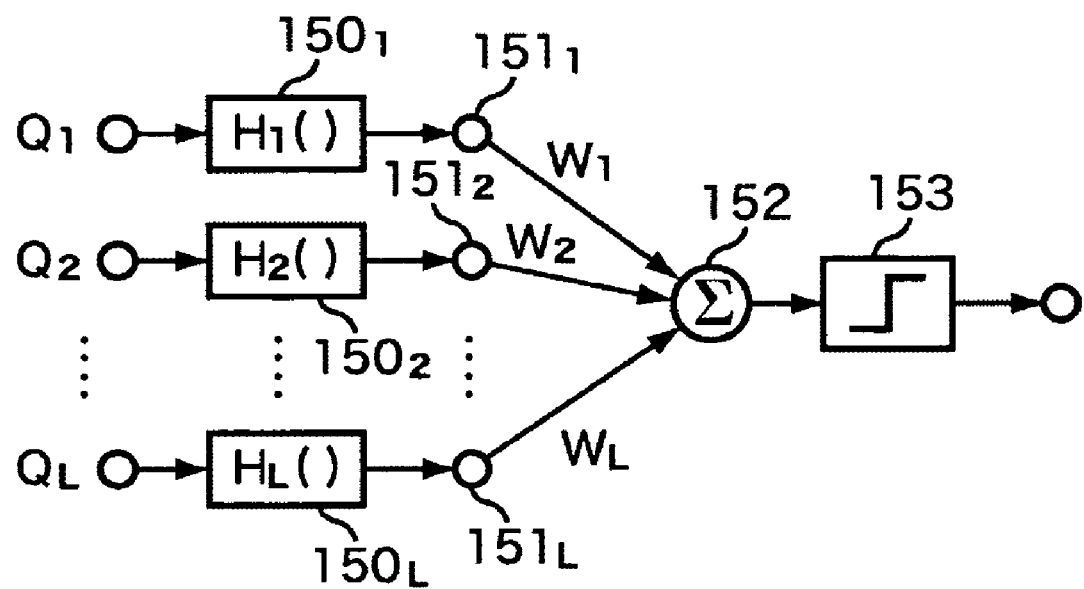
FIG. 18 is a block diagram schematically showing an additional condition judgment unit.

FIG. 18 schematically shows an additional condition judgment unit.

In FIG. 18, the feature values $Q_1$ to $Q_L$ described in the commercial candidate table 121a are respectively supplied to corresponding function calculators $150_1$ to $150_L$ and subjected to conversion processing based on corresponding parameter conversion functions $H_1()$ to $H_L()$. The respective resultant values are then multiplied by weights $W_1$ to $W_L$ by weight multipliers $151_1$ to $151_L$. After being weighted by the respective weight multipliers $151_1$ to $151_L$, the resultant feature values are supplied to a total sum calculator 152, and the score R is calculated by calculating the total sum. The score R is output from the total sum calculator 152 to a score judgment unit 153. The score judgment unit 153 compares the received score R with a predetermined value. If the score R is greater than the predetermined value, a judgment signal indicating that the commercial candidate is very likely to be a real commercial is output. Commercial candidates that are determined by the score judgment unit 153 as being lower in score than the predetermined value are removed from the commercial candidate table.

In the above-described process, the additional condition judgment unit 121 calculates the score in accordance with equation (22).

$$R = \sum_{l=1}^{L} W_l H_l(Q_1) \tag{22}$$

where $H_l()$ is a predetermined parameter conversion function corresponding to each feature value, $W_l$ is a predetermined weight, L is the number of feature values (L=11 in this specific example), and l is an arbitrary integer from 1 to L.

In a simplest case, rectangular functions are used as the parameter conversion functions $H_l()$ used in the respective function calculators $150_1$ to $150_L$. For example, a rectangular function Rect(x: $t_1$, $t_2$) shown in FIG. 19B may be used, wherein $t_1$ and $t_2$ are lower and upper limits predefined for each feature value. In this case, the rectangular function is given by equation (23) which has a value of 1 when $Q_1$ is within the range from the above-described lower limit to the upper limit and a value of 0 when $Q_1$ is not within this range.

$$H_1(Q_1) = Rect(Q_1: t_1, t_2) \tag{23}$$

In a case in which it is desirable to gradually change the function value from 0 to 1 at a boundary and from 1 to 0 at the other boundary, a Sigmoid function Sigm(x: $t_1$, $t_2$) such as that given by equation (24) may be used.

$$H_1(Q_1) = Sigm(Q_1; t_{11}, t_{21}) \frac{1}{1 + \exp(-(x - t_{11})/\sigma_{11})} \cdot \frac{1}{1 + \exp((x - t_{21})/\sigma_{21})} \tag{24}$$

Figure 19A:
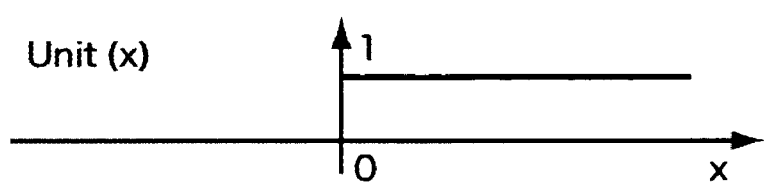
FIG. 19A is a diagram showing a unit function.
Figure 19B:
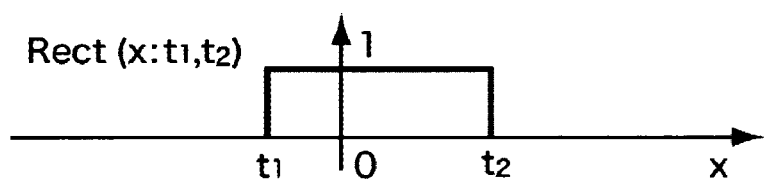
FIG. 19B is a diagram showing a rectangular function.
Figure 19C:
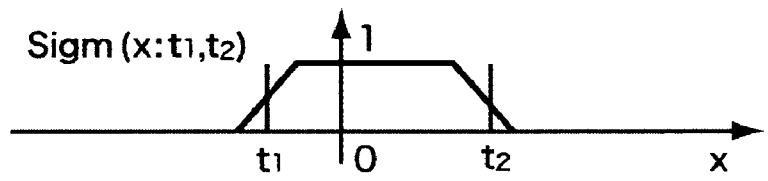
FIG. 19C is a diagram showing a Sigmoid function.

FIG. 19C shows an example of a Sigmoid function, wherein $s_{11}$ and $s_{21}$ are constants that represents changing rates at boundaries and that are predetermined depending on the distribution of feature values.

The weights $W_l$ used by the respective weight multipliers $151_1$ to $151_L$ may be determined by a user on the basis of statistical characteristics of feature values, or may be automatically determined by means of learning on known learning samples using a neural network (a specific learning may be found, for example, in "Pattern Information Processing" (written by Nakagawa and published in 1999 by Maruzen Co., Ltd.). In the above expression, l is an arbitrary integer from 1 to L.

The judgment of the score R by the judgment unit 153 is performed by thresholding the score R in accordance with, for example, equation (25).

$$Z = \text{Unit}(R-tr) \quad (25)$$

where Unit(x) is a unit step function that takes 1 for x>1 and 0 for x<0 as shown in FIG. 19A, and tr is a threshold value that is determined by a user or automatically determined by means of learning.

The commercial candidate table 121a obtained as a result of the score judgment performed by the additional condition judgment unit 121 is input to a rule-based judgment unit 122. The rule-based judgment unit 122 evaluates the received commercial candidate table 121a on the bases of a predetermined rule, and outputs a final commercial detection signal 122a indicating the start time and the length of the commercial. If there are two or more commercial candidates at the same time (hereinafter, such commercial candidates will be referred to as competing commercial candidates), the rule-based judgment unit 122 determines which one is most likely to be a commercial in accordance with the rule.

Figure 20:
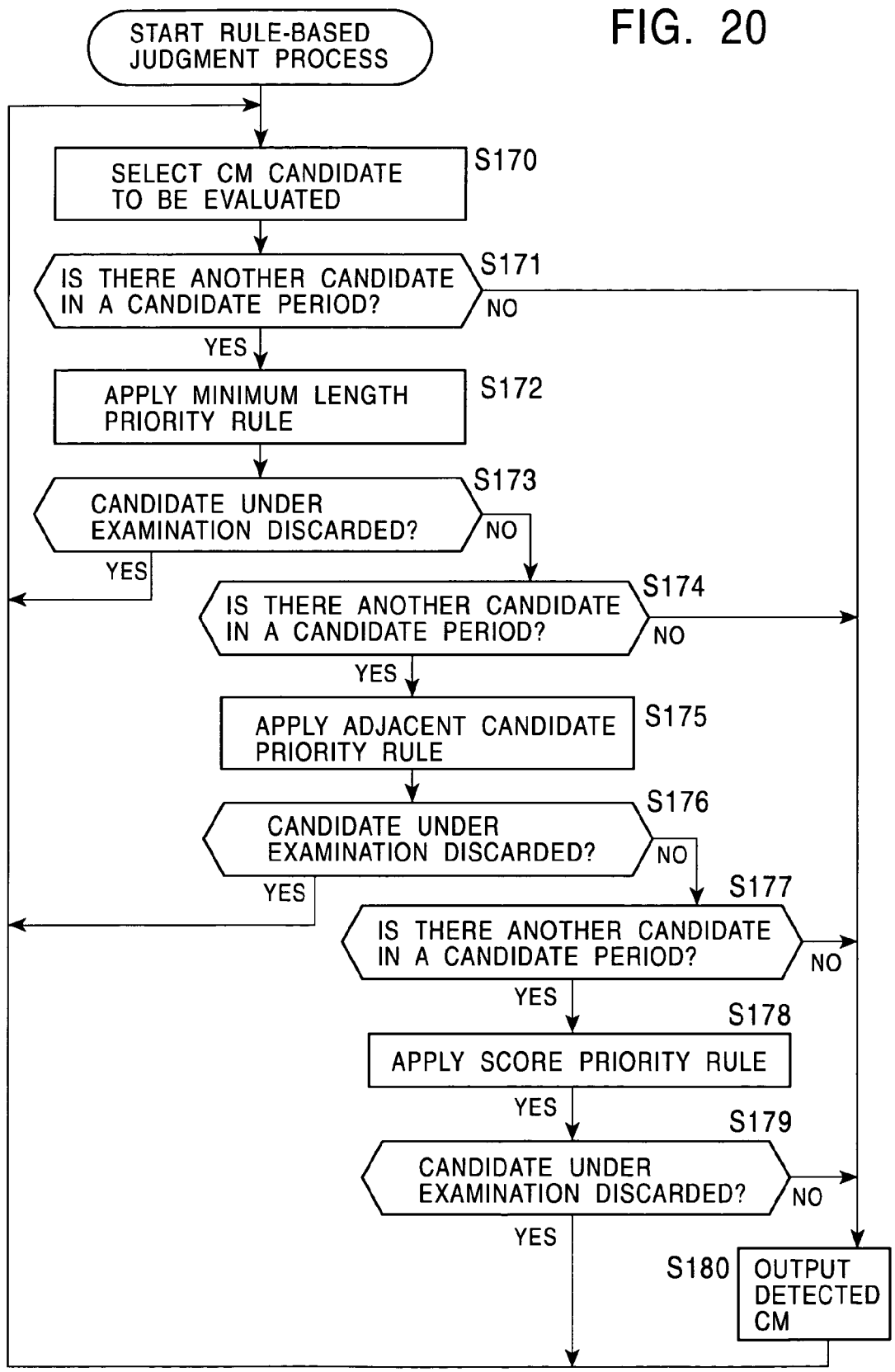
FIG. 20 is a flow chart showing the operation of a rule-based judgment unit.

The operation of the rule-based judgment unit 122 is described below with reference to a flow chart shown in FIG. 20.

First, in step S170, the rule-based judgment unit 122 selects a commercial candidate to be evaluated from the commercial candidate table. In this selection, candidates that are older than a predetermined time $T_4$ are selected in descending order of the age of candidates. The length of period $T_4$ is set such that there can be two or more commercials in a period with this length. For example, $T_4$ is set to 150 sec.

Thereafter, in step S171, the rule-based judgment unit 122 examines the commercial candidate table to judge whether there is another commercial candidate in the same period as the selected commercial candidate period (from $T_s$ to $T_s+T_w$) If it is determined in step S171 that there is no other commercial candidate (that is, if the answer to step S171 is no), the current commercial candidate is output as a detected commercial and is removed from the commercial candidate table.

On the other hand, if it is determined in step S171 that there is another commercial candidate (that is, if the answer to step S171 is yes), then the process proceeds to step S172 and the detected competing commercial candidates are evaluated in accordance with a minimum length priority rule. That is, in accordance with the minimum length priority rule, when there are two or more commercial candidates with different lengths in a particular period of time, higher priority is given to a commercial candidate with a shorter length than to a commercial candidate with a longer length. For example, in a period of time with a length of 30 sec, there is a possibility that there is only one commercial candidate with a length of 30 sec and there is also a possibility that there are two commercial candidates each having a length of 15 sec, then commercial candidates with the length of 15 sec are selected and the commercial candidate with the length of 30 sec is discarded.

Figure 21:
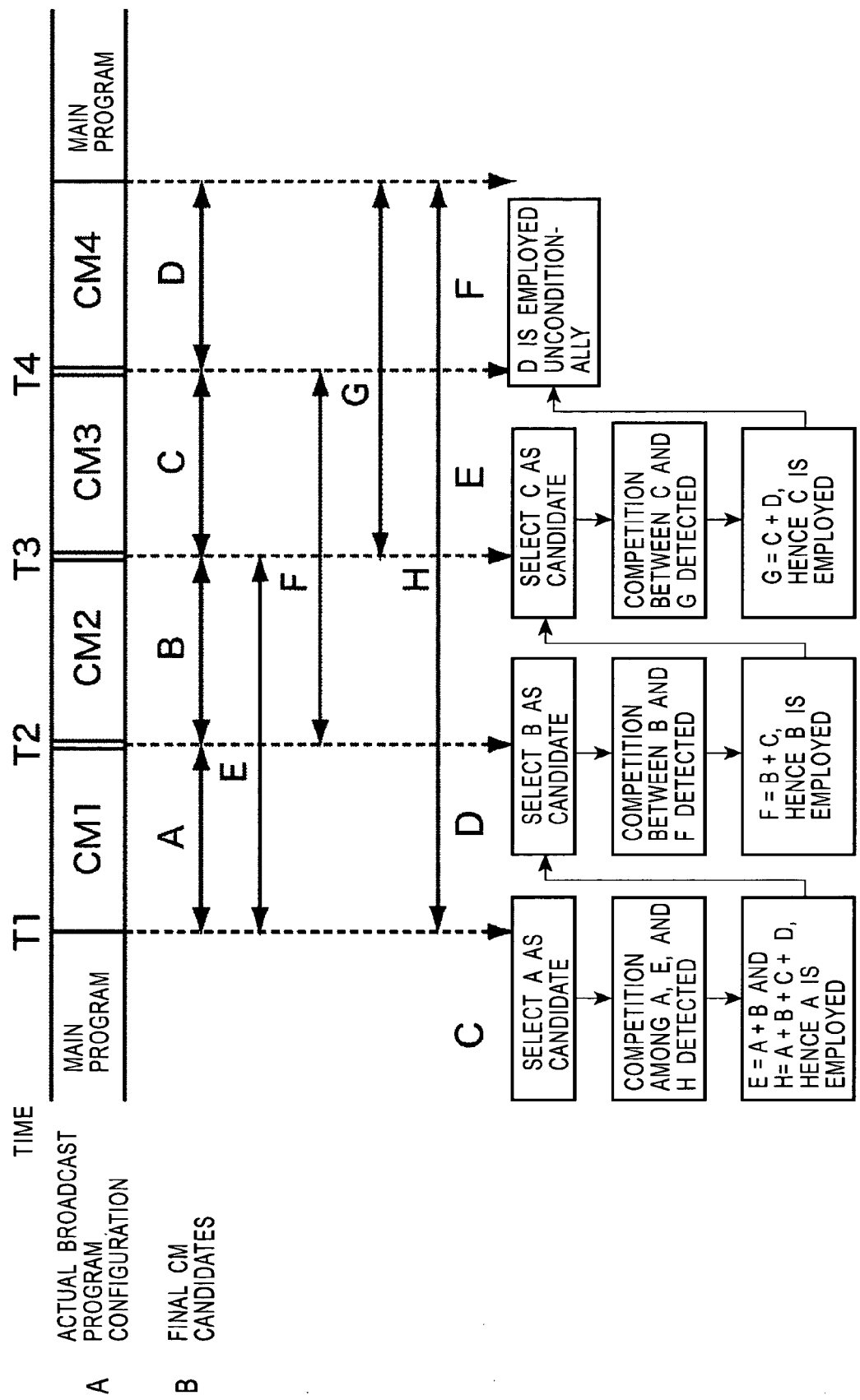
FIG. 21 is a diagram showing an example of a minimum length priority rule.

A specific example of a manner of applying the minimum length priority rule to a plurality of commercial candidates is described below with reference to FIG. 21.

In this specific example, when four true commercials CM1 to CM4 are successively broadcasted in a certain period as shown in FIG. 21A, eight commercial candidates denoted by A to H in FIG. 21B are detected in this period and those eight commercial candidates are described in a commercial candidate table.

First, as shown in FIG. 21C, a commercial candidate A is brought into evaluation. For this commercial candidate A, commercial candidates E and H are detected as competing with the commercial candidate A. However, E can be described as the sum of A and B, and H can be described as the sum of A, B, C, and D. Therefore, E and H are discarded, and A is employed. Thereafter, as shown in FIG. 21D, B is brought into evaluation. For B, F is detected as a competing candidate (note that E and H have already been discarded when A is evaluated). Herein, F can be described as the sum of B and C, and thus B is employed and F is discarded. Similarly, as shown in FIG. 21E, C is then brought into evaluation. In this case, G is detected as a competing candidate. However, G can be described as the sum of C and D, and thus C is employed and G is discarded. Finally, as shown in FIG. 21F, D is evaluated. In this case, there is no competing candidate, and thus D is directly employed without having to apply the rule.

Thus, as a result of the above evaluation based on the minimum length priority rule, A, B, C, and D are selected as commercial candidates. If there is a competition to which the rule cannot be applied, competing commercial candidates are kept in the commercial candidate table, and the process is ended.

Referring again to FIG. 20, after completion of the judgment in step S172, the rule-based judgment unit 122 advances the process to step S173. In step S173, the rule-based judgment unit 122 determines whether the commercial candidate under the evaluation is discarded as the judgment based on the minimum length priority rule. If it is determined in step S173 that the commercial candidate under the evaluation is discarded (that is, if the answer to step S173 is yes), the rule-based judgment unit 122 deletes that commercial candidate from the commercial candidate table and returns the process to step S170. On the other hand, if it is determined in step S173 that the commercial candidate under evaluation is not discarded (that is, if the answer to step S173 is no), the rule-based judgment unit 122 advances the process to step S174 and examines the commercial candidate table to determine whether there is another commercial candidate in the current commercial candidate period.

If it is determined in step S174 that there is no other commercial candidate (that is, if the answer to step S174 is no), the process jumps to step S180. In step S180, the rule-based judgment unit 122 outputs the commercial candidate under evaluation as a detected commercial and deletes it from the commercial candidate table. On the other hand, if it is determined in step S174 that there is another commercial candidate (that is, if the answer to step S174 is yes), the rule-based judgment unit 122 advances the process to step S175.

In step S175, the rule-based judgment unit evaluates the current commercial candidate according to an accompanied-by-neighbor candidate priority rule. That is, in accordance with the adjacent candidate priority rule, when there are two or more competing commercial candidates, it is determined whether each candidate has an adjacent candidate, and higher priority is given to a candidate having an adjacent candidate.

Figure 22:
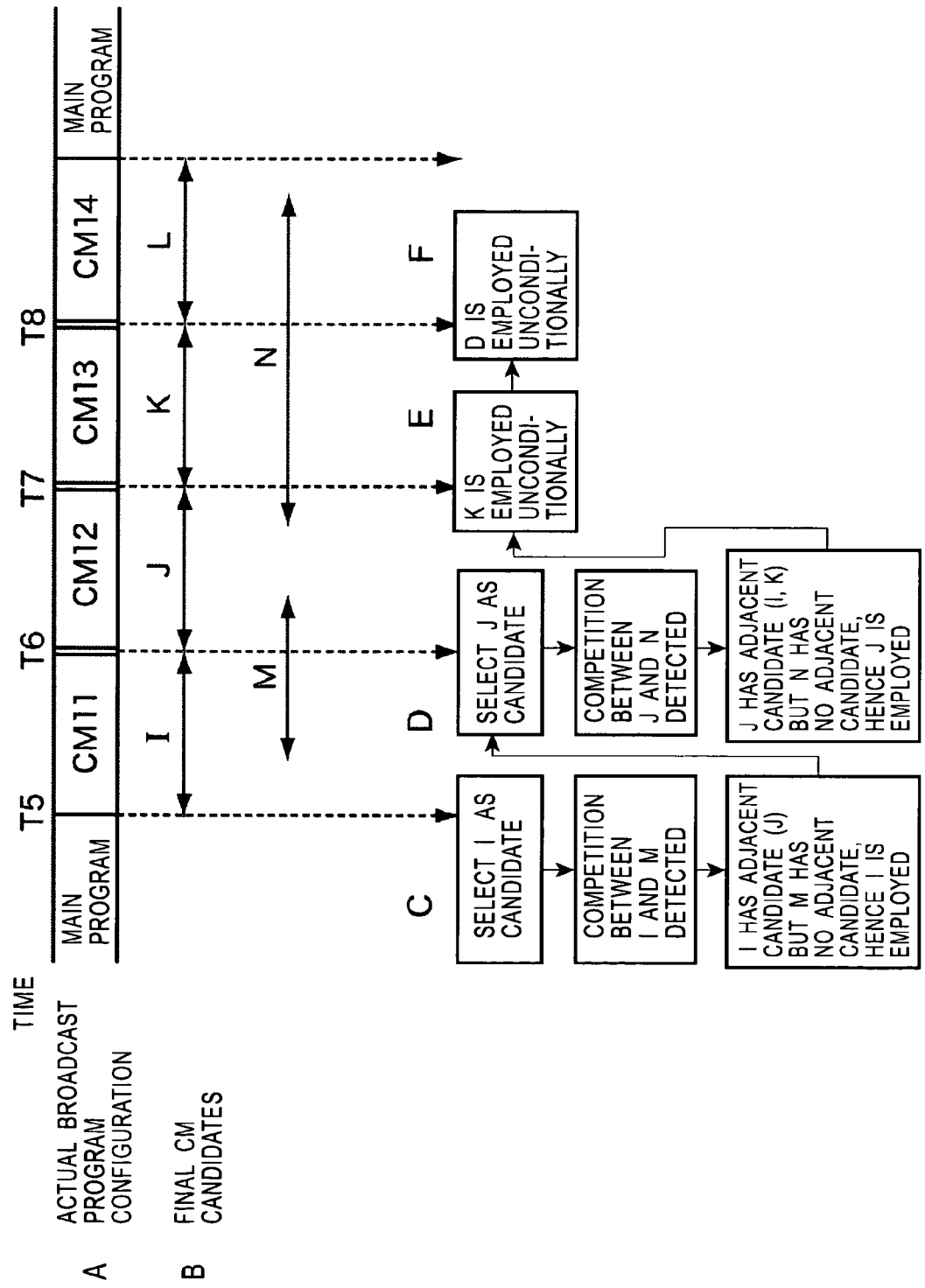
FIG. 22 is a diagram showing an example of an accompanied-by-neighbor candidate priority rule.

Referring to FIG. 22, a specific example of a manner in which commercial candidates are evaluated according to the accompanied-by-neighbor candidate priority is described below.

In this specific example, when four true commercials CM11 to CM14 are successively broadcasted in a certain period as shown in FIG. 22A, sixth commercial candidates denoted by I to N in FIG. 22B are detected in this period. In this specific example, because of an accidental occurrence of a cut transition or a low audio signal level during a commercial candidates, M and N are employed as candidates. Although those candidates have wrong periods, those candidates have a possibility of getting a high score in evaluation of the likelihood of commercial based on the additional conditions and have a possibility of remaining without being discarded, because those candidates are at least partially in a real commercial period.

In this specific example, as shown in FIG. 22C, an oldest candidate I is first brought under examination. M is detected as a candidate competing with I. However, M does not have an adjacent candidate, while I has an adjacent candidate J. Thus, I is employed and M is discarded. Thereafter, as shown in FIG. 22D, J is examined. N is detected as a candidate competing with J. However, N does not have an adjacent candidate, while J has adjacent candidates I and K. Thus, J is employed and N is discarded. At this stage of the judgment process, as shown in FIGS. 22E and 22F, the remaining candidates K and L no longer have competing candidates, and thus K and L are directly employed without judgment based on the adjacent candidate priority rule. Thus, as a result of the above evaluation based on the accompanied-by-neighbor candidate priority, I, J, K. and L are selected as commercial candidates in the period shown in FIG. 22.

In a case in which any of candidates competing with each other does not have an adjacent candidate, and in a case in which all candidates competing with each other have an adjacent candidate, no candidates are discarded and kept in the commercial candidate table.

Referring again to FIG. 20, after completion of step S175, the rule-based judgment unit 122 advances the process to step S176. In step S176, the rule-based judgment unit 122 determines whether the commercial candidate under the evaluation is discarded as the judgment based on the accompanied-by-neighbor candidate priority. If it is determined in step S176 that the commercial candidate under the evaluation is discarded (that is, if the answer to step S176 is yes), the rule-based judgment unit 122 deletes that commercial candidate from the commercial candidate table and returns the process to step S170. On the other hand, if it is determined in step S176 that the commercial candidate under evaluation is not discarded (that is, if the answer to step S176 is no), the rule-based judgment unit 122 advances the process to step S177 and examines the commercial candidate table to determine whether there is another commercial candidate in the period of the current commercial candidate under evaluation.

If it is determined in step S177 that there is no other commercial candidate (that is, if the answer to step S177 is no), the process jumps to step S180. In step S180, the rule-based judgment unit 122 outputs the commercial candidate under evaluation as a detected commercial and deletes it from the commercial candidate table. On the other hand, if it is determined in step S177 that there is another commercial candidate (that is, if the answer to step S177 is yes), the process proceeds to step S178. In step S178, the rule-based judgment unit 122 applies a score priority rule. That is, the existing competition has not yet been resolved by applying the rules described above, a candidate having a higher score R assigned by the additional condition judgment unit 121 is preferentially employed. The score priority is repeatedly applied until the existing competition is resolved.

Figure 23:
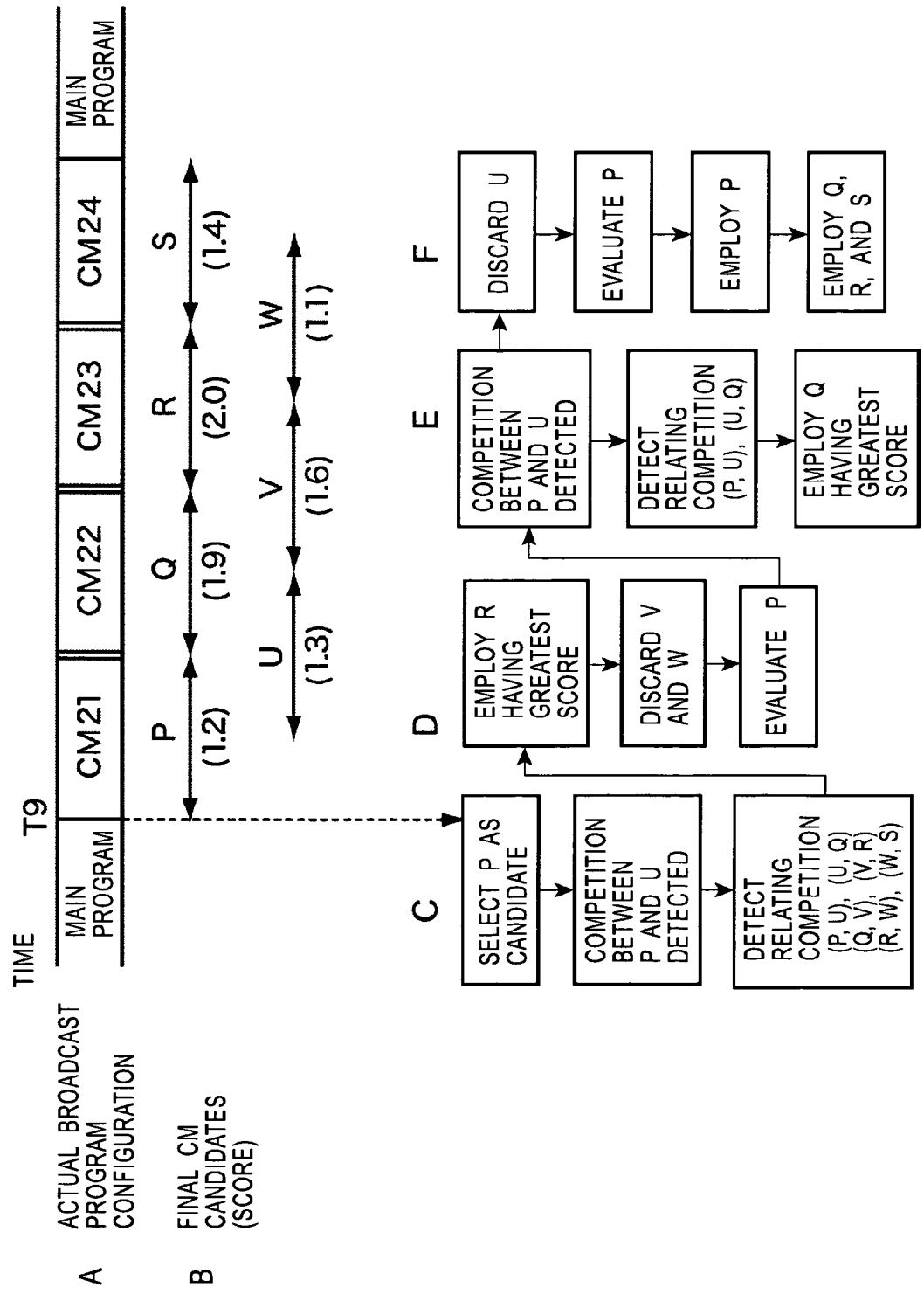
FIG. 23 is a diagram showing an example of a score priority rule.

Referring to FIG. 23, a specific example of a manner in which commercial candidates are evaluated according to the score rule priority is described below.

In this specific example, when four true commercials CM21 to CM24 are successively broadcasted in a certain period as shown in FIG. 23A, seven commercial candidates denoted by P to W in FIG. 23B are detected in this period.

In this specific example, as shown in FIG. 23C, an oldest candidate P is first brought under examination. The candidate P has competition with a candidate U, and this competition cannot be resolved by either the minimum length priority rule or the accompanied-by-neighbor candidate priority rule.

Herein, all candidates that can be concerned with the competition under examination are detected from the commercial candidate table. In this specific case, a total of six competitions associated with seven candidates, (P-U), (U-Q), (Q-V), (V-R), (R-W), and (W-S) are detected. Of those candidates, a candidate having a highest score is employed. In this specific example, a candidate R has a highest score 2.0. Thus, as shown in FIG. 23D, the candidate R is employed, and candidates V and W competing with the candidate R are discarded.

After discarding candidates V and W, as shown in FIG. 23E, there still remains competition (P-U). Thus, all competitions that can be concerned with (P-U) are again detected from the commercial candidate table. Herein, V has already been discarded, and thus remaining three candidates with competitions (P-U) and (U-Q) are detected.

Of those candidates, a candidate Q having a highest score 1.9 is employed, and a candidate U competing with the employed candidate Q is discarded, as shown in FIG. 23F.

There still remains a candidate P. However, all competitions associated with P have already been resolved by this time, and thus P is employed. As a result, U, V, and W have been discarded, and Q, R, and S are employed.

In the specific example described above, if the score priority rule is simply applied to a first detected competition (P and U in the above example) without searching for all possible relating competitions, U is employed and P is discarded. However, the candidate U employed herein is discarded later because of competition with U and Q. To avoid the above problem, the rule-based judgment unit 122 applies the rule after detecting all relating competitions.

By applying the score priority rule, all existing competitions can be resolved.

Referring again to FIG. 20, after completion of step S178, the rule-based judgment unit 122 advances the process to step S179. In step S179, the rule-based judgment unit 122 determines whether the candidate under the evaluation is discarded as the judgment based on the score priority rule. If it is determined in step S179 that the candidate under the evaluation is discarded (that is, if the answer to step S179 is yes), the rule-based judgment unit 122 deletes that candidate from the commercial candidate table and returns the process to step S170. On the other hand, if it is determined in step S179 that the candidate under evaluation is not discarded, then the process proceeds to step S180 and the rule-based judgment unit 122 outputs a detection result indicating the start time and the length of the candidate. The rule-based judgment unit 122 deletes that candidate from the commercial candidate table. Thereafter, the process returns to step S170.

As described above, the commercial detector 32 extracts candidates for commercials from a given program by examining whether the necessary conditions, which must be satisfied by any commercial, are satisfied. The commercial detector 32 then narrows down the candidates by statistically evaluating the feature values indicating the likelihood of commercial on the basis of the additional conditions. Furthermore, the commercial detector 32 resolves overlapping among candidates in accordance with the logical conditions, thereby detecting commercials in a highly reliable fashion. In the embodiments described above, it is assumed that the commercial detector 32 is applied to a video recording apparatus designed to record an analog television broadcast according to the current standard. However, the commercial detector 32 according to the present invention is not limited to such a video recorder but other types of video recorders such as that designed to record a digital television broadcast.

Note that the manner in which the commercial detector 32 detects commercials is not limited to the detection process described above, but other processes may be used to detect commercials included in a given video signal. For example, the commercial detector 32 may detect a commercial from a video signal simply by detecting a change in broadcast mode. The commercial detector 32 may also detect a commercial from a video signal by detecting a transition in image resolution between an HD (High Definition) mode and an SD (Standard Definition) mode.

Now, the details of the commercial reconstruction unit 35 are described below. FIG. 24 is a block diagram showing an example of the structure of the commercial reconstruction unit 35.

The commercial reconstruction unit 35 reconstructs a given video signal as described below. That is, when a video signal including a first image and a second image temporally inserted in the first image is given, the video signal is recorded such that storing of the first image of the video signal is controlled on the basis of the temporal position of at least one of the first image and the second image in the video signal, and storing of the second image of the video signal is controlled on the basis of the temporal position of at least one of the first image and the second image in the video signal. After completion of recording the video signal in the above-described manner, a video signal with a reconstructed configuration is produced by mixing the recorded first image and second image. In the reconstruction process, a determination as to whether a current period is a period in which the second image should be displayed is made on the basis of the temporal position of at least one of the first image and the second image in the original video signal, and the first and second images are mixed such that the first image is displayed temporally continuously in a first area of the screen and the second image is displayed in a second area of the screen during a period determined as a period in which the second image should be displayed.

The commercial reconstruction unit 35 includes a controller 201, a decoder 202, an image reduction unit 203, a commercial buffer 204, a main program buffer 205, a mixer 206, and an encoder 207. The controller 201 controls the decoder 202 and the mixer 206 in accordance with the commercial information read from the recording unit 34, the time defined on the image of the video signal decoded by the decoder 202, the data size of the video signal of the commercial image stored in the commercial buffer 204, the data size of the video signal of the main program image stored in the main program buffer 205, and the time defined on the image of the main program mixed by the mixer 206.

More specifically, in accordance with the commercial information read from the recording unit 34, the time defined on the image of the video signal decoded by the decoder 202, the data size of the video signal of the commercial image stored in the commercial buffer 204, and the data size of the video signal of the main program image stored in the main program buffer 205, the controller 201 determines the decoding speed of the video signal so that no overflow occurs in the commercial buffer 204 and the main program buffer 205 and so that the video signal needed in the mixing process performed by the mixer is stored in the commercial buffer 204 and the main program buffer 205. In accordance with the decoding speed determined by the controller 201, the decoder 202 decodes the video signal.

Depending on the commercial information read from the recording unit 34 and the time defined on the image of the video signal decoded by the decoder 202, the controller 201 determines whether the decoder 202 should supply the decoded video signal to the image reduction unit 203 or to the main program buffer 205. In accordance with the determination made by the controller 201, the decoder 202 supplies the decoded video signal.

Furthermore, on the basis of the commercial information and the time defined on the image of the main program of the video signal mixed by the mixer 206, the controller 201 determines whether the current period is a period during which to display a commercial image. If the controller 201 determines that the current period is a period during which to display an commercial image, the controller 201 commands the mixer 206 to mix a commercial image (a video signal of a commercial image) stored in the commercial buffer 204 and an main program image (a video signal of a main program image) stored in the main program buffer 205.

Under the control of the controller 201, the decoder 202 reads the video signal from the recording unit 34 and decodes the acquired video signal as required. Furthermore, under the control of the controller 201, the decoder 202 supplies the decoded commercial video signal to the image reduction unit 203 and supplies the decoded main program video signal to the main program buffer 205. For example, in a case in which the video signal read from the recording unit 34 is a signal encoded according to the MPEG (Moving Picture Experts Group) standard, the decoder 202 performs MPEG-decoding on the video signal.

From the commercial video signal supplied from the decoder 202, the image reduction unit 203 produces a video signal of a reduced image to be displayed as shown in FIG. 7. More specifically, for example, the image reduction unit 203 calculates the mean value of pixel values at four spatially neighboring pixels in the commercial video signal supplied from the decoder 202 and employs the resultant mean value as a pixel value of a reduced image. By performing decimation in a similar manner over the entire area of the original commercial video image, a complete reduction image can be obtained. The image reduction unit 203 supplies the resultant video signal of the reduced commercial image to the commercial buffer 204.

The commercial buffer 204 is a FIFO (first-in first-out) buffer adapted to temporarily store the video signal of the reduced commercial image supplied from the image reduction unit 203 and supply the stored video signal to the mixer 206 in the same order as that in which the video signal was stored. The commercial buffer 204 supplies to the controller 201 a signal indicating the amount of commercial image (amount of video signal of the commercial image) stored in the commercial buffer 204.

The main program buffer 205 is a FIFO (first-in first-out) buffer adapted to temporarily store the main program video signal supplied from the decoder 202 and supply the stored video signal to the mixer 206 in the same order as that in which the video signal was stored. The main program buffer 205 supplies to the controller 201 a signal indicating the amount of main program image (amount of video signal of the main program image) stored in the main program buffer 205.

Under the control of the controller 201, the mixer 206 mixes the main program image and the reduced commercial image such that the main program image is displayed temporally continuously and such that the main program image is displayed in a first area of the screen and the reduced commercial image is displayed in a second area of the screen. More specifically, under the control of the controller 201, the mixer 206 mixes the main program image and the reduced commercial image such that the main program image is displayed in the first area of the screen and the reduced commercial image is displayed in the second area of the screen over a period during which the commercial image should be displayed, and such that only the main program image is displayed in the first area of the screen over a period during which no commercial image should be displayed.

In the mixing process, for example, under the control of the controller 201, the mixer 206 mixes the main program image and the reduced commercial image such that the main program image is displayed temporally continuously and such that the main program image is displayed in a full screen area and the reduced commercial image is displayed in an area in the bottom right corner of the screen. The mixer 206 supplies the resultant composite-image video signal obtained by mixing the main program image and the reduced commercial image to the encoder 207.

The encoder 207 encodes, as required, the composite-image video signal of the main program image and the reduced commercial image supplied from the encoder 207 and outputs the resultant encoded video signal. For example, when an image is simply displayed on the display 16 in accordance with the composite-image video signal of the main program image and the reduced commercial image, encoding is not necessary. However, when the composite-image video signal of the main program image and the reduced commercial image is further recorded, encoding is generally required.

The operation of the commercial reconstruction unit is described in further detail below with reference to flow charts shown in FIGS. 25 and 26. Note that the decoding process described below with reference to the flow chart shown in FIG. 25 and the mixing process described below with reference to the flow chart shown in FIG. 26 are performed in parallel.

Figure 25:
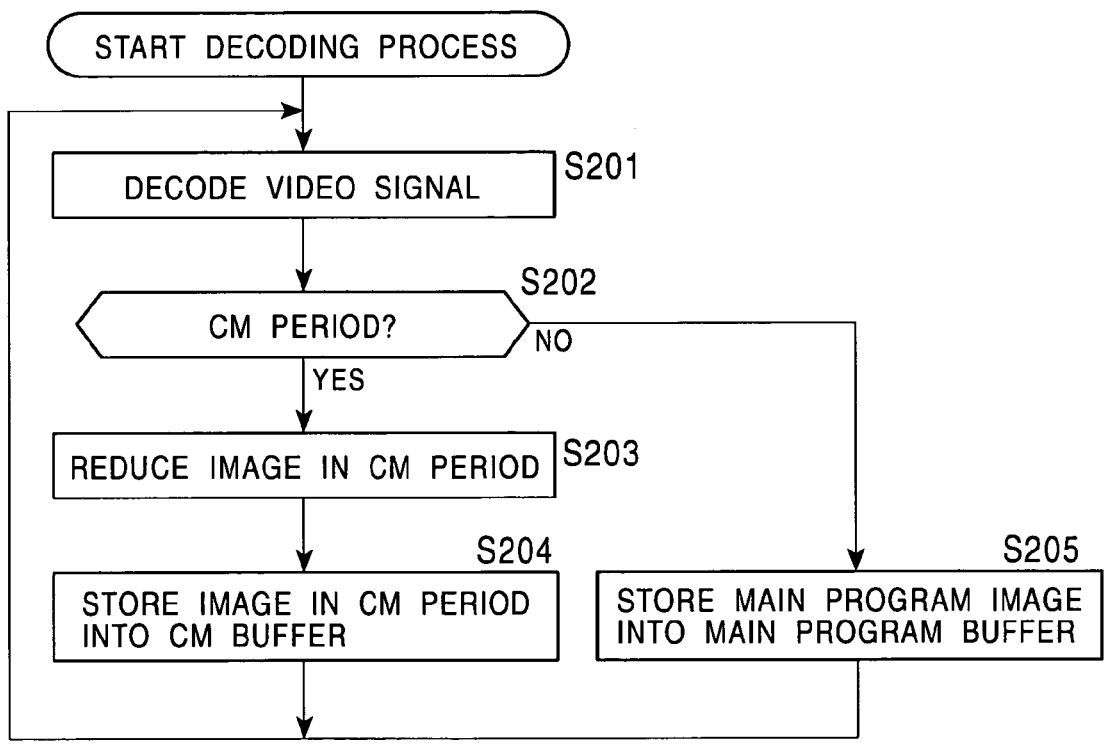
FIG. 25 is a flow chart showing a decoding process.
Figure 26:
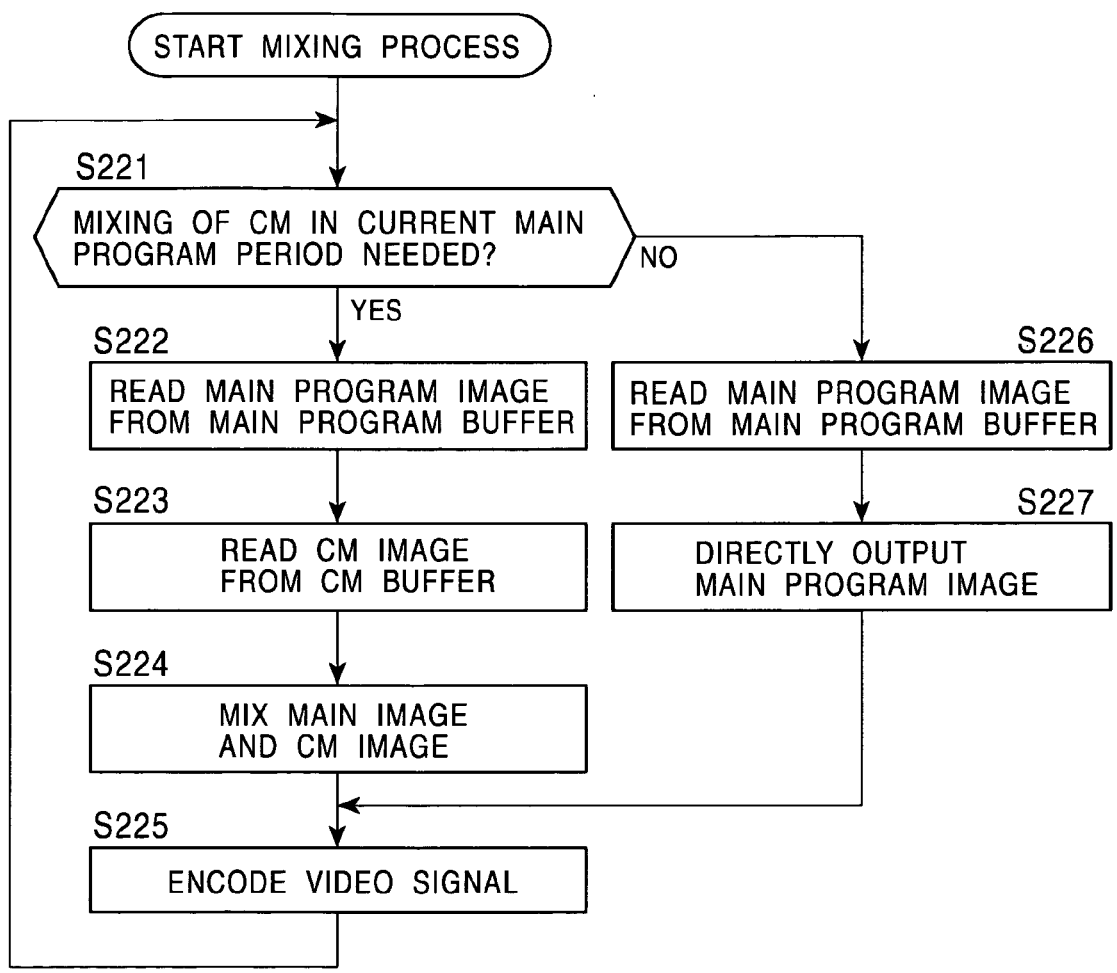
FIG. 26 is flow chart showing a mixing process.

FIG. 25 illustrates in the form of a flow chart the decoding process performed by functional blocks from the controller 201 to the main program buffer 205. In step S201, under the control of the controller 201, the decoder 202 decodes the video signal. The decoding speed at which the decoder 202 decodes the video signal is not necessarily limited to the normal speed, but may be set to a value higher than the normal speed by a factor of, for example, 2 to 8. The decoding speed at which the decoder 202 decodes the video signal is determined by the controller 201 in accordance with the amounts of video signals stored in the commercial buffer 204 and the main program buffer 205 and the time defined on the image of the video signal mixed by the mixer 206.

In step S202, the controller 201 determines whether the time as defined on the image of the video signal being encoded is in a commercial period, on the basis of the commercial information read from the recording unit 34 and the time as defined on the image of the video signal being decoded by the decoder 202. If it is determined that the current time is in a commercial period, the process proceeds to step S203. In step S203, the controller 201 controls the decoder 202 to supply the decoded video signal to the image reduction unit 203. The image reduction unit 203 reduces the commercial video signal supplied from the decoder 202 and supplies the resultant reduced commercial video signal to the commercial buffer 204.

In step S204, the commercial buffer 204 stores the commercial video signal reduced in step S204. Thereafter, the process returns to step S201, and the above-described process is repeated.

On the other hand, if it is determined in step S202 that the current time is not in a commercial period, then it is determined that the current time is in a main program period, and thus the process jumps to step S205. In step S205, the main program buffer 205 stores the main program video signal. Thereafter, the process returns to step S201, and the above-described process is repeated.

As a result of the process described above with reference to the flow chart shown in FIG. 25, the reduced commercial video signal is stored in the commercial buffer 204, and the main program video signal is stored in the main program buffer 205.

FIG. 26 illustrates in the form of a flow chart the mixing process performed by the controller 201, the mixer 206, and the encoder 207. In step S221, on the basis of the commercial information read from the recording unit 34 and the time as defined on the image of the video signal mixed by the mixer 206, the controller 201 determines whether the current time is in a main program period in which a commercial should be mixed into a composite form. If it is determined that the current time is in a main program period in which a commercial should be mixed, the process proceeds to step S222. In step S222, the mixer 206 reads from the main program buffer 205 a video signal of a main program image with which a commercial image is to be mixed. In step S223, the mixer 206 reads from the commercial buffer 204 a video signal of a reduced commercial image to be mixed with the main program image.

In step S224, the mixer 206 mixes the main program image read in step S222 and the reduced commercial image read in step S223. More specifically, the mixer 206 mixes the main program image and the reduced commercial image such that the main program image is displayed in the first area of the screen and the reduced commercial image is displayed in the second area of the screen. More specifically, for example, the mixer 206 mixes the main program image and the reduced commercial image such that the main program image is displayed in the full screen area and the reduced commercial image is displayed in an area in the bottom right corner of the screen (that is, such that the reduced commercial image is overlaid on the main program image).

As a result, a composite image of the main program image and the reduced commercial image is obtained in the main program period during which the commercial image should be mixed.

In step S225, the encoder 207 encodes the composite image produced in step S224 and outputs the resultant encoded video signal. Thereafter, the process returns to step S221, and the above-described process is repeated.

If it is determined in step S221 that the current time is in a main program period in which no commercial image should be mixed, the process jumps to step S226. In step S226, the mixer 206 reads from the main program buffer 205 a video signal of a main program image. In step S227, the mixer 206 directly outputs to the encoder 207 the video signal of the main program image read in step S226. Thereafter, the process proceeds to step S225.

Thus, in the main program period during which no commercial should be mixed, only the main program image is output. As a result, the main program image is displayed over the entire screen area during the main program period in which no commercial should be mixed.

As described above, a composite image of a main program image and a reduced commercial image is output in a main program period during which the commercial image should be mixed, and only a main program image is output in a main program period during which no commercial should be mixed, and thus a user can continuously view the main program without a break, while the user can also view the commercial.

Figure 27:
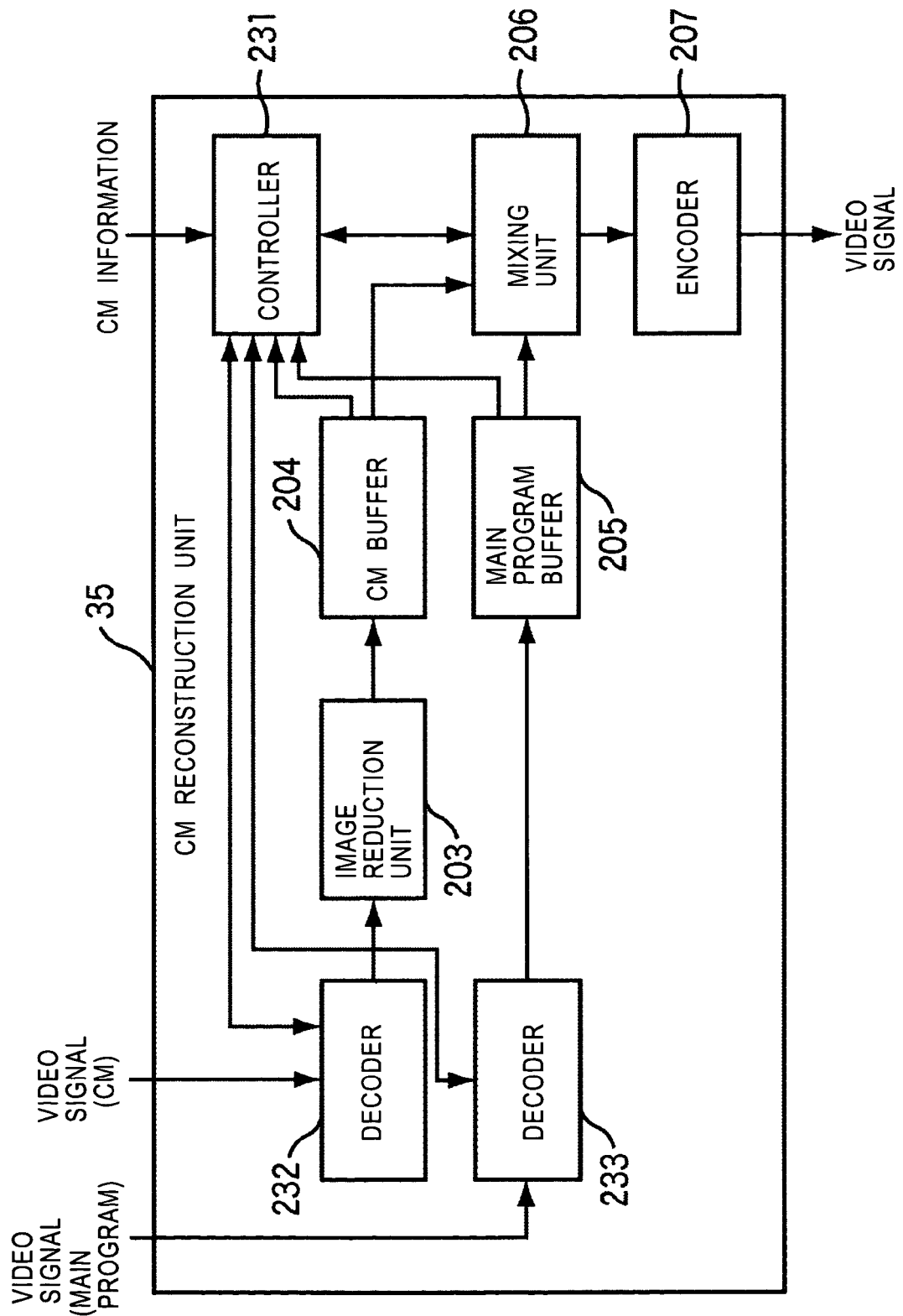
FIG. 27 is a block diagram showing another example of the structure of the commercial reconstruction unit.

FIG. 27 is a block diagram showing another example of the structure of the commercial reconstruction unit. Similar parts to those in FIG. 24 are denoted by similar reference numerals, and a duplicated description of such similar parts is not given herein.

As shown in FIG. 27, the commercial reconstruction unit 35 includes a controller 231, a decoder 232, a decoder 233, an image reduction unit 203, a commercial buffer 204, a main program buffer 205, a mixer 206, and an encoder 207.

The controller 231 controls the decoder 232, the decoder 233, and the mixer 206 in accordance with commercial information read from the recording unit 34 the time as defined on an image of a video signal decoded by the decoder 232 the time as defined on an image of a video signal decoded by the decoder 233 the data size of a video signal of a commercial image stored in the commercial buffer 204, and the data size of a video signal of a main program image stored in the main program buffer 205.

More specifically, on the basis of the commercial information read from the recording unit 34, the controller 231 controls the decoder 232 to sequentially read a video signal in a commercial period from the recording unit 34. On the basis of the commercial information read from the recording unit 34, the controller 231 also controls the decoder 233 to sequentially read a video signal in a main program period from the recording unit 34.

On the basis of the commercial information read from the recording unit 34, the time as defined on the image of the video signal being decoded by the decoder 232, the data size of the video signal of the commercial image stored in the commercial buffer 204, the controller 231 determines the decoding speed of the video signal performed by the decoder 232 so that no overflow occurs in the commercial buffer 204 and so that the video signal needed in the mixing process performed by the mixer 206 is stored in the commercial buffer 204. In accordance with the decoding speed determine by the controller 231, the decoder 232 decodes the video signal.

Furthermore, on the basis of the commercial information read from the recording unit 34, the time as defined on the image of the video signal being decoded by the decoder 233, the data size of the video signal of the main program stored in the main program buffer 205, the controller 231 determines the decoding speed of the video signal performed by the decoder 233 so that no overflow occurs in the main program buffer 205 and so that the video signal needed in the mixing process performed by the mixer 206 is stored in the main program buffer 205. In accordance with the decoding speed determine by the controller 231, the decoder 233 decodes the video signal.

Furthermore, on the basis of the commercial information and the time as defined on the image of the main program of the video signal mixed by the mixer 206, the controller 231 determines whether the current time is in a period during which to display a commercial image. If the controller 231 determines that the current time is in a period during which to display an commercial image, the controller 231 commands the mixer 206 to mix a commercial image (a video signal of a commercial image) stored in the commercial buffer 204 and an main program image (a video signal of a main program image) stored in the main program buffer 205.

Under the control of the controller 231, the decoder 232 reads the video signal in the commercial period from the recording unit 34 and decodes the acquired video signal, and then, under the control of the controller 231, the decoder 232 supplies the decoded video signal in the commercial period to the image reduction unit 203.

Under the control of the controller 231, the decoder 233 reads the video signal in the main program period from the recording unit 34 and decodes the acquired video signal, and then, under the control of the controller 231, the decoder 233 supplies the decoded video signal in the main program period to the main program buffer 205.

Figure 28:
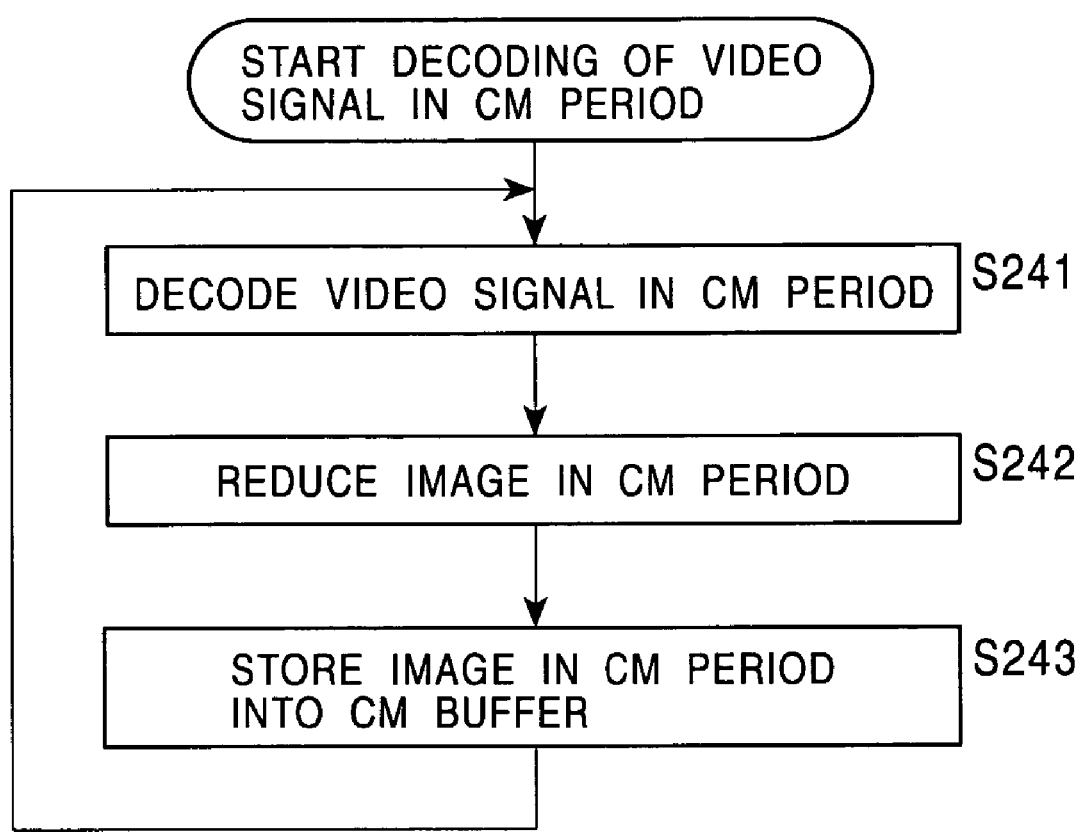
FIG. 28 is a flow chart showing a process of decoding a video signal during a commercial period.

In the commercial reconstruction unit 35 with the structure shown in FIG. 27, decoding of a video signal in a commercial period and decoding of a video signal in a main program period are performed in parallel. Even when the processing speed of the decoder 232 and/or the decoder 233 is low, the commercial reconstruction unit 35 can correctly operate. FIG. 28 is a flow chart showing the decoding process of a video signal in a commercial period performed by the controller 231, the decoder 232, the image reduction unit 203, and the commercial buffer 204. In step S241, under the control of the controller 231, the decoder 232 reads a video signal in a commercial period from the recording unit 34 and decodes the acquired video signal in the commercial period. In step S242, the image reduction unit 203 reduces the video signal in the commercial period supplied from the decoder 232 and supplies the resultant reduced video signal to the commercial buffer 204.

In step S243, the commercial buffer 204 stores the commercial-period video signal reduced in step S242. Thereafter, the process returns to step S241, and the above-described process is repeated.

Figure 29:
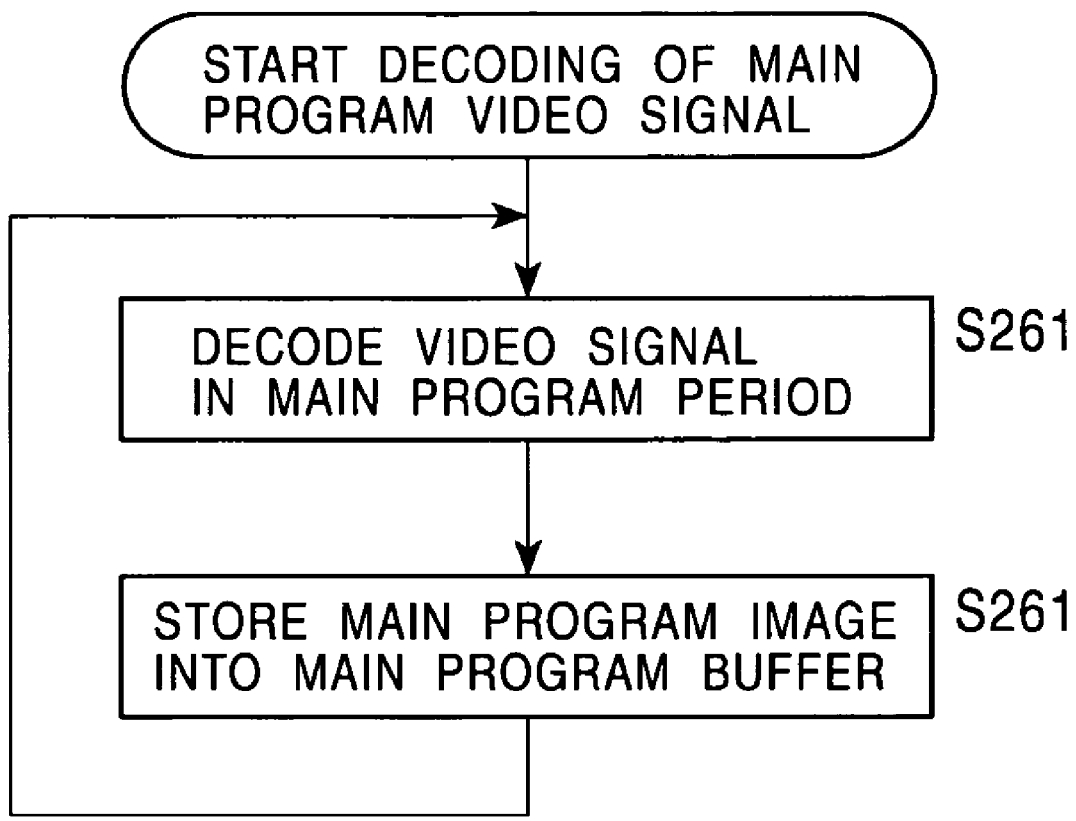
FIG. 29 is a flow chart showing a process of decoding a video signal during a main program period.

FIG. 29 is a flow chart showing the decoding process of a video signal in a main program period performed by the controller 231, the decoder 233, and the main program buffer 205. In step S261, under the control of the controller 231, the decoder 233 reads a video signal in a main program period from the recording unit 34 and decodes the acquired video signal in the main program period. In step S262, the main program buffer 205 stores the main program video signal decoded in step S261. Thereafter, the process returns to step S261, and the above-described process is repeated.

The mixing process performed by the commercial reconstruction unit 35 shown in FIG. 27 is similar to that described above with reference to the flow chart shown in FIG. 26, and thus a duplicated description thereof is not given herein.

Also in the commercial reconstruction unit 35 with the structure shown in FIG. 27, as described above, a composite image of a main program image and a reduced commercial image is output in a main program period during which the commercial image should be mixed, and only a main program image is output in a main program period during which no commercial should be mixed, and thus a user can continuously view the main program without a break, while the user can also view the commercial.

Figure 30:
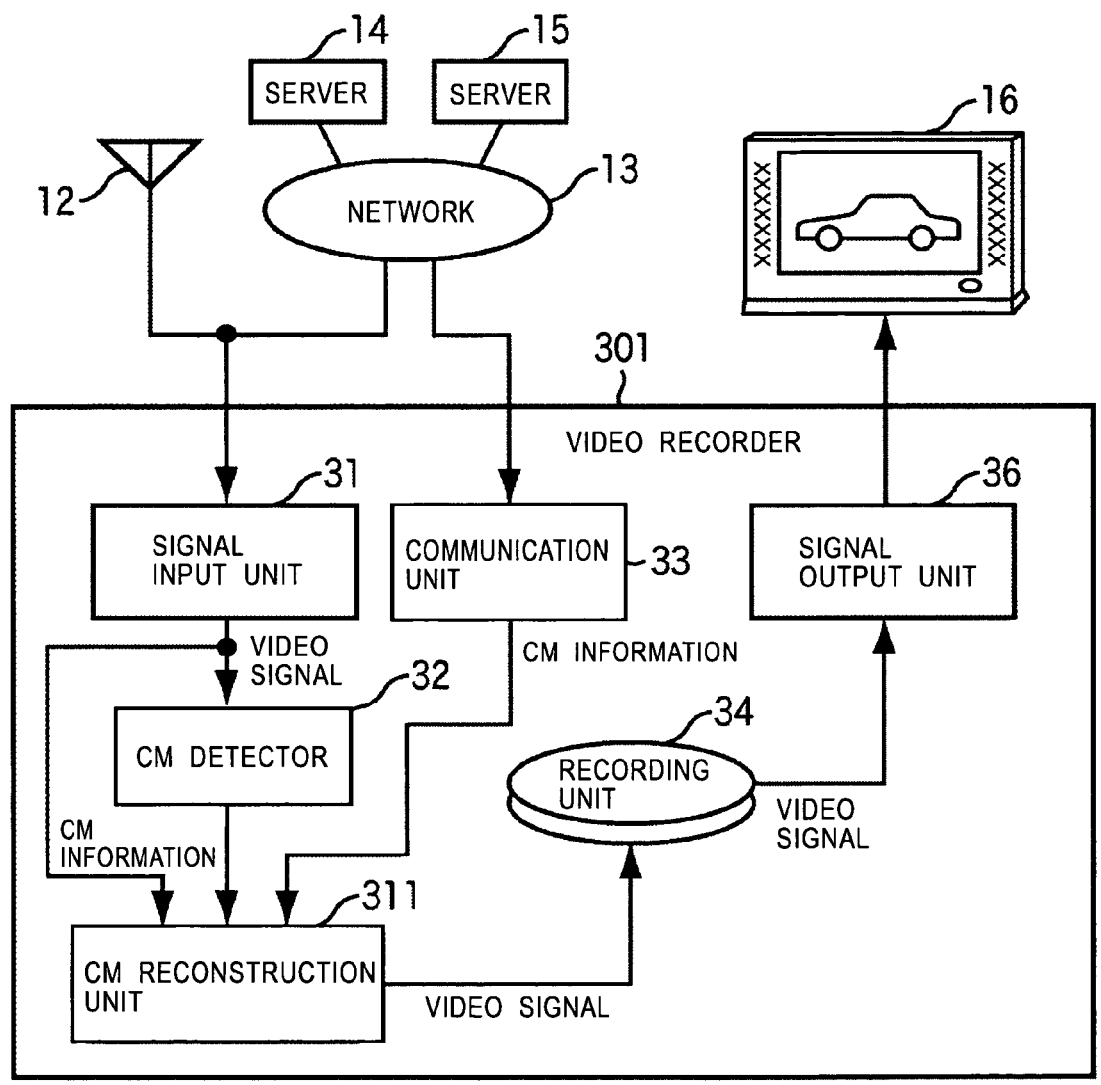
FIG. 30 is a block diagram showing a recording apparatus according to another embodiment of the present invention.

FIG. 30 is a block diagram showing a recording apparatus according to another embodiment of the present invention. Similar parts to those in FIG. 6 are denoted by similar reference numerals, and a duplicated description of such similar parts is not given herein. In the recording apparatus shown in FIG. 30, a reconstructed video signal is recorded, and the reconstructed video signal is read and output.

The recording apparatus 301 includes a signal input unit 31, a commercial detector 32, a communication unit 33, a recording unit 34, and a signal output unit 36. The recording apparatus 301 also includes, instead of the commercial reconstruction unit 35, a commercial reconstruction unit 311.

The commercial reconstruction unit 311 mixes a main program image and a commercial image in accordance with commercial information supplied from the commercial detector 32 or the communication unit 33 such that the main program image is displayed temporally continuously in a first area of the screen and such that a commercial image is displayed in a second area of the screen during a period that is determined to be a period during which the commercial image should be displayed.

The structure of the commercial reconstruction unit 311 is similar to that of the commercial reconstruction unit 35 described above with reference to FIG. 24, and thus a duplicated description is not given herein.

In the recording apparatus 301 shown in FIG. 30, the recording unit 34 records a video signal in a composite form in which a main program image and a commercial image are mixed, it is sufficient for the commercial detector 32 to perform commercial detection process only once for one video signal regardless of the number of times the recorded video signal is output.

In this embodiment, because the video signal in the composite form in which the main program image and the commercial image have already been mixed is recorded, the recording unit 34 does not need to record the commercial information, and thus a further reduction in necessary storage capacity is achieved compared with the embodiment described above with reference to FIG. 6. Furthermore, mixing of the main program and the commercial image into the composite video signal results in a reduction in the total length of the video signal by the length corresponding to commercial periods, and thus a further reduction in data size is achieved.

Figure 31:
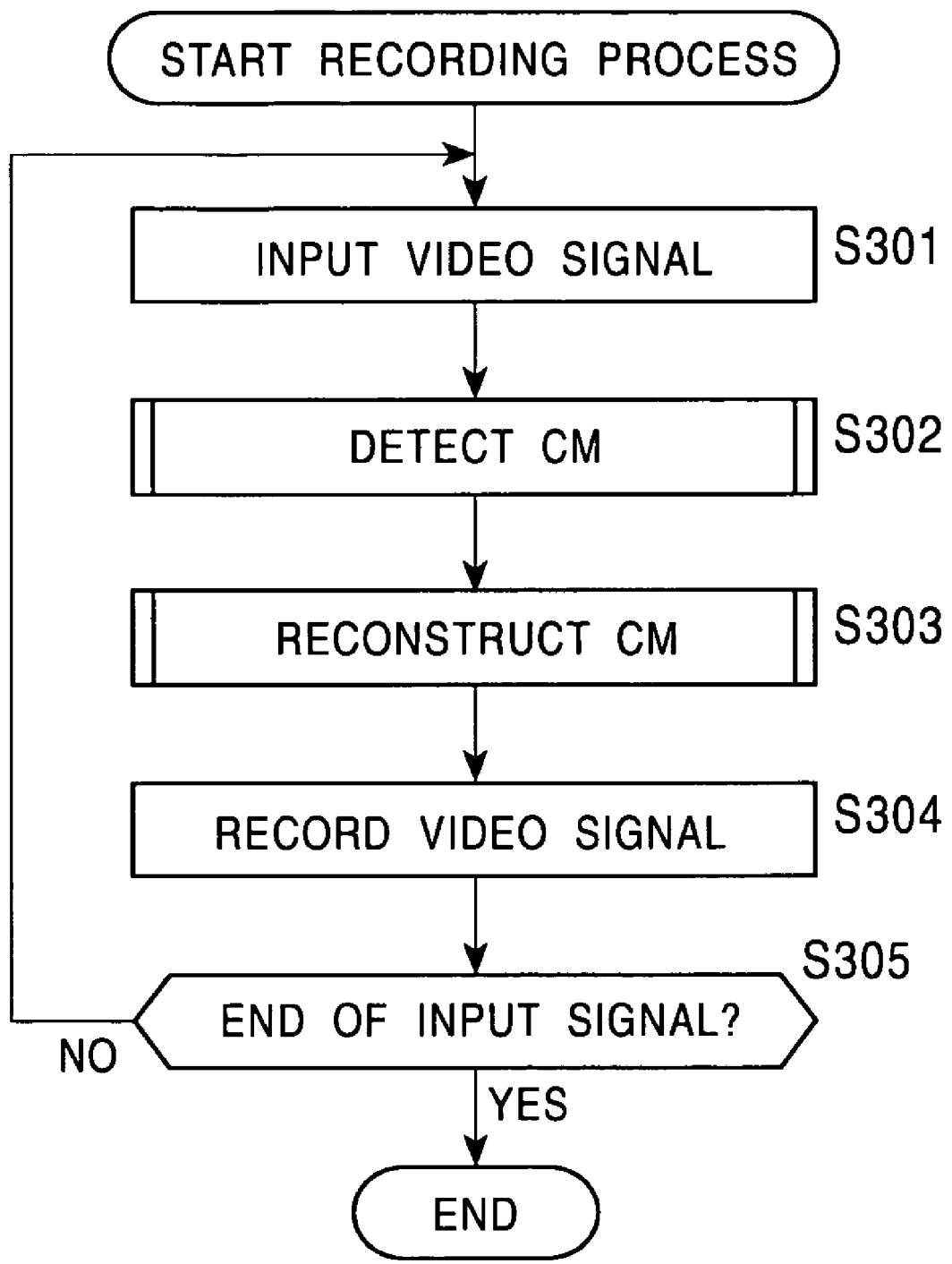
FIG. 31 is a flow chart shoring a recording process.

FIG. 31 is a flow chart showing a recording process performed by the recording apparatus 301. In this recording process shown in FIG. 31, steps S301 and S302 are respectively similar to steps S11 and S12 shown in FIG. 9, and thus a duplicated description thereof is not given herein.

In step S303, the commercial reconstruction unit 311 reconstructs a video signal in terms of a commercial image in accordance with commercial information supplied from the commercial detector 32 or the communication unit 33. The commercial reconstruction process in step S303 is similar to the process described above with reference to the flow charts shown in FIGS. 25 and 26, and thus a further detailed description is not given herein.

In step S304, the recording unit 34 records the video signal reconstructed in step S303. In step S305, the recording apparatus 301 determines whether the end of the input signal being recorded is reached. If it is determined that the end of the input signal is not yet reached, the process returns to step S301, and the above-described process is repeated.

If it is determined in step S305 that the end of the input signal is reached, the process is ended.

Figure 32:
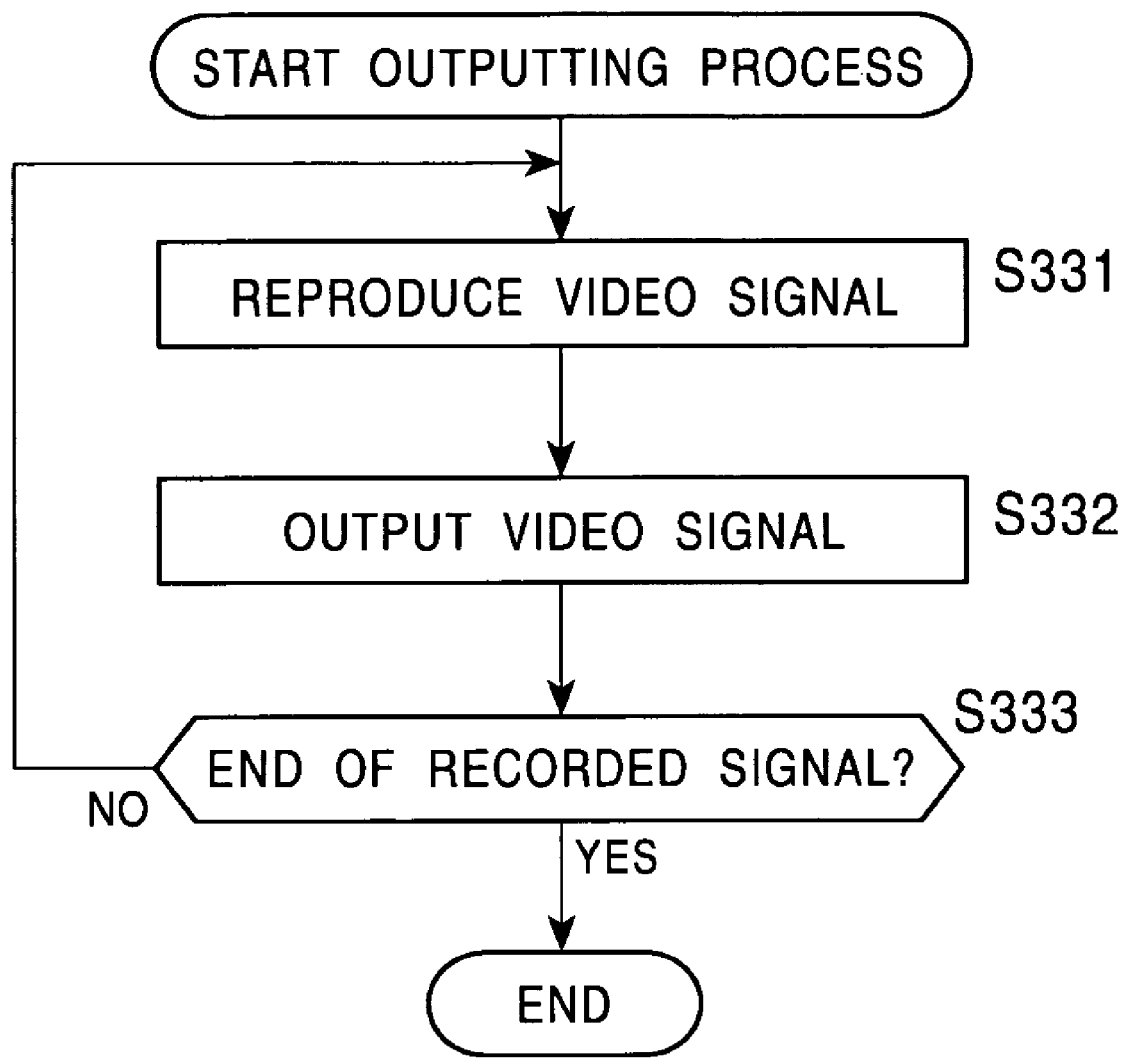
FIG. 32 is a flow chart showing an output process.

FIG. 32 is a flow chart showing an output process performed by the recording apparatus 301. In step S331, the recording unit 34 reads a video signal by reproducing the recorded video signal. The obtained video signal is supplied to the signal output unit 36.

In step S332, as required, the signal output unit 36 decodes the video signal read from the recording unit 34 and supplies the resultant video signal to the display 16. In step S333, the recording apparatus 301 determines whether the end of the recorded signal being output is reached. If it is determined that the end of the recorded signal is not yet reached, the process returns to step S331, and the above-described process is repeated. In the case in which it is determined in step S333 that the end of the recorded signal is reached, the process is ended.

Figure 33:
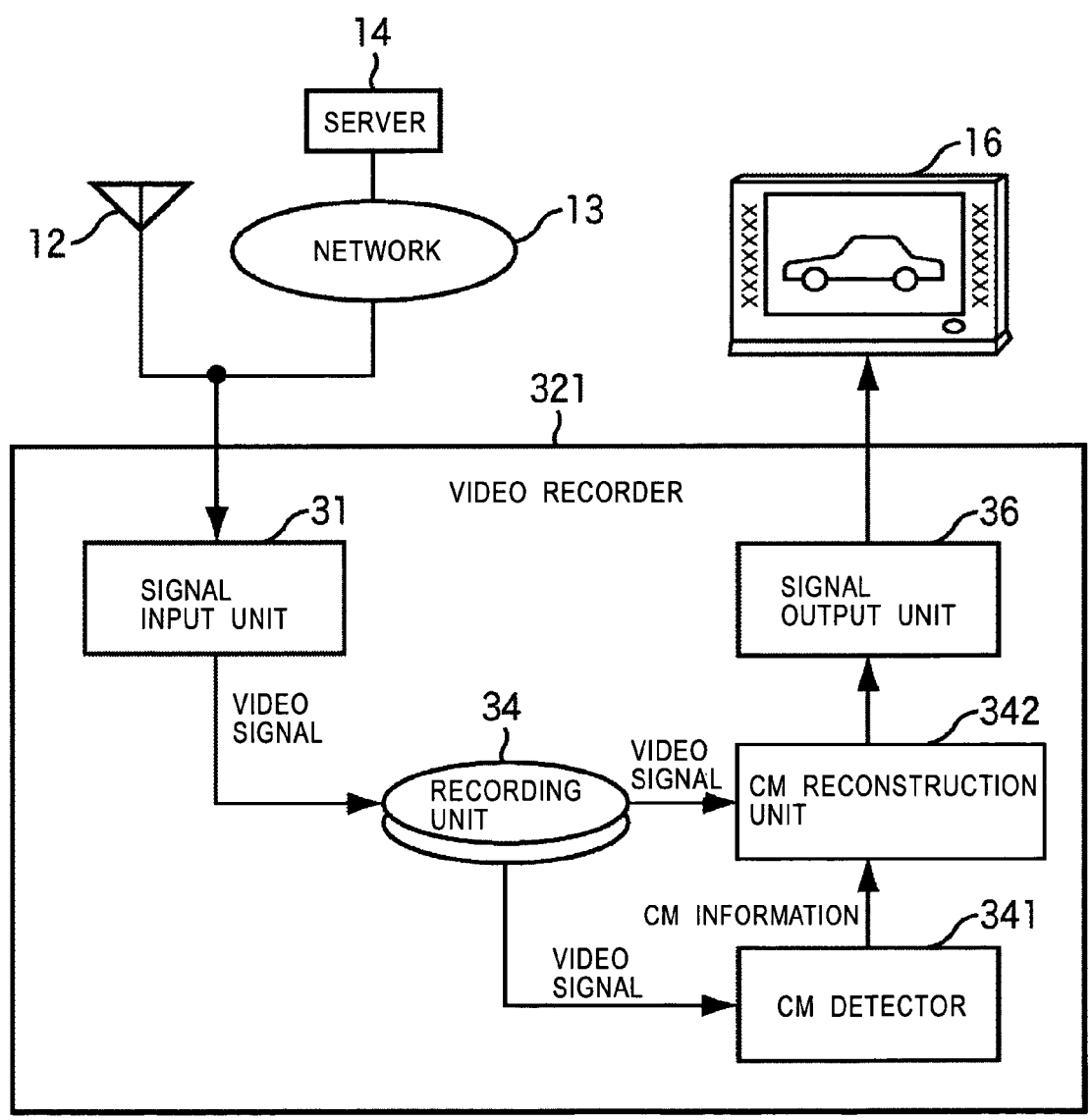
FIG. 33 is a block diagram showing a recording apparatus according to still another embodiment of the present invention.

FIG. 33 is a block diagram showing a recording apparatus according to another embodiment of the present invention. Similar parts to those in FIG. 6 are denoted by similar reference numerals, and a duplicated description of such similar parts is not given herein. In the recording apparatus shown in FIG. 33, a video signal is recorded, commercial information is detected from the recorded video signal, and a video signal is reconstructed in accordance with the detected commercial information.

The recording apparatus 321 includes a signal input unit 31, a recording unit 34, and a signal output unit 36. The recording apparatus 301 further includes a commercial detector 341 and a commercial reconstruction unit 342.

The commercial detector 341 detects a commercial from a video signal recorded in the recording unit 34, and supplies to the commercial reconstruction unit 242 commercial information associated with the commercial, indicating a commercial period or the like in the video signal.

The structure of the commercial reconstruction unit 341 is similar to that of the commercial reconstruction unit 32 described above with reference to FIG. 11, and thus a duplicated description thereof is not given herein.

The commercial reconstruction unit 342 mixes a main program image (a video signal of a main program image) and a commercial image (a video signal of a commercial image) read from the recording unit 34 in accordance with the commercial information supplied from the commercial detector 341 such that the main program image is displayed temporally continuously in a first area of the screen and such that the commercial image is displayed in a second area of the screen during a period determined to be a period during which the commercial image should be displayed.

The structure of the commercial reconstruction unit 342 is similar to that of the commercial reconstruction unit 35 described above with reference to FIG. 24, and thus a duplicated description thereof is not given herein.

In the recording apparatus 321, commercial information is detected from a video signal recorded in the recording unit 34, and a main program image and a commercial image included in the video signal read from the recording unit 34 are mixed in accordance with the detected commercial information. Therefore, the recording apparatus 321 is capable of correctly mixing a main program image and a commercial image even for a video signal recorded by another recording apparatus.

Figure 34:
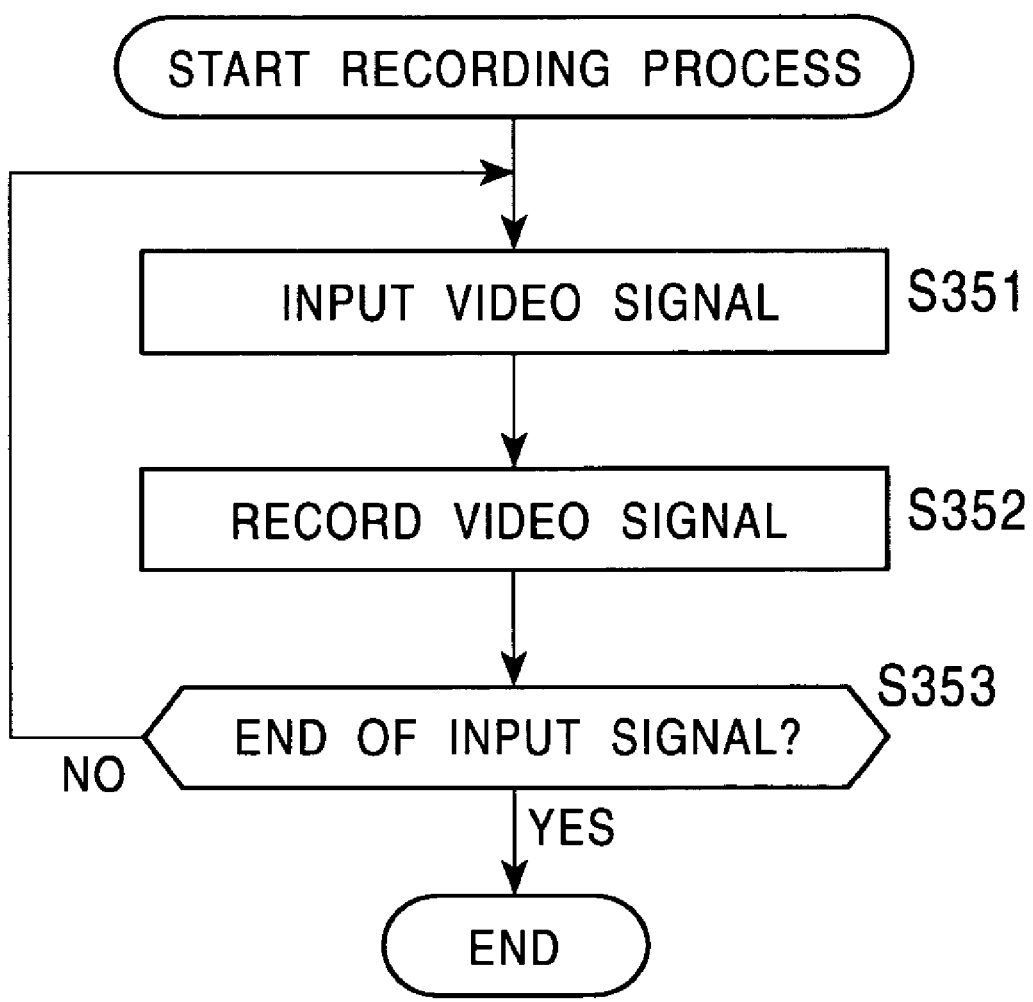
FIG. 34 is a flow chart showing a recording process.

FIG. 34 is a flow chart showing a recording process performed by the recording apparatus 321. In this recording process, step S351 is similar to step S11 shown in FIG. 9, and thus a further detailed description thereof is not given herein.

In step S352, the recording unit 34 records a video signal acquired in step S351. In step S353, the recording apparatus 321 determines whether the end of the input signal being recorded is reached. If it is determined that the end of the input signal is not yet reached, the process returns to step S351, and the above-described process is repeated.

If it is determined in step S353 that the end of the input signal is reached, the process is ended.

Figure 35:
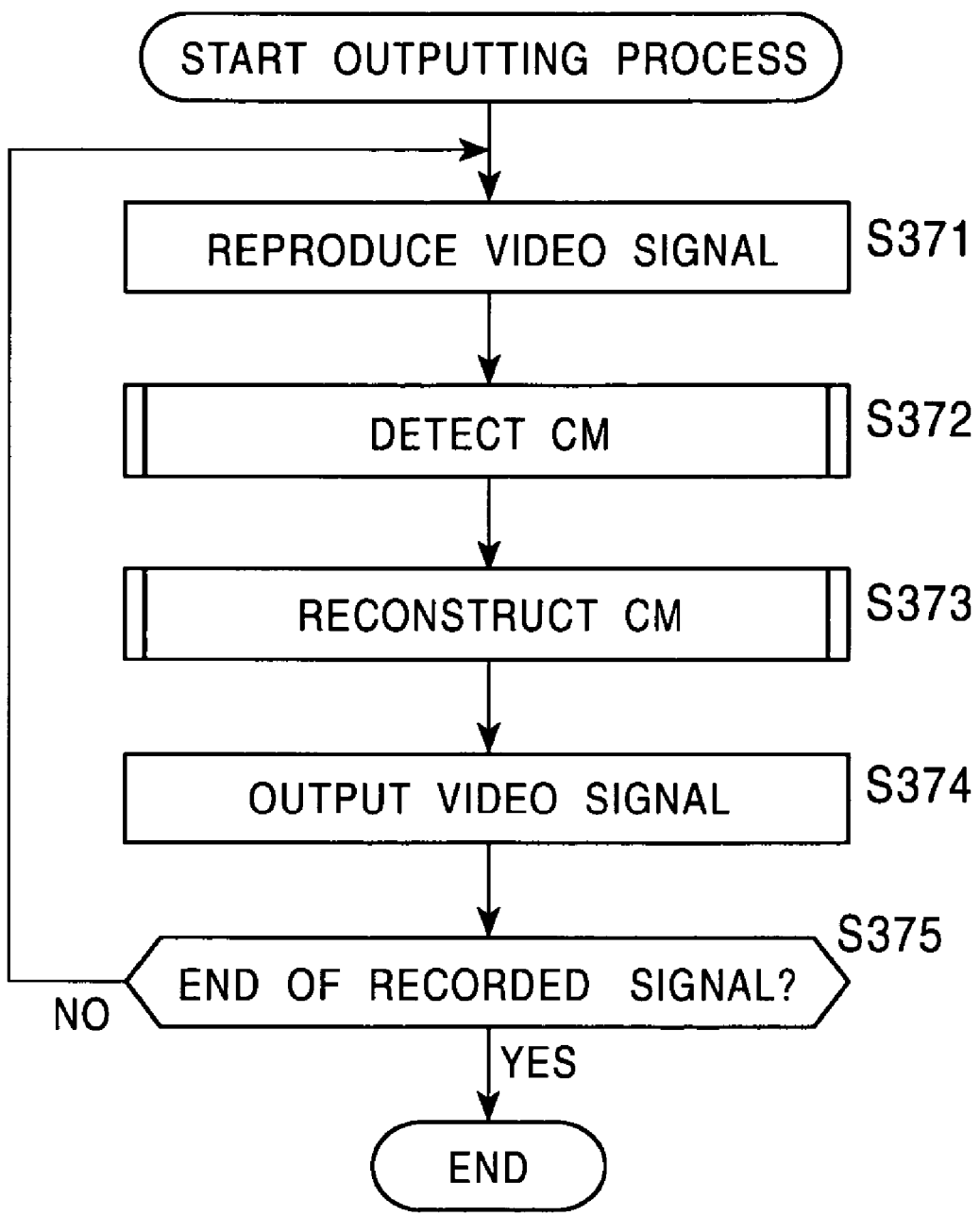
FIG. 35 is a flow chart showing an output process performed by a recoding apparatus.

FIG. 35 is a flow chart showing an output process performed by the recording apparatus 321. In step S371, the recording unit 34 reads a video signal by reproducing the recorded video signal. The obtained video signal is supplied to the commercial detector 341 and the commercial reconstruction unit 342.

In step S372, the commercial detector 341 detects a commercial from the video signal acquired in step S371. The commercial reconstruction process in step S372 is similar to the process described above with reference to the flow charts shown in FIGS. 12 to 14 and FIG. 20, and thus a further detailed description thereof is not given herein.

In step S373, the commercial reconstruction unit 342 performs reconstruction in terms of commercial on the video signal read in step S371, in accordance with the commercial information detected in step S372. The commercial reconstruction process in step S373 is similar to the process described above with reference to the flow charts shown in FIGS. 25 to 26, and thus a further detailed description thereof is not given herein.

In step S374, as required, the signal output unit 36 decodes the video signal reconstructed in step S373 and supplies the resultant video signal to the display 16. In step S375, the recording apparatus 321 determines whether the end of the recorded signal being output is reached. If it is determined that the end of the recorded signal is not yet reached, the process returns to step S371, and the above-described process is repeated. In the case in which it is determined in step S375 that the end of the recorded signal is reached, the process is ended.

Figure 36:
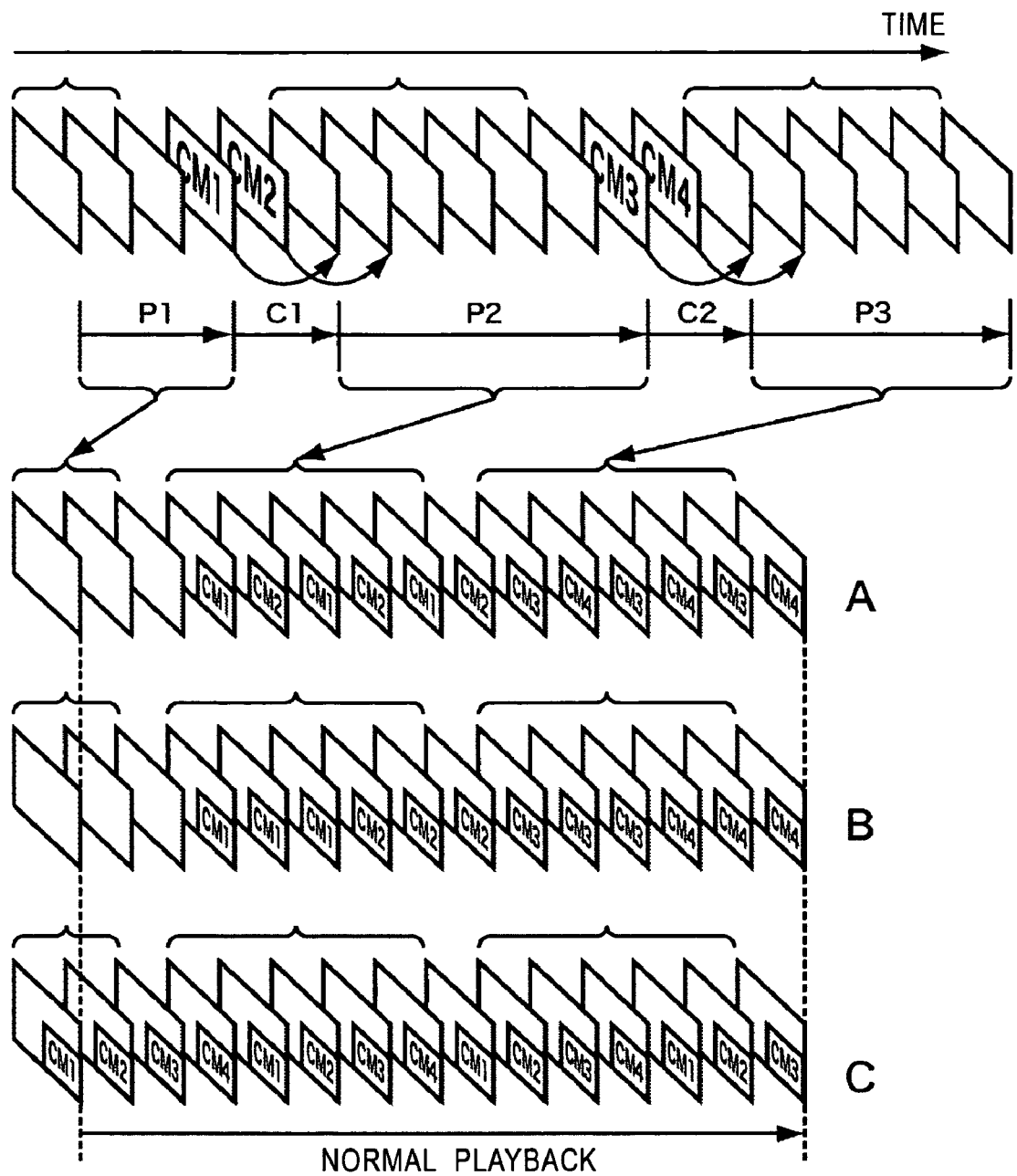
FIG. 36 is a diagram showing another example of a manner in which commercial images are inserted in a main program image.

FIG. 36 shows anther example of a manner in which a main program image and commercial images are mixed by the recording apparatus 11, the recording apparatus 301, or the recording apparatus 321.

In this example shown in FIG. 36, unlike the manner shown in FIG. 8 in which commercial images are mixed with a video signal such that each commercial is displayed only once, the recording apparatus 11, the recording apparatus 301, or the recording apparatus 321 produces a reduced commercial image and mixes the reduced commercial image and a main program image in a main program period following the commercial period of the reduced commercial image such that the reduced commercial image is displayed temporally repeatedly during the main program period following the commercial period. In this process, the controller 201 or the controller 231 determines, on the basis of the position of at least one of the main program image and the commercial image in the video signal, whether the current period is a period during which to display the commercial image such that the commercial image is displayed temporally repeatedly in the second area.

The recording apparatus 11, the recording apparatus 301, or the recording apparatus 321 produces one or more reduced commercial images in a period C1 and spatially overlays (mixes) the reduced commercial images on a main program image in a period P2 following the period C1 such that the one or more overlaid commercial images are temporally repeatedly displayed until the end of the period P2 (that is, until the start of a period P3).

Similarly, the recording apparatus 11, the recording apparatus 301, or the recording apparatus 321 produces one or more reduced commercial images in a period C2 and spatially overlays the reduced commercial images on a main program image in a period P3 following the period C2 such that the one or more overlaid commercial images are temporally repeatedly displayed until the end of the period P3.

More specifically, for example, when an original video signal input via the signal input unit 31 includes commercials CM1 and CM2 in a period C1, the recording apparatus 11, the recording apparatus 301, or the recording apparatus 321 produces reduced commercial images of CM1 and CM2 in the period C1 and spatially overlays the reduced commercial images on a main program image in a period P2 following the period C1 such that the commercial images CM1 and CM2 are temporally repeatedly displayed in the order of CM1, CM2, CM1, CM2, CM1, and CM2.

Furthermore, if the video signal acquired via the signal input unit 31 includes commercials CM3 and CM4 inserted in a period C2, the recording apparatus 11, the recording apparatus 301, or the recording apparatus 321 produces reproduced commercial images of CM3 and CM4 in the period C2, and overlays the reduced commercial images CM3 and CM4 on a main program image in a period P3 following the period C2 such that the reduced commercial images are temporally repeatedly displayed in the order of CM3, CM4, CM3, CM4, CM3, and CM4. That is, the reduced commercial images are overlaid on the main program image such that a sequence of successive commercial images is displayed, and when the last commercial image in the commercial period is displayed, the first commercial image in the same commercial period is displayed again.

Alternatively, as shown in FIG. 36B, when an original video signal input via the signal input unit 31 includes commercials CM1 and CM2 in a period C1, the recording apparatus 11, the recording apparatus 301, or the recording apparatus 321 produces reproduced commercial images of CM1 and CM2 in the period C1, and overlays the reduced commercial images CM1 and CM2 on a main program image in a period P2 following the period C1 such that the reduced commercial images are temporally repeatedly displayed in the order of CM1, CM1, CM1, CM2, CM2, and CM2.

Furthermore, if the video signal acquired via the signal input unit 31 includes commercials CM3 and CM4 inserted in a period C2, the recording apparatus 11, the recording apparatus 301, or the recording apparatus 321 produces reproduced commercial images of CM3 and CM4 in the period C2, and overlays the reduced commercial images CM3 and CM4 on a main program image in a period P3 following the period C2 such that the reduced commercial images are temporally repeatedly displayed in the order of CM3, CM3, CM3, CM4, CM4, and CM4. That is, in this case, reduced commercial images are mixed with a main program image such that each commercial image is repeated continuously as many times as allowed.

Alternatively, as shown in FIG. 36C, when a given original video signal includes commercials CM1 and CM2 in a period C1 and CM3 and CM4 in a period C2, the recording apparatus 11, the recording apparatus 301, or the recording apparatus 321 produces reduced images of CM1 to CM4 respectively, and overlays the reduced commercial images CM1 to CM4 on a main program image such that the reduced commercial images are temporally repeatedly displayed in the order of CM1, CM2, CM3, CM4, CM1, CM2, CM3, and CM4.

By repeatedly displaying reduced commercial images, it is possible to arouse user's interest more effectively than can by simply displaying reduced commercial images.

FIG. 37 is a block diagram showing another example of the structure of the commercial reconstruction unit 35. In FIG. 37, similar parts to those in FIG. 24 are denoted by similar reference numerals, and a duplicated description of such similar parts is not given herein.

As shown in FIG. 37, the commercial reconstruction unit 35 includes a decoder 202, a commercial buffer 202, a main program buffer 205, an encoder 207, a controller 361, an image reduction unit 362, an image reduction unit 363 and a mixer 364.

The controller 361 controls the decoder 202, the image reduction unit 362, the image reduction unit 363, and the mixer 364 in accordance with commercial information, the time as defined on an image of a video signal being decoded by the decoder 202, the data size of a video signal of a commercial image stored in the commercial buffer 204, the data size of a video signal of a main program image stored in the main program buffer 205, and the time as defined on a composite image of a main program produced by the mixer 364.

In addition to the capability similar to that performed by the controller 201, the controller 361 also has a capability of determining the image reduction ratio at which the image reduction unit 362 and the image reduction unit 363 reduce images, in accordance with commercial information, the time as defined on an image of a video signal being decoded by the decoder 202, and the time as defined on a composite image of a main program produced by the mixer 364. For example, the controller 361 controls the image reduction unit 362 and the image reduction unit 363 to reduce a commercial image or a main program image such that the entire commercial image and the entire main program image are displayed on the screen. For example, the controller 361 may control the image reduction unit 362 and the image reduction unit 363 to reduce a commercial image or a main program image such that the size of the commercial image or the size of the main program image varies with time.

Under the control of the controller 361, the decoder 202 acquires a video signal and decodes the acquired video signal. Furthermore, under the control of the controller 361, the decoder 202 supplies a decoded commercial video signal to the image reduction unit 362 and supplies a decoded main program video signal to the image reduction unit 363.

Under the control of the controller 361, the image reduction unit 362 produces a video signal of a reduced commercial image from the commercial video signal supplied from the decoder 202. The image reduction unit 362 supplies the resultant video signal of the reduced commercial image to the commercial buffer 204. On the other hand, under the control of the controller 361, the image reduction unit 363 produces a video signal of a reduced main program image from the main program video signal supplied from the decoder 202. The image reduction unit 363 supplies the resultant video signal of the reduced main program image to the main program buffer 205.

Under the control of the controller 361, the mixer 364 mixes the main program image and the commercial image such that the reduced main program image is temporally continuously displayed in a first area of the screen and such that the reduced commercial image is displayed in a second area of the screen during a period determined as a period during which the commercial image should be displayed.

Figure 38:
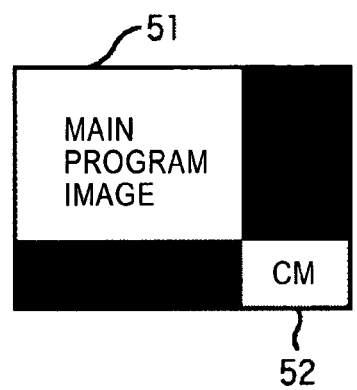
FIG. 38 is a diagram showing still another example of a manner in which commercial images are inserted in a main program image.

In this case, as shown in FIG. 38, the display 16 displays the whole of the reduced main program image 51 and also the whole of the reduced commercial image 52. For areas other than areas of the main program image 51 and the commercial image 52, the display 16 fills them with a black color the like.

By displaying images in the above-described manner, unlike the case in which the main program image 51 is partially hidden behind the commercial image 52 in FIG. 7, a user can view the entire main program image 51.

If the size of the main program image 51 is changed depending on whether the commercial image 52 is displayed or not, such a sudden change in size of the main program image 51 can cause a user to have an unpleasant feeling. That is, if the size of the main program image 51 is changed each time the commercial image 52 appears or disappears, the user has to change the viewpoint.

To avoid the above problem, at a transition from a state in which only the main program image 51 is displayed to a state in which both the main program image 51 and the commercial image 52 are displayed, the commercial reconstruction unit 35 shown in FIG. 37 may produce a composite video signal such that the size of the main program image 51 gradually decreases and the size of the commercial image 52 gradually increases.

Conversely, at a transition from a state in which both the main program image 51 and the commercial image 52 are displayed to a state in which only the main program image 51 is displayed, the commercial reconstruction unit 35 shown in FIG. 37 may produce a composite video signal such that the size of the main program image 51 gradually increases and the size of the commercial image 52 gradually decreases.

By gradually changing the size of the main program image 51 in the above-described manner instead of abruptly changing the size, it becomes possible to allow a user to view the main program in a pleasant manner.

Figure 39:
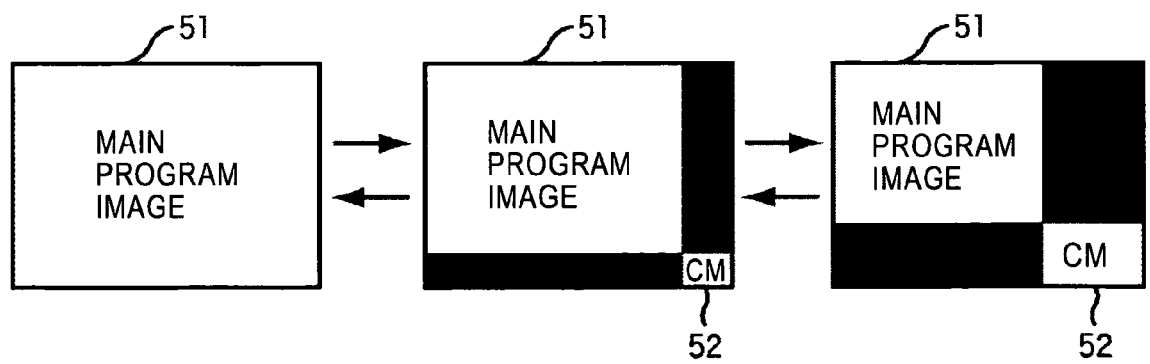
FIG. 39 is a diagram showing still another example of a manner in which commercial images are inserted in a main program image.

Although in the example shown in FIG. 39, the spatial size of the commercial image is simply increased gradually, switching of displaying state may be performed differently such that a user does not have an unpleasant feeling. For example, although not shown in the figure, the commercial reconstruction unit 35 shown in FIG. 37 may fade in or out (gradually reduce or increase the transparency of) the commercial image 52. In this case, the image reduction unit 362 and the image reduction unit 363 gradually change the transparency of images while changing the image sizes.

When a main program image and a commercial image is mixed together, if corresponding audio signals are simply mixed together, a voice/sound of the main program and a voice/sound of the commercial are simultaneously output from a speaker. Such a mixture of voices/sounds is a big problem.

Figure 40A:
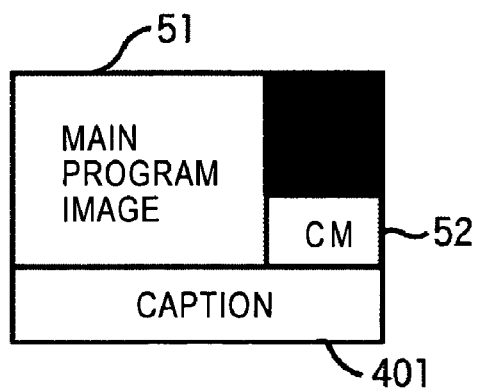
FIG. 40 is a diagram showing still another example of a manner in which commercial images are inserted in a main program image.

A technique of avoiding the above problems is described below with reference to FIGS. 40A and 40B. The commercial reconstruction unit 35 includes a voice recognition unit (not shown) for recognizing a voice of a commercial. The commercial reconstruction unit 35 recognizes a voice of a commercial and displays textual information indicating the recognized voice on the screen. For example, as shown in FIG. 40A, textual information in the form of a caption 401 indicating the recognized voice of the commercial is displayed. In addition to the information indicating the content of the voice of the commercial, the caption 401 may also include other information such as EPG information or information received from the server 15 or the like via the network 13.

Figure 40B:
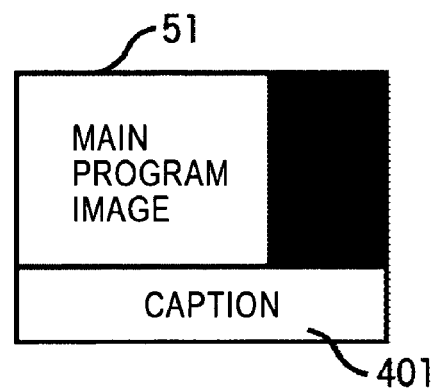

As shown in FIG. 40B, only a caption 401 indicating the recognized content of a voice of a commercial may be displayed without displaying a commercial image 52.

To avoid a mixture of voices/sounds of a main program and a commercial, when both the main program image 51 and the commercial image 52 are displayed at the same time, only one of voices of the main program and the commercial may be output from the speaker. For example, a voice of a main program may be output in preference to a voice of a commercial, and a voice of a commercial may be output only when a user gets interested in the commercial (when a user issues a voice change command via a remote controller or the like).

When a user gets interested in a commercial, the commercial may be redisplayed from the beginning, or the size of the commercial image 52 may be increased by a proper factor up to the full screen size. When the user is viewing the commercial, the main program may be temporarily stopped. This result in an increase in convenience for the user. The recording apparatus 11, the recording apparatus 301, or the recording apparatus 321 can determine whether a user gets interested in a commercial, on the basis of a command issued by the user via the remote controller.

Figure 41:
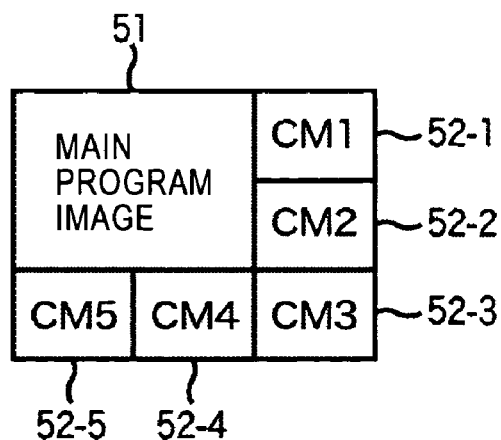
FIG. 41 is a diagram showing still another example of a manner in which commercial images are inserted in a main program image.

In the example shown in FIG. 38, the screen on which the main program image 51 and the commercial image 52 are displayed is not fully used, but the screen has useless areas filled with black color. To avoid the above problem, as shown in FIG. 41, a plurality of commercial images 52-1 to 52-5 may be simultaneously displayed (inserted in parallel) together with one main program image 51. That is, the screen area of the display 16 is filled with images, and the screen has no useless areas.

In FIG. 41, commercial images 52-1 to 52-5 may be different from each other or may be identical to each other.

Figure 42:
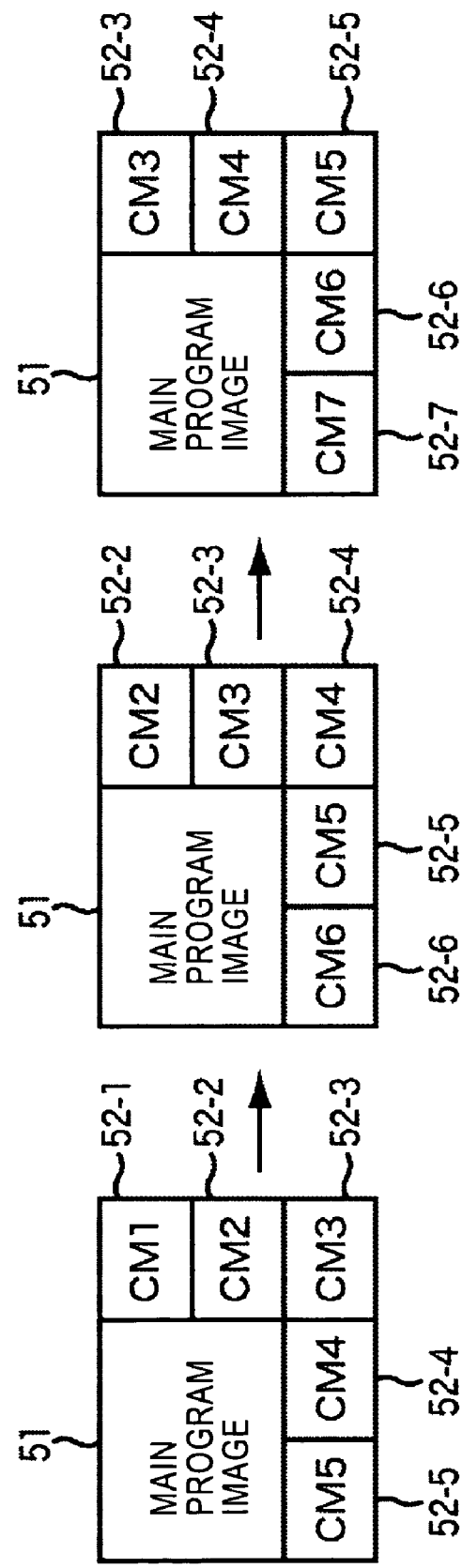
FIG. 42 is a diagram showing still another example of a manner in which commercial images are inserted in a main program image.

As shown in FIG. 42, commercial images 52 may be shifted at particular time intervals. More specifically, first, for example, commercial images 52-1 to 52-5 are displayed in a bottom area and an area on the right-hand side of the screen, as shown on the left-hand side of FIG. 42. In this state, the commercial images 52-1 to 52-5 are shifted in a counterclockwise direction. As a result, the image 52-1 is pushed out and a blank area is created on the leftmost side. A new commercial image 52-6 is put in this blank area. As a result, as shown in the center of FIG. 42, the commercial images 52-2 to 52-6 are displayed in the bottom area and the right-side area of the screen. After maintaining this state for a proper period of time, the commercial images 52-2 to 52-6 are again shifted in the counterclockwise direction to create a blank area on the leftmost side, and a new commercial image 52-6 7 s put in this blank area as shown on the right-hand side of FIG. 42.

As described above, a plurality of commercial images 52 are displayed at the same time together with one main program image 51, and the commercial images 52 are updated by shifting the exiting commercial images 52 and putting one or more new commercial images in a blank area created as a result of shifting. Alternatively, all commercial images 52 are replaced with new commercial images at a time.

Figure 43:
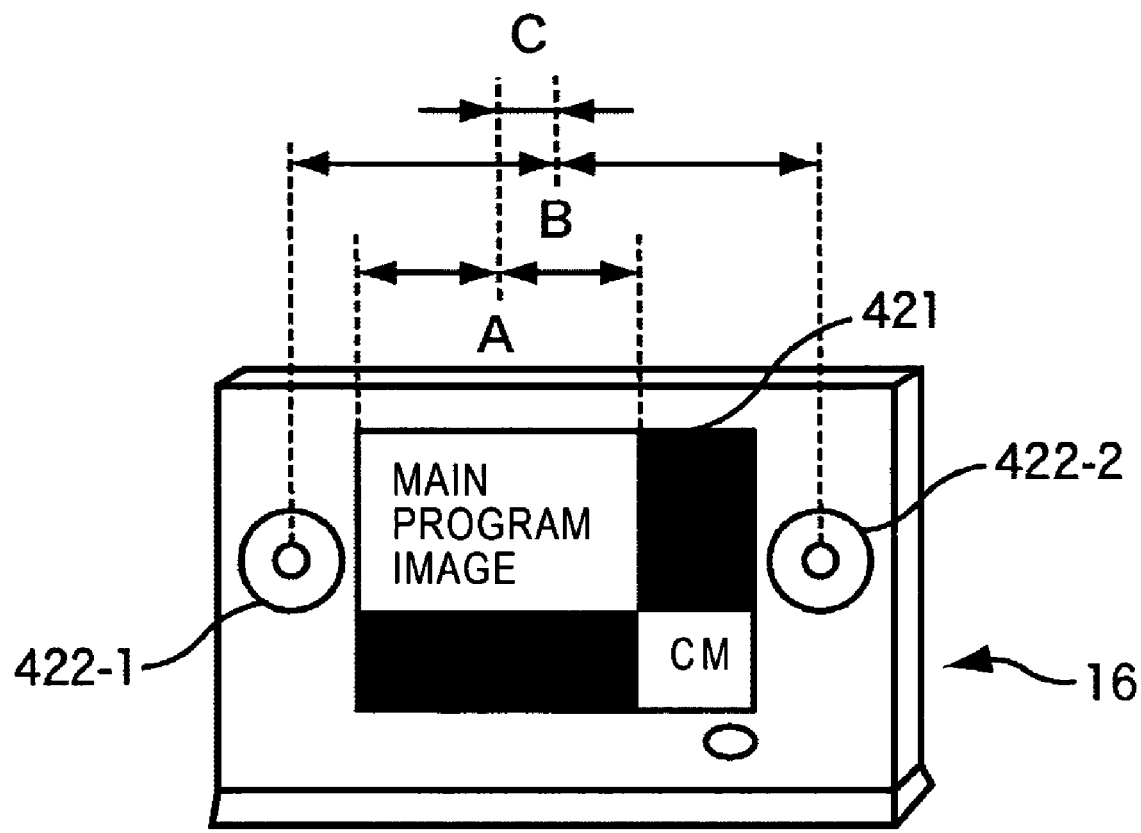
FIG. 43 is a diagram showing an example of a deviation of the horizontal center of a main program image from the horizontal center between two speakers.

FIG. 43 shows an example of a deviation of the horizontal center of a main program image 51 from the horizontal center between two speakers. The display 16 includes a display unit 421 for displaying images and speakers 422-1 and 422-2.

When the main program image 51 and the commercial image 52 shown in FIG. 38 are displayed on the display unit 421, the center A of the main program image 51 is shifted from the center of the display unit 421 of the display 16. The speakers 422-1 and 422-2 are generally located such that the center B between those two speakers is at the center of the display 16. As a result, the center A of the main program image 51 is deviated by C from the center B between the two speakers 422-1 and 422-2. When the size of the display unit 421 is not great, the deviation C does not cause a great problem. However, when the size of the display unit 421 of the display 16 is very great, for example, 100 inches or greater, the deviation C can cause a user to have an unnatural feeling.

Figure 44A:
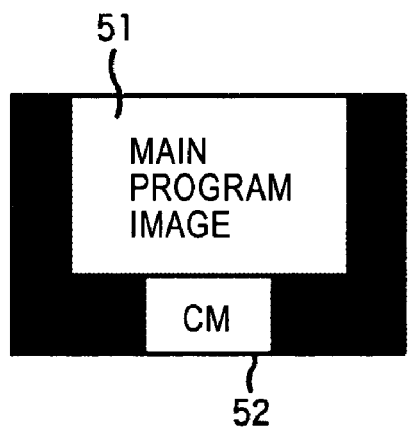
FIG. 44 is a diagram showing still another example of a manner in which a commercial image is inserted in a main program image.

To avoid the above problem, as shown in FIG. 44, the main program image 51 may be displayed such that the horizontal center of the main program image 51 is at the horizontal center of the display unit 421. That is, the main program image 51 is located horizontally in the center of the screen. More specifically, as shown in FIG. 44A, the main program image 51 and the commercial image 52 may be displayed at horizontal center of the screen. This allows the center of the main program image 51 to be coincident with the horizontal center between the two speakers 422-1 and 422-2. The coincidence between the image center and the sound image center allows a user to have a natural feeling. The sound image refers to a sound image that is created by a sound/voice output by the speakers 422-1 and 422-2 and that is perceived by a user as expanding in space or as being located at a particular position in space.

Figure 44B:
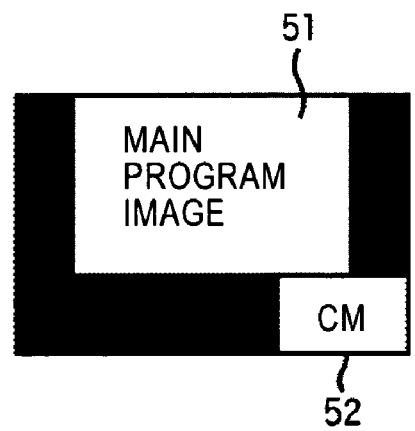

In an example shown in FIG. 44B, the commercial image 52 is located at a position horizontally shifted from the horizontal center of the display unit 421, although the main program image is located at the horizontal center of the display unit 421. When a voice/sound of a commercial is not output, the location of the commercial image 52 does not cause a particular problem. When a user gets interested in a commercial, the commercial image 52 may be relocated at the horizontal center of the display unit 421 and the sound/voice may be switched from that of the main program to the commercial. The recording apparatus 11, the recording apparatus 301, or the recording apparatus 321 can determine whether a user gets interested in a commercial, on the basis of a command issued by the user via the remote controller.

Figure 45A:
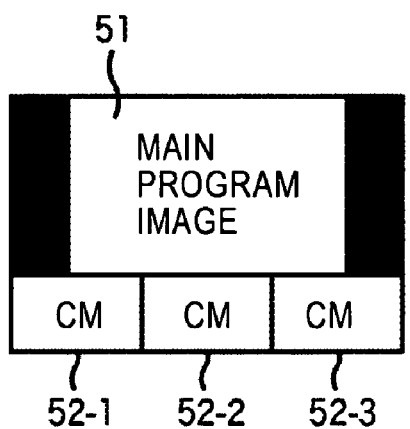
FIG. 45 is a diagram showing still another example of a manner in which commercial images are inserted in a main program image.
Figure 45B:
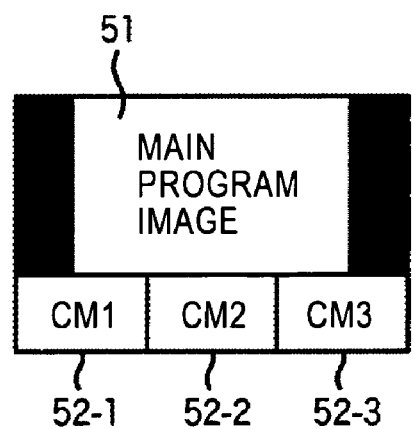

In the examples shown in FIGS. 44A and 44B, one main program image 51 and one commercial image 52 are displayed. Alternatively, as shown in FIG. 45A or 45B, a plurality of commercial images may be displayed in parallel (simultaneously) together with one main program image. In an example shown in FIG. 45A, three identical commercial images 52-1, 52-2, and 52-3 are displayed in parallel. In an example shown in FIG. 45B, three different commercial images 52-1, 52-2, and 52-3 are displayed in parallel.

Although not shown, images may be displayed in an eclectic manner. That is, of a plurality of commercial images 52, some images may be identical to each other although all images are not identical.

Figures 46A, 46B, 46C:
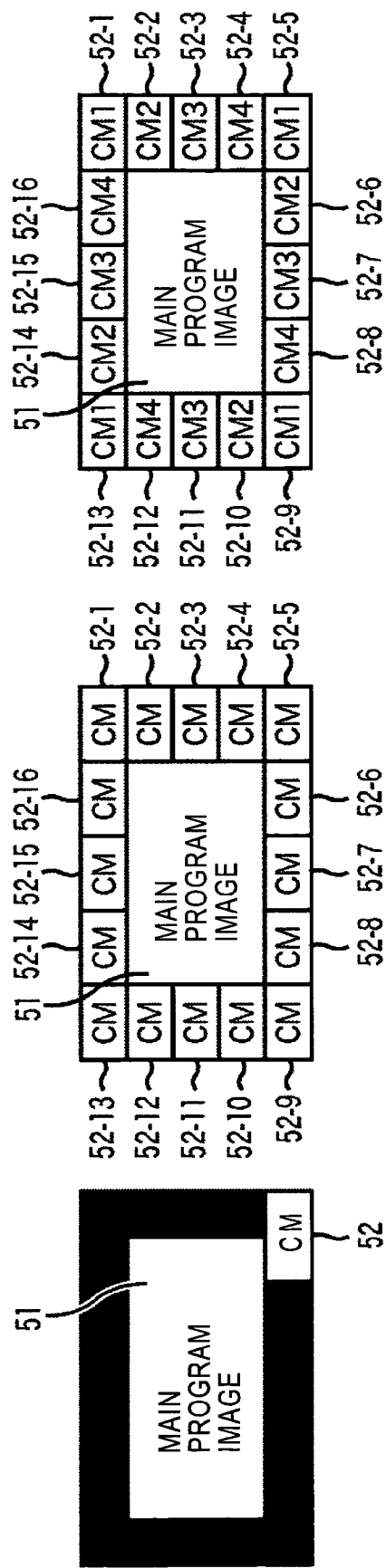
FIG. 46 is a diagram showing still another example of a manner in which commercial images are inserted in a main program image.

The main program image 51 may be displayed such that the vertical center of the main program image 51 may also be coincident with the vertical center of the screen. That is, as shown in FIG. 46A to 46C, by displaying the main program image 51 such that its vertical center is also coincident with the vertical center of the display unit 421, the deviation between the main program image 51 and the voice/sound (sound image) can be prevented. In an example shown in FIG. 46A, one main program image 51 and one commercial image 52 are displayed. In an example shown in FIG. 46B, a plurality of identical commercial images 52-1 to 52-16 are displayed in parallel (simultaneously) together with one main program image 51. In an example shown in FIG. 46C, a plurality of different commercial images 52-1 to 52-16 are displayed in parallel (simultaneously) together with one main program image 51.

If the main program image 51 or the commercial image 52 is displayed in a reduced fashion, there is a possibility that the reduction makes it impossible for a user to recognize details of the image. This problem can be avoided by performing image processing on a reduced image so that a user can recognize details of the image. For the above purpose, for example, an image processing technique filed by the present applicant as Japanese Patent Application No. 2002-304517 may be employed. In this technique, for example, object data corresponding to a preselected object is extracted from a first input video signal, and a second video signal is generated by adjusting the first video signal on the basis of the object data such that the object corresponding to the extracted object data is relatively enhanced compared with other objects included in the image of the first video signal. An image is displayed in accordance with the generated second video signal. The object may be a product, a trade name, or a trademark to be advertised in a commercial.

FIG. 47 is a block diagram showing still another example of the structure of the commercial reconstruction unit 35. In FIG. 47, similar parts to those in FIG. 24 are denoted by similar reference numerals, and a duplicated description of such similar parts is not given herein.

As shown in FIG. 47, the commercial reconstruction unit 35 includes a decoder 202, a main program buffer 205, an encoder 207, a controller 501, a commercial buffer 502, and a mixer 503.

The controller 501 controls the decoder 202 and the mixer 503 in accordance with commercial information, the time as defined on an image of a video signal decoded by the decoder 202, the data size of a video signal of a commercial image stored in the commercial buffer 502, and the data size of a video signal of a main program image stored in the main program buffer 205.

More specifically, the controller 501 determines the decoding speed at which the decoder 202 should decode the video signal, in accordance with the commercial information, the time as defined on the image of the video signal decoded by the decoder 202, the data size of the video signal of the commercial image stored in the commercial buffer 502, and the data size of the video signal of the main program image stored in the main program buffer 205, such that no overflow occurs in the commercial buffer 502 and the main program buffer 205 and such that video signals to be mixed by the mixer 503 are stored in the commercial buffer 502 and the main program buffer 205. In accordance with the decoding speed specified by the controller 501, the decoder 202 decodes the video signal. In accordance with the time defined on the image of the video signal decoded by the decoder 202, the controller 501 determines whether the decoder 202 should supply the decoded video signal to the commercial buffer 502 or to the main program buffer 205. In accordance with the determination made by the controller 501, the decoder 202 supplies the decoded video signal. Furthermore, on the basis of the commercial information and the time as defined on the main program image of the composite video signal produced the mixer 503, the controller 501 determines whether the current time is in a period during which a commercial image should be displayed. If the controller 501 determines that the current time is in a period during which an commercial image should be displayed, the controller 501 commands the mixer 503 to mix a commercial image (a video signal of a commercial image) stored in the commercial buffer 502 and an main program image (a video signal of a main program image) stored in the main program buffer 205.

Under the control of the controller 501, the decoder 202 acquires a video signal and decodes the acquired video signal. Furthermore, under the control of the controller 501, the decoder 202 supplies the decoded commercial video signal to the commercial buffer 502 and supplies the decoded main program video signal to the main program buffer 205.

The main program buffer 205 is a FIFO (first-in first-out) buffer adapted to temporarily store the decoded main program video signal supplied from the decoder 202 and supply the stored video signal to the mixer 503 in the same order as that in which the video signal was stored. The commercial buffer 502 is a FIFO (first-in first-out) buffer adapted to temporarily store the decoded commercial video signal supplied from the decoder 202 and supply the stored video signal to the mixer 503 in the same order as that in which the video signal was stored. Depending on the original temporal positions of the second image, that is, the commercial images, of the original video signal including the first image, that is, the main program image and the second image, the mixer 503 selects the first image or the second image sequentially and rearranges them into a sequence of first and second images such that the number of second images appearing continuously becomes smaller than or at most equal to the number of second images continuously appearing in the original video signal.

More specifically, under the control of the controller 501, the mixer 503 sequentially selects the main program video signal stored in the main program buffer 205 or the commercial video signal stored in the commercial buffer 502 and rearranges them into a sequence of main program images and commercial images such that the number of commercial images appearing continuously becomes smaller than or at most equal to the number of commercial images continuously appearing in the original video signal acquired via the signal input unit 31. For example, under the control of the controller 501, the mixer 503 sequentially selects the main program video signal stored in the main program buffer 205 or the commercial video signal stored in the commercial buffer 502 and rearranges them into a sequence of main program images and commercial images temporally inserted between adjacent main program images such only one commercial image appears at a time.

In the commercial reconstruction unit 35 with the structure shown in FIG. 47, main program images and commercial images are not spatially mixed but changed only in terms of temporal configuration. For example, when a given video signal has such an original configuration as shown in FIG. 1, only the temporal configuration is changed such that commercials CM1, CM2, CM3, and CM4 are temporally inserted (such that they are not directly adjacent with each other) in the main program.

Figure 48:
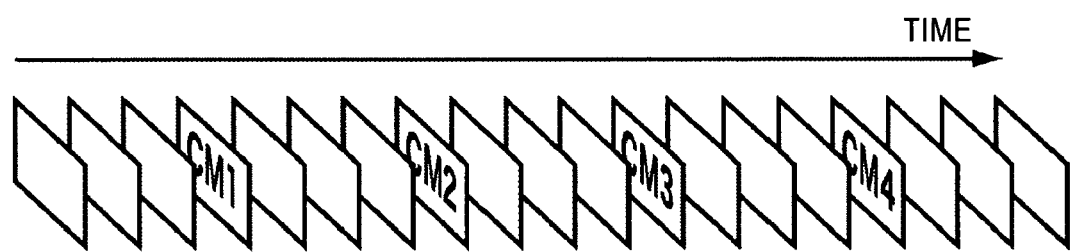
FIG. 48 is a diagram showing an example of a manner in which a video signal is output from the commercial reconstruction unit.

FIG. 48 is a diagram showing an example of a manner in which a video signal is output from the commercial reconstruction unit 45 configured as shown in FIG. 47. Commercials that are located at temporally adjacent positions in an original video signal are located at temporally separated positions in the video signal output from the commercial reconstruction unit 35. That is, in the video signal output from the commercial reconstruction unit 35, commercials are temporally inserted in a main program such that the temporal positions of respective inserted commercials are not adjacent to each other.

Figure 1:
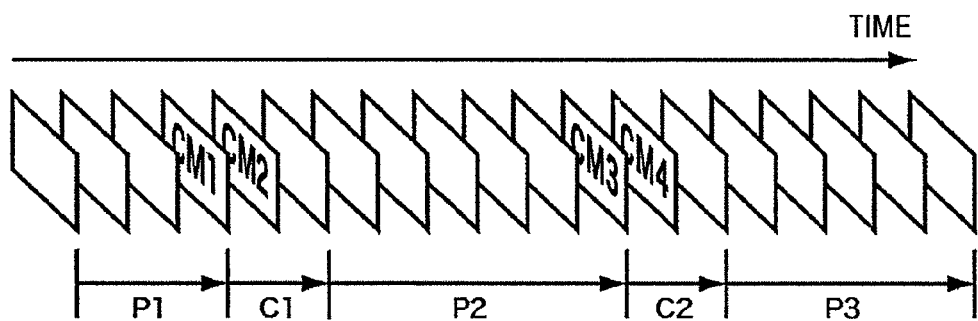
FIG. 1 is a diagram showing an example of a configuration of a television broadcast including a main program and commercials broadcasted from a broadcast station.
Figure 2:
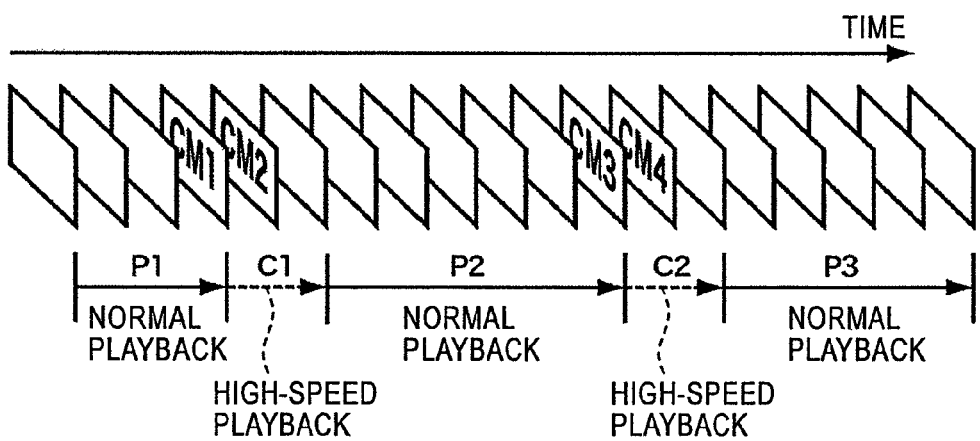
FIG. 2 is a diagram showing an example of a manner in which a recorded television program is played back.
Figure 3:
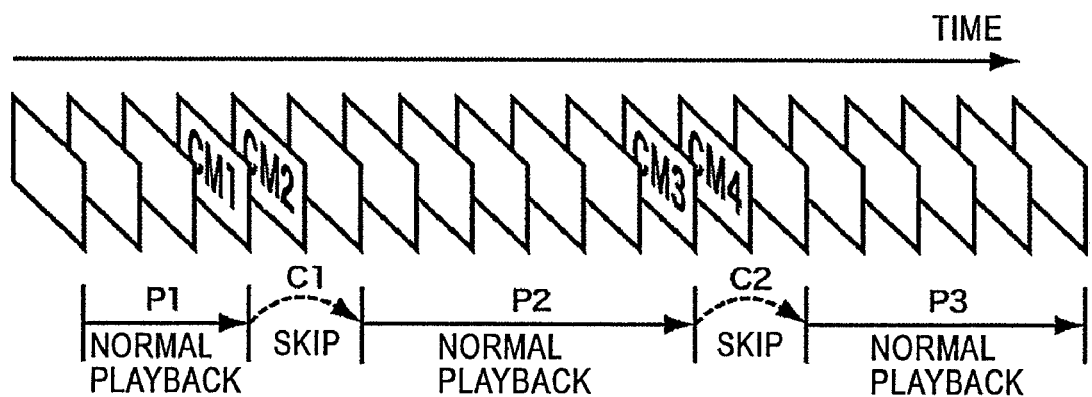
FIG. 3 is a diagram showing an example of a manner of playing back a television broadcast program recorded on a random access storage medium.
Figure 4:
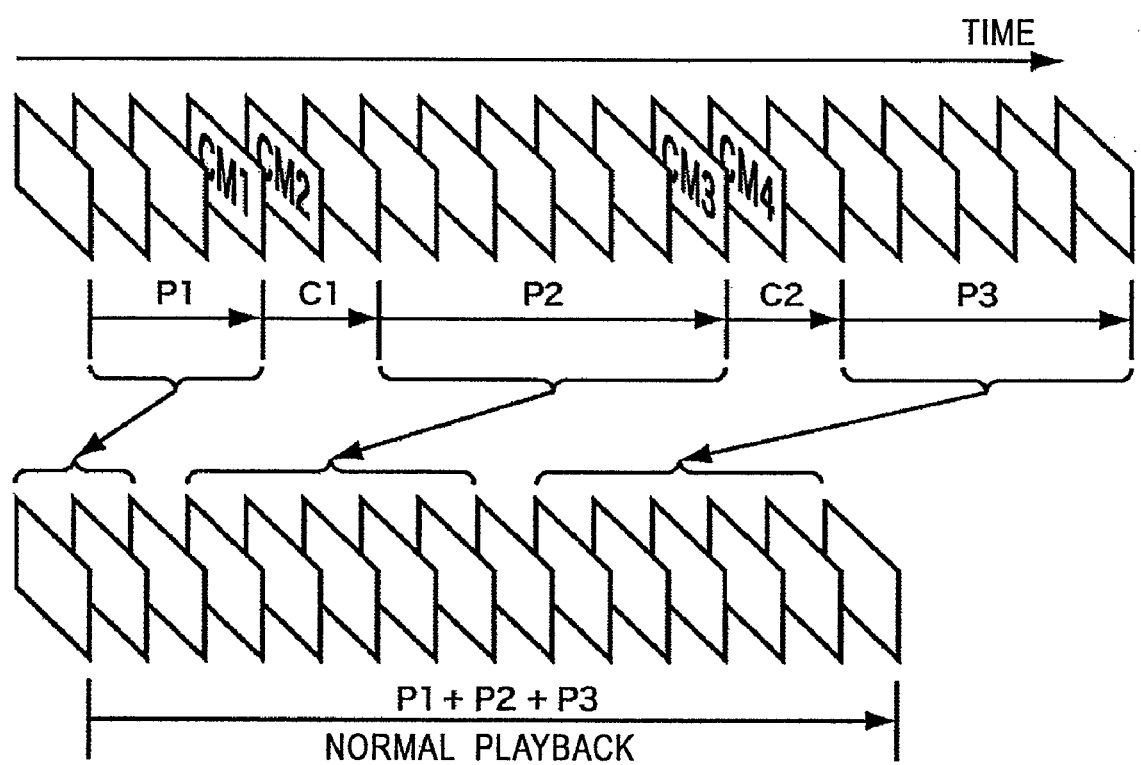
FIG. 4 is a diagram showing an example of a manner in which edited television broadcast program is played back.
Figure 5:
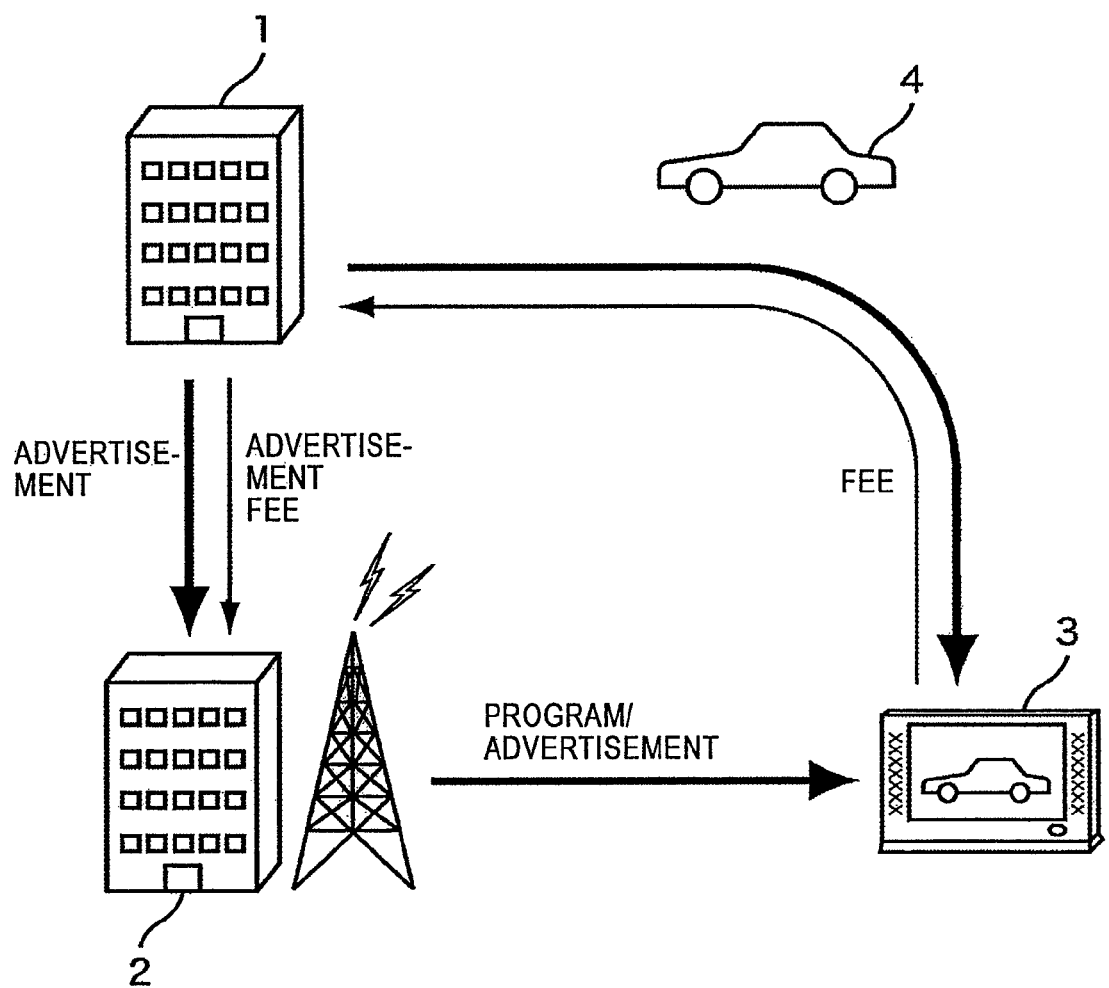
FIG. 5 is a diagram showing an outline of a business model of charge-free broadcasting.

In many actual broadcasts, as shown in FIG. 1, a plurality of commercials are continuously inserted in a main program. In this case, a user has to continuously view commercials for a long time.

In contrast, in the video signal output from the commercial reconstruction unit 35, commercials are separately inserted in a main program, and thus a user can return to the main program without being disturbed by a long succession of commercials.

Although in the specific example shown in FIG. 48, commercials are separated from one another, two or more commercials may be continuously inserted, as long as the total period of one succession of commercials is shorter than or at most equal to the total period of one succession of commercials in an original video signal acquired via the signal input unit 31.

The operation of the commercial reconstruction unit 35 configured as shown in FIG. 47 is described in further detail below with reference to flow charts shown in FIGS. 49 and 50. Note that the decoding process described below with reference to the flow chart shown in FIG. 49 and the mixing process described below with reference to the flow chart shown in FIG. 50 are performed in parallel.

Figure 49:
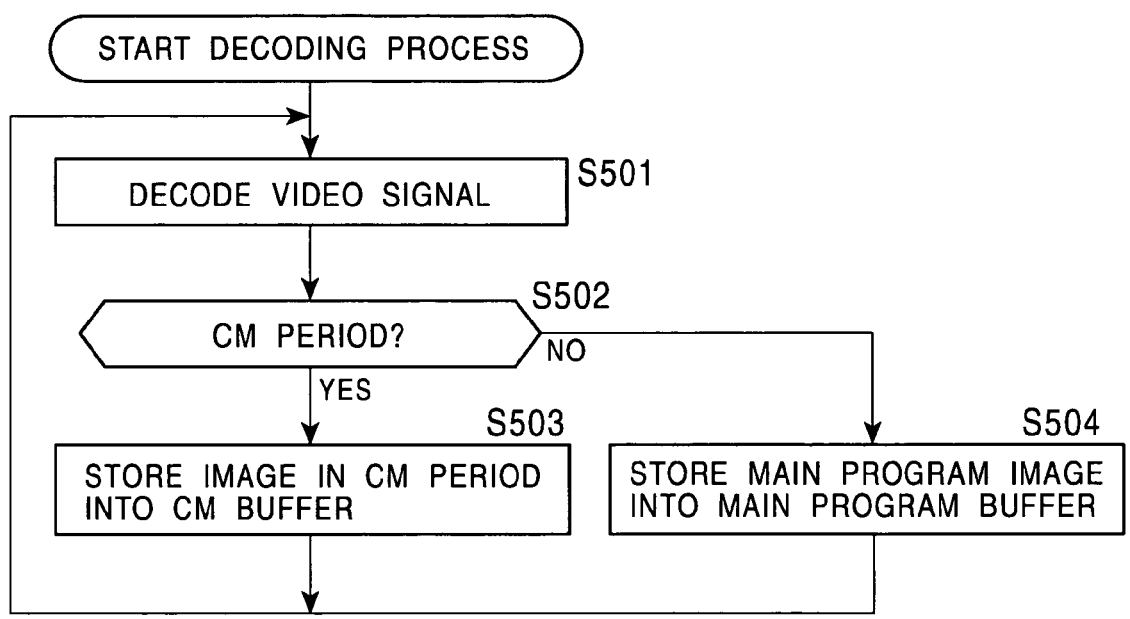
FIG. 49 is a flow chart showing a decoding process.
Figure 50:
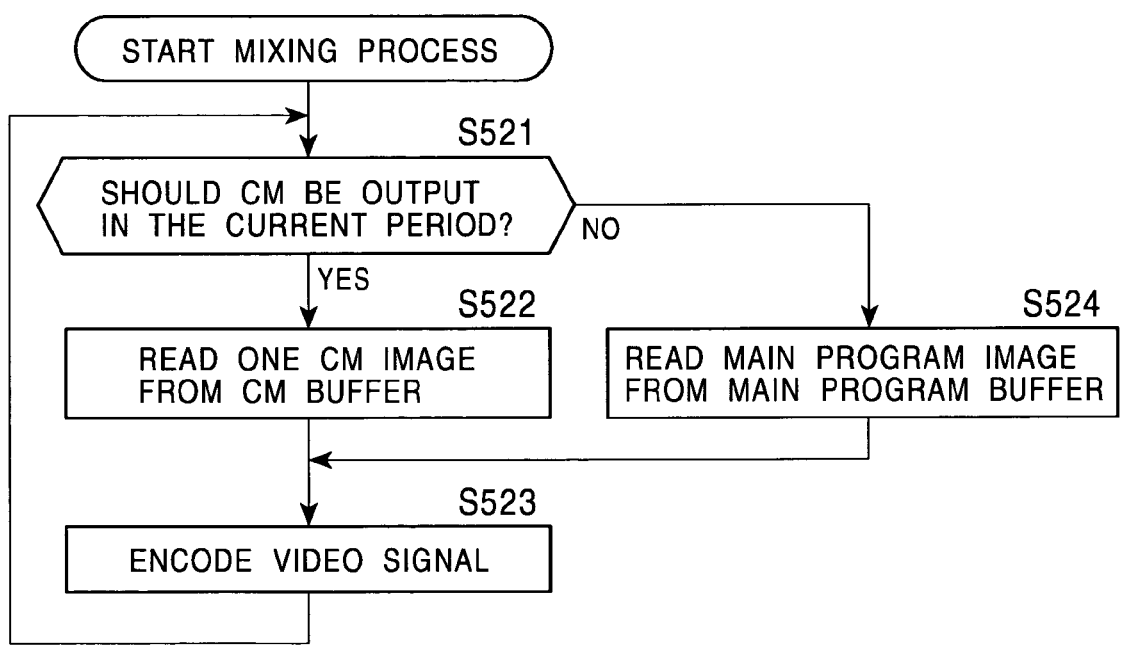
FIG. 50 is a flow chart showing a mixing process.

FIG. 49 is a flow chart showing the decoding process performed by the controller 501, the decoder 202, the commercial buffer 502, and the main program buffer 205. In step S501, the decoder S501 decodes a given video signal. In step S502, the controller 501 determines whether the time as defined on an image of the video signal being encoded is in a commercial period, on the basis of commercial information and the time as defined on the image of the video signal being decoded by the decoder 202. If it is determined that the current time is in a commercial period, the process proceeds to step S503. In step S503, the controller 501 controls the decoder 202 to supply the decoded video signal to the commercial buffer 502. In response, the commercial buffer 502 stores the video signal in the commercial period supplied from the decoder 202. Thereafter, the process returns to step S501, and the above-described process is repeated.

On the other hand, if it is determined in step S502 that the current time is not in a commercial period, then it is determined that the current time is in a main program period, and thus the process jumps to step S504. In step S504, the controller 501 controls the decoder 202 to supply the decoded video signal to the main program buffer 205. The main program buffer 205 stores the received video signal in the main program period. Thereafter, the process returns to step S501, and the above-described process is repeated.

As a result of the process described above with reference to the flow chart shown in FIG. 49, video signals of images to be displayed in commercial periods are stored in the commercial buffer 502, and video signals of images to be displayed in main program periods are stored in the main program buffer 205.

FIG. 50 is a flow chart showing the mixing process performed by the controller 501, the mixer 503, and the encoder 207. In step S521, on the basis of commercial information and a time as defined on an image of a composite video signal produced by the mixer 503, the controller 501 determines whether the current time is in a period during which a commercial image should be output. If it is determined that the current time is in a main program period in which a commercial should be output, the process proceeds to step S522. In step S522, the mixer 503 selectively reads one of commercial images stored in the commercial buffer 502 and inserts the selected commercial image in the main program image.

In step S523, the encoder 207 encodes the inserted image and outputs the resultant encoded video signal. Thereafter, the process returns to step S521, and the above-described process is repeated.

In the case in which it is determined in step S521 that the current time is in a main program period in which no commercial image should be output, the process jumps to step S524. In step S524, the mixer 206 selectively reads the main program image from the main program buffer 205 and outputs the read main program image as an image in the reconstructed video signal. Thereafter, the process proceeds to step S523.

In the output video signal reconstructed in the above-described manner, the total period of one succession of commercial images is shorter than or at most equal to the total period of one succession of commercial images in the original video signal.

The reduction in period of one succession of commercials allows a user to return to the main program without being disturbed for a long time by commercials.

Note that the commercial reconstruction unit 311 and the commercial reconstruction unit 342 may be formed in a similar manner to the commercial reconstruction unit 35 shown in FIG. 47.

The commercial reconstruction unit 35, the commercial reconstruction unit 311, and commercial reconstruction unit 342 do not necessarily need to output video signals at a normal playback speed, but may output video signals at a speed higher than the normal playback speed by a factor in the range of, for example 1.3 to 8. In this case, the commercial reconstruction unit 35, the commercial reconstruction unit 311, or commercial reconstruction unit 342 may determine the importance of a current scene in accordance with a particular signal included in a video signal and may determine the playback speed depending on the determined importance. That is, an important scene may be output the normal playback speed and a less importance scene may be output at a high playback speed. The commercial reconstruction unit 35, the commercial reconstruction unit 311, or commercial reconstruction unit 342 may determine the importance of a scene such that an image object included in a video signal is detected and compared with reference image objects prepared in advance. If the detected image object is equal or similar to one of reference image objects, the detected scene is regarded as being important.

The above-described process can be easily realized by controlling the decoder 202, the decoder 232, or the decoder 233 using the controller 201, the controller 231, the controller 361, or the controller 501.

As described above, the present invention makes it possible for users to continuously view a main program without a break, while maintaining the capability of presenting commercials to users. That is, the present invention makes it possible to satisfy both the requirement that users want to view a main program without a break and the requirement that sponsors want users to view commercials. Because a main program image and a commercial image are both reduced and displayed in non-overlapping areas, a user can view the whole main program image and commercial image. By repeatedly displaying a reduced commercial image, it is possible to arouse user's interest more effectively than can by simply displaying a reduced commercial image.

By displaying a plurality of reduced commercial images on the screen at the same time, it becomes possible to reduce a useless area in which no images are displayed. By displaying a commercial image such that it gradually appears or disappears, it becomes possible to present the commercial to a user without giving an unnatural impression to the user.

By displaying a main program image such that the horizontal center of the main program image is coincident with the horizontal center of the screen and/or such that the vertical center of the main program image is coincident with the vertical center of the screen, the center of the image becomes coincident with the position of the voice/sound (the position of the sound image), and thus it is possible to present the image and the voice/sound to the user in a very natural manner.

For example, in a reduced commercial image, object data corresponding to a predetermined object such as a product, a trade name, or a trademark to be advertised in the commercial is extracted, and the commercial video signal is adjusted such that the object corresponding to the extracted object data is enhanced compared with other objects. In accordance with the resultant commercial video signal, the commercial image is displayed so that the object attracts a user's attention. Similarly, for example, particular object data is extracted from a reduced main program image, and the main program video signal is adjusted such that the object corresponding to the extracted object data is enhanced compared with other objects. In accordance with the resultant main program video signal, the main program image is displayed so that the object attracts a user's attention.

By reconstructing a video signal such that the length of each continuous commercial period becomes shorter than or at most equal to the length of each continuous commercial period in a given original video signal, it becomes possible to reduce a waiting time caused by a commercial before a main program is displayed again. This makes it possible to present a commercial to a user without significantly disturbing a spiritual state of the user.

By displaying a first image, that is, a main program image on the screen temporally continuously without a break, it becomes possible for a user to view the main program without a break.

When a video signal including a first image and a second image temporally inserted in the first image is given, the video signal is recorded such that storing of the first image of the video signal is controlled on the basis of the temporal position of at least one of the first image and the second image in the video signal, and storing of the second image of the video signal is controlled on the basis of the temporal position of at least one of the first image and the second image in the video signal. After completion of recording the video signal in the above-described manner, a video signal with a reconstructed configuration is produced by mixing the recorded first image and second image. In the reconstruction process, a determination as to whether a current period is a period in which the second image should be displayed is made on the basis of the temporal position of at least one of the first image and the second image in the original video signal, and the first and second images are mixed such that the first image is displayed temporally continuously in a first area of the screen and the second image is displayed in a second area of the screen during a period determined as a period in which the second image should be displayed. This makes it possible to continuously present a main program to a user without a break, while presenting a commercial to the user in a properly selected period.

When a video signal including a first image and one or more second images temporally inserted in the first image is given, the video signal is recorded such that storing of the first image of the video signal is controlled on the basis of the temporal position of the one or more second images in the video signal, and storing of the one or more second images of the video signal is controlled on the basis of the temporal position of the one or more second images in the video signal. After completion of recording the video signal in the above-described manner, a video signal with a reconstructed configuration is produced by mixing the recorded first image and second image such that the recorded first image or second image is sequentially selected depending on the temporal position of the one or more second images in the video signal, and the selected image is put into a sequence of images such that the number of directly adjacent second images in the reconstructed video signal is smaller than or at most equal to the number of adjacent second images in the original video signal. This makes it possible for a user to return to the main program without being disturbed for a long time by commercials.

The processes described above may be executed by hardware or software. When the processing sequence is executed by software, a program implementing the software may be installed from a storage medium onto a computer which is provided as dedicated hardware or may be installed onto a general-purpose computer capable of performing various processes in accordance with various programs installed thereon.

Figure 51:
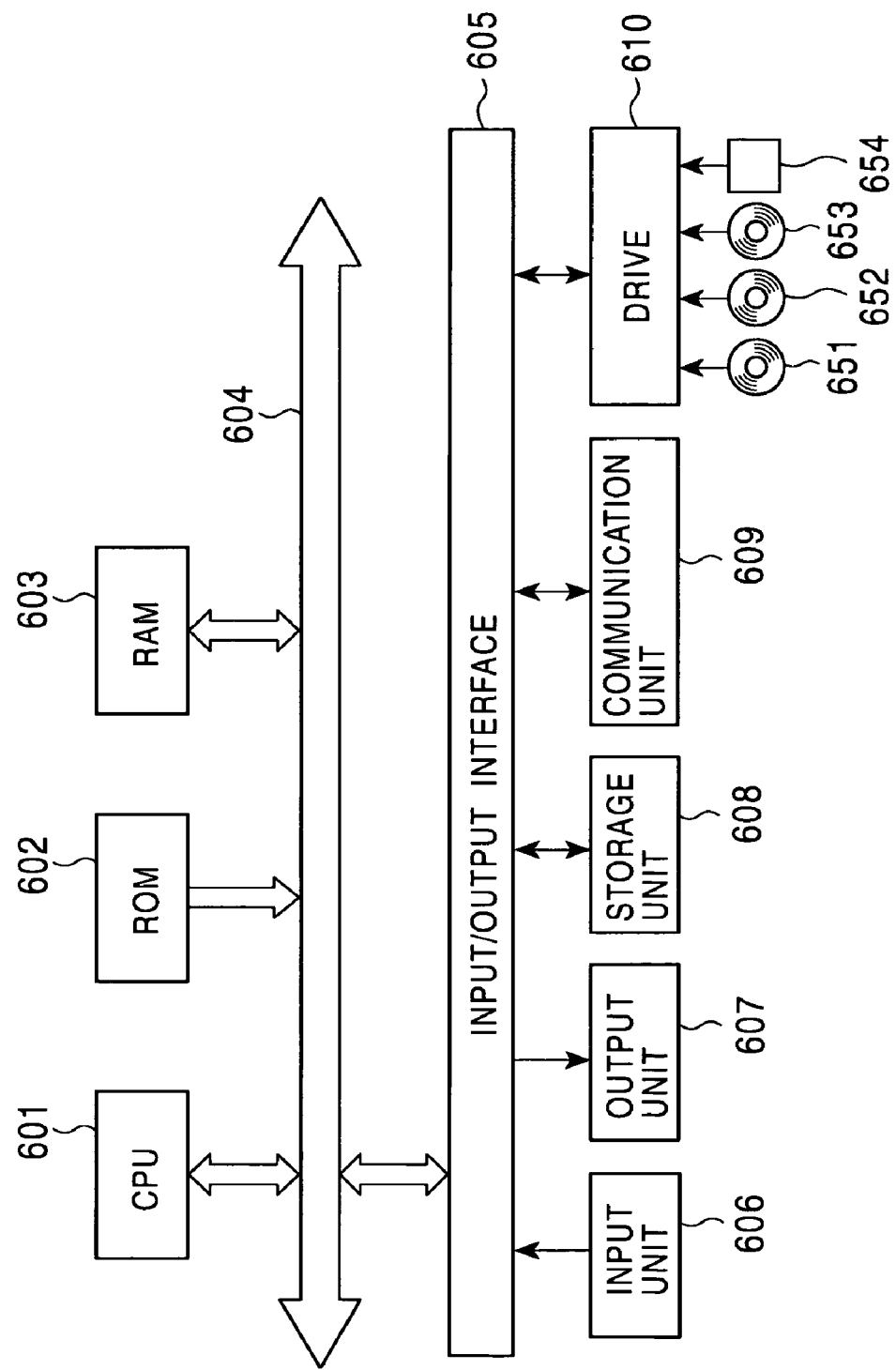
FIG. 51 is a block diagram showing an example of a configuration of a personal computer used to execute processes.

FIG. 51 is a block diagram showing an example of a configuration of a personal computer on which the above-described processes are executed according to the program. A CPU (Central Processing Unit) 601 executes various processes in accordance with the program stored in a ROM (Read Only Memory) 602 or a storage unit 608. In a RAM (Random Access Memory) 603, the program and data used by the CPU 601 are stored as required. The CPU 601, the ROM 602, and the RAM 603 are connected with each other via a bus 604.

The CPU 601 is also connected with an input/output interface 605 via the bus 604. An input unit 606 and an output unit 607 are connected with the input/output interface 605, wherein the input unit 606 includes a keyboard, a mouse, a microphone, etc., and the output unit 607 includes a display, speaker, etc. The CPU 601 executes various processes in accordance with commands input via the input unit 606. An image signal and an audio signal obtained as the processes performed by the CPU 601 are supplied to the output unit 607.

As for the storage unit 608 connected with the input/output interface 605, a hard disk or the like may be used to store the program or data used by the CPU 601. A communication unit 609 communicates with an external device such as a server 14 or a server 15 via a network 13 such as the Internet. In this specific example, the communication unit 609 serves as an interface via which to acquire or output a video signal.

The communication unit 609 may also be used to acquire the program to be stored in the storage unit 608.

The input/output interface 605 is also connected with a driver 601. When a storage medium such as a magnetic disk 651, an optical disk 652, an electrooptical disk 653, or a semiconductor memory 654 is mounted on the drive 610, the drive 610 drives the storage medium and acquires a program or data stored thereon. The acquired program or data is transferred to the storage unit 608 and stored therein, as required.

The storage media on which the program for executing various processes, such as the magnetic disk (for example, a floppy disk) 651, the optical disk (for example, a CD-ROM (Compact Disk-Read Only Memory) or a DVD (Digital Versatile Disk)) 652, the magnetooptical disk (for example, an MD (Mini-Disk) (trademark)) 653, and the semiconductor memory 654, shown in FIG. 51, may be a package medium that is supplied to a user separately from the computer. The program may also be supplied to the user in such a manner that the program is preinstalled on the built-in ROM 602 or the storage unit 608 such as a hard disk disposed in the computer.

The program for executing the processes may be installed on the computer, as required, via an interface such as a router or a modem by means of downloading via a wired or wireless communication medium such as a local area network, the Internet, or digital satellite broadcasting.

In the present description, the steps described in the program stored in the storage medium may be performed either in time sequence in accordance with the order described in the program or in a parallel or separate fashion.

What is claimed is:

1. A video processing apparatus comprising:
   first storage control means for, when a video signal including a first image and a second image temporally inserted in the first image is given, controlling storing of the first image of the video signal, on the basis of the temporal position of at least one of the first image and the second image in the video signal;
   second storage control means for controlling of storing the second image on the basis of the temporal position of at least one of the first image and the second image in the video signal;
   image detection means for detecting the second image from the video signal, wherein the image detection means include:
a transition detecting unit that detects, from the video signal, a plurality of image transition frames for determining candidates of the second image signal, and
a judgment unit that selects a candidate with a minimum broadcast period as the second image for a temporal position when more than one candidate starts at the same temporal position and removes the selected candidate from a candidate list so that the selected candidate is excluded from being selected again;
determination means for determining whether a current period is a period during which to display the second image, on the basis of the temporal position of at least one of the first image and the second image in the video signal; and
mixing means for mixing the stored first and second images such that the first image is displayed temporally continuously in a first area of a screen and such that if the current period is determined as a period during which the second image should be displayed, the second image is displayed in a second area of the screen,
wherein the second image is repeatedly displayed in the second area in the period during the second image is displayed.

2. A video processing apparatus according to claim 1, wherein the first image is a main program image in the video signal; and
the second image is a commercial image.

3. A video processing apparatus according to claim 1, wherein the first storage control means controls storing of the first image of the video signal in accordance with detection of the second image by the image detection means;
the second storage control means controls storing of the second image of the video signal in accordance with detection of the second image by the image detection means; and
the determination means determines whether the current period is a period during which to display the second image, in accordance with detection of the second image by the image detection means.

4. A video processing apparatus according to claim 1, further comprising:
reception control means for controlling receiving of position information indicating a position of at least one of the first image and the second image in the video signal;
wherein the first storage control means controls storing of the first image of the video signal in accordance with the position information;
the second storage control means controls storing of the second image of the video signal in accordance with the position information; and
the determination means determines whether the current period is a period during which to display the second image, on the basis of the position information.

5. A video processing apparatus according to claim 1, further comprising:
reduction means for reducing the second image;
wherein the second storage means controls storing of the reduced second image;
and the mixing means mixes the stored first image and the reduced second image.

6. A video processing apparatus according to claim 1, further comprising:
first reduction means for reducing the first image; and
second reduction means for reducing the second image,
wherein the first storage means controls storing of the reduced first image;
the second storage means controls storing of the reduced second image; and
the mixing means mixes the stored reduced first image and reduced second image.

7. A video processing apparatus according to claim 1, wherein the determination means determines, on the basis of the position of at least one of the first image and the second image in the video signal, whether the current period is a period during which to display the second image such that the second image is displayed temporally repeatedly in the second area.

8. A video processing apparatus according to claim 1, wherein the mixing means mixes the stored first image and second image such that the second image is displayed in a plurality of second areas on the screen.

9. A video processing apparatus according to claim 1, wherein the mixing means mixes the stored first image and second image such that the first image is displayed in the first area whose horizontal center is coincident with the horizontal center of the screen and/or whose vertical center is coincident with the vertical center of the screen.

10. A video processing apparatus according to claim 1, further comprising:
storage means for storing the video signal,
wherein the first storage control means controls storing of the first image of the video signal read from the storage means; and the second storage control means controls storing of the second image of the video signal read from the storage means.

11. A video processing apparatus according to claim 1, further comprising:
storage means for storing the video signal including the first image and the second image mixed together by the mixing means.

12. The video processing apparatus according to claim 1, wherein the determination means determines a display time period for the video signal, and
wherein a display time of the first image and the second image does not exceed the display time period.

13. A video processing method comprising:
a first storage control step of, when a video signal including a first image and a second image temporally inserted in the first image is given, controlling storing of the first image of the video signal, on the basis of the temporal position of at least one of the first image and the second image in the video signal;
a second storage control step of controlling of storing the second image on the basis of the temporal position of at least one of the first image and the second image in the video signal;
a detecting step of detecting, from the video signal, a plurality of image transition frames for determining candidates of the second image signal;
a judging step of selecting a candidate with a minimum broadcast period as the second image for a temporal position when more than one candidate starts at the same temporal position and removing the selected candidate from a candidate list so that the selected candidate is excluded from being selected again;
a determination step of determining whether a current period is a period during which to display the second image, on the basis of the temporal position of at least one of the first image and the second image in the video signal;

a mixing step of mixing the stored first and second images such that the first image is displayed temporally continuously in a first area of a screen and such that if the current period is determined as a period during which the second image should be displayed, the second image is displayed in a second area of the screen; and a displaying step of repeatedly displaying, on a display unit, the second image in the second area in the period during the second image is displayed.

14. The video processing method according to claim 13, further comprising:
a second determination step of determining a display time period for the video signal, and
controlling a display time of the first image and the second image such that display of the first image and the second image not exceed the display time period.

15. A non-transitory computer-readable medium for storing a computer program causing a computer to execute video processing comprising:
a first storage control step of, when a video signal including a first image and a second image temporally inserted in the first image is given, controlling storing of the first image of the video signal, on the basis of the temporal position of at least one of the first image and the second image in the video signal;
a second storage control step of controlling of storing the second image on the basis of the temporal position of at least one of the first image and the second image in the video signal;
a detecting step of detecting, from the video signal, a plurality of image transition frames for determining candidates of the second image signal;
a judging step of selecting a candidate with a minimum broadcast period as the second image for a temporal position when more than one candidate starts at the same temporal position and removing the selected candidate from a candidate list so that the selected candidate is excluded from being selected again;
a determination step of determining whether a current period is a period during which to display the second image, on the basis of the temporal position of at least one of the first image and the second image in the video signal;
a mixing step of mixing the stored first and second images such that the first image is displayed temporally continuously in a first area of a screen and such that if the current period is determined as a period during which the second image should be displayed, the second image is displayed in a second area of the screen; and
a displaying step of repeatedly displaying the second image in the second area in the period during the second image is displayed.

16. A video processing apparatus comprising:
first storage control means for, when a video signal including a first image and one or more continuous second images temporally inserted in the first image is given, controlling storing of the first image of the video signal, on the basis of the temporal position of at least one of the first image and the one or more second images in the video signal;
second storage control means for controlling storing of the one or more second images on the basis of the temporal position of at least one of the first image and the one or more second images in the video signal;
image detection means for detecting the second image from the video signal,
wherein the image detection means include:

a transition detecting unit that detects, from the video signal, a plurality of image transition frames for determining candidates of the second image signal, and
a judgment unit that selects a candidate with a minimum broadcast period as the second image for a temporal position when more than one candidate starts at the same temporal position and removes the selected candidate from a candidate list so that the selected candidate is excluded from being selected again; and
mixing means for mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal,
wherein the second image is repeatedly displayed in the second area in the period during the second image is displayed.

17. A video processing apparatus according to claim 16, wherein:
the first image is a main program image in the video signal; and the second image is a commercial image.

18. A video processing apparatus according to claim 16, wherein the first storage control means controls storing of the first image of the video signal in accordance with detection of the second image by the image detection means;
the second storage control means controls storing of the second image of the video signal in accordance with detection of the second image by the image detection means; and
the mixing means mixes the first image and the second image by sequentially selecting the stored first image or second image in accordance with detection of the second image by the image detection means.

19. A video processing apparatus according to claim 16, further comprising:
reception control means for controlling receiving of position information indicating a position of the second image in the video signal,
wherein the first storage control means controls storing of the first image of the video signal in accordance with the position information;
the second storage control means controls storing of the second image of the video signal in accordance with the position information; and
the mixing means mixes the first image and the second image by sequentially selecting the stored first image or second image in accordance with the position information.

20. A video processing method comprising:
a first storage control step of, when a video signal including a first image and one or more continuous second images temporally inserted in the first image is given, controlling storing of the first image of the video signal, on the basis of the temporal position of at least one of the first image and the one or more second images in the video signal;
a second storage control step of controlling storing of the one or more second images on the basis of the temporal position of at least one of the first image and the one or more second images in the video signal;
a detecting step of detecting, from the video signal, a plurality of image transition frames for determining candidates of the second image signal;

a judging step of selecting a candidate with a minimum broadcast period as the second image for a temporal position when more than one candidate starts at the same temporal position and removing the selected candidate from a candidate list so that the selected candidate is excluded from being selected again;

a mixing step of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal; and a displaying step of repeatedly displaying, on a display unit, the second image in the second area in the period during the second image is displayed.

21. A non-transitory computer-readable medium storing a computer program for causing a computer to execute video processing comprising:

a first storage control step of, when a video signal including a first image and one or more continuous second images temporally inserted in the first image is given, controlling storing of the first image of the video signal, on the basis of the temporal position of at least one of the first image and the one or more second images in the video signal;

a second storage control step of controlling storing of the one or more second images on the basis of the temporal position of at least one of the first image and the one or more second images in the video signal;

a detecting step of detecting, from the video signal, a plurality of image transition frames for determining candidates of the second image signal;

a judging step of selecting a candidate with a minimum broadcast period as the second image for a temporal position when more than one candidate starts at the same temporal position and removing the selected candidate from a candidate list so that the selected candidate is excluded from being selected again;

a mixing step of mixing the first image and the one or more second images by sequentially selecting the stored first image or one or more second images on the basis of the temporal position of the one or more second images in the video signal such that the number of directly adjacent second images in the mixed images is smaller than or at most equal to the number of directly adjacent second images in the original video signal; and a displaying step of repeatedly displaying the second image in the second area in the period during the second image is displayed.

* * * * *